(12) United States Patent
Pulsifer

(10) Patent No.: US 11,712,772 B2
(45) Date of Patent: Aug. 1, 2023

(54) MACHINE TOOL T-SLOT PROTECTIVE DEVICE

(71) Applicant: Derek Edward Pulsifer, Danville, PA (US)

(72) Inventor: Derek Edward Pulsifer, Danville, PA (US)

( * ) Notice: Subject to any disclaimer, the term of this patent is extended or adjusted under 35 U.S.C. 154(b) by 574 days.

(21) Appl. No.: 16/786,064

(22) Filed: Feb. 10, 2020

(65) Prior Publication Data

US 2021/0245316 A1 Aug. 12, 2021

(51) Int. Cl.
*B23Q 11/08* (2006.01)
*B23Q 3/06* (2006.01)

(52) U.S. Cl.
CPC ............. *B23Q 11/085* (2013.01); *B23Q 3/06* (2013.01)

(58) Field of Classification Search
CPC .......... B23Q 11/085; B23Q 11/08; B23Q 3/06
See application file for complete search history.

(56) References Cited

U.S. PATENT DOCUMENTS

| | | | |
|---|---|---|---|
| 2,990,650 A * | 7/1961 | Attwood | E04D 5/148 52/468 |
| 3,627,338 A | 12/1971 | Thompson | |
| 4,200,300 A | 4/1980 | Rohm | |
| 7,144,209 B2 * | 12/2006 | Komine | B23Q 11/08 52/468 |
| 9,636,801 B1 | 5/2017 | Lee et al. | |

\* cited by examiner

*Primary Examiner* — Jeremy R Severson
(74) *Attorney, Agent, or Firm* — Barley Snyder

(57) ABSTRACT

An elongated T-slot protection device comprising an elongated member having a body, a pair of sidewalls, and a pair of legs. The protection device is placeable into an elongated opening of a T-slot, and covers the elongated opening to prevent debris from entering the T-slot formed in a work surface.

19 Claims, 53 Drawing Sheets

MACHINE TOOL T-SLOT PROTECTIVE DEVICE

FIELD OF THE INVENTION

The present invention relates to a modular work holding systems. The modular work holding systems serve to affix a workpiece to a machine tool. The modular work holding system is adapted to accept a plurality of clamping tools, and may optionally be secured to a standard T-slot table, to reversibly and immovably hold a workpiece for machining operations.

BACKGROUND

The manufacturing industry relies on various methods for producing products according to the products engineer's design. These products are often made with machinery, utilizing manufacturing techniques including, for example, injection molding, additive manufacturing, such as 3d printing, or subtractive manufacturing, such as computer numerical control ("CNC") milling or turning. For example, in the production of an injection molded component, typically, such components are produced as follows: the products engineer's concept is recorded, for example using 3D modeling or CAD software, then the product, or components thereof, is manufactured according to the model using manufacturing techniques, for example, those mentioned above. Typically, molds for injection molding are created through subtractive manufacturing, such as machining the molds to form a negative form of the injection molded product or component. The machines commonly employed for the machining are CNC milling machines, which along with the necessary tooling, are a large expense to a company wishing to enter into manufacturing. In order to stay in business, companies must be innovative and efficient in producing products, therefore, time and quality are often the driving factors in success.

CNC machinery, including, for example, computer controlled mills and lathes, provide enhanced speed and accuracy, relative to other manufacturing techniques, and therefore may beneficially reduce the amount of time required to manufacture products and increase the quality of the resulting products. In order to provide these benefits, the machine tool itself should be of high quality, but even the best machine tool is only as good as the work holding solution chosen, as a work holding solution that is inadequate may not precisely hold the components in position during the work, or may require a significant amount of time to properly secure and/or remove the work piece within the holding components, and therefore prohibits fast, and flexible securement and removal of the work to be held, resulting in a lengthy preparation, or time required to turn around the machine for additional work. The industry standard for machine tools is to provide what are referred to as "T-Slot" tables, having a given number, normally three to five, of grooved slots aligned in parallel along one direction, commonly referred to as the "X axis." These T-Slots of the conventional work holding systems, when used with clamps as known to those skilled in the art, while effective in holding basic shapes or other workpiece holding apparatus, (e.g., vises), are limited in what they can offer for the complex and varied nature of machined parts geometry. Whether the machine tool is manually operated, or CNC operated, a basic three to five groove T-slot table is the industry standard on almost all milling machines.

Given the limited number (e.g., 3-5) of working grooves aligned along a single axis, as is typically provided to choose from when attempting to secure a workpiece, custom work holding is often created as the better means to secure a workpiece, as there can be infinite flexibility afforded when custom designing a work hold for a specific application, however, such custom application is typically useful for only that application. When a part is requested to be made, many factors come into the cost of producing said workpiece. A company offering their services to machine these parts for a customer must carefully consider how they will approach not only the tooling that will be needed, but also the cutting strategy, the machine tool itself, and often times most importantly, the most efficient way of holding said part securely.

The majority of workpieces begin as cylindrical or prismatic forms, typically one of a cylindrical, cubed, or rectangular prism shape of a given material, often referred to as a blank. The blank is to be shaped by what is referred to as turning or milling, progressively cutting away material from the blank, until the desired shape is achieved. Many workpieces are difficult to secure because of their nature; for example, the workpieces may be thin walled and delicate which can lead to distorting the finished part from clamping forces exceeding the material's properties. Parts that are very small, or having a low profile (i.e., height dimension), can interfere with the traditional machining process, as such workpieces present a challenge in securing the workpiece, as it may be difficult to restrain such a workpiece in a way that a cutting tool will not collide with the work holding clamps. The part may be dislodged with such a collision, or the machining forces may pull the workpiece free of the work holding, both of which are undesired. It is also very costly to repair a machine tool which may be damaged by such a collision.

Frequently, parts must be machined to extremely tight dimensional tolerances to attain their final desired use; thus necessitating a work holding system that is capable of securing the workpiece, without distorting the final shape. When analyzing the cost of producing a part many factors are considered, such as the quantity of parts. It is often too expensive and time consuming to create custom work holding for a low quantity of parts. An engineer wishing to have their parts manufactured will often send out multiple quote requests from different manufacturers who are capable of producing said parts. If a part is requested in a quantity of one, some manufactures will simply refuse to quote low volumes, as they cannot produce the part cost efficiently. Often times this is because the custom work holding required will cost many times more than a single part to produce.

This leads to the manufacturer who does receive the part order trying to come up with a way to produce it efficiently, and often times makes little to no profit. The part needs to be produced, and the manufacturer needs work to pay for a machine tool that can cost many thousands of dollars. Even with quantities of fifty to one hundred parts, often times the return on investment of building dedicated custom work holding for a particular job will take many repeat orders to recoup the cost.

Accordingly, there is a need for flexible system for holding workpieces, where the work holding system is capable of rapid adjustment, and therefore can quickly be adjusted to accommodate a wide variety of shapes, sizes and materials to be held in the work holding system. There is further a need for a modular machine tool work holding system that allows the use of one or more clamping devices, and is capable of being used with a several embodiments of clamping devices, useful for immovably securing a work piece for machining.

With such a modular work holding system, a machinist or programmer can analyze the work to be done and apply the modular work holding system, to efficiently and effectively hold a workpiece. Furthermore, multiple blanks may be processed, as the machining work can be repeated by positioning the workpiece or workpieces to a known reference location on the base plate. The work holding system may be adapted to what is commonly referred to as a lathe in a horizontal or vertical configuration, as well as a mill in a horizontal or vertical configuration. The various base plate embodiments and the embodiments of the clamping units described herein can hold a variety of shapes and sizes that would otherwise require dedicated custom work holding.

SUMMARY

In view of the aforementioned shortcomings, an object of the invention, among others, is to provide a work holding system that is flexible in the shapes, sizes and materials the work holding system is able to accommodate. Additionally, the work holding system described herein allows rapid changes to accommodate a variety of shapes and sizes, and is not limited to holding a single application shape. Additionally, in an embodiment, a work holding system should be capable of securely holding the work piece, and further providing reliable known reference points that allow reproducible production of multiple blanks, according to the teachings herein. The work holding systems described herein may utilize various forms of clamping devices described herein. The work holding system may comprise a base plate, providing a plurality of T-slots aligned along a plurality of axes lying in a plane, where each T-slot is aligned along an axis. In an embodiment, the base plate may be affixed to a T-slot table on a machine. In another embodiment, the base plate may replace the standard T-slot table on a machine.

In one exemplary embodiment, the invention comprises a base plate having a plurality of T-slot shaped grooves running on what are referred to as the X axis and Y axis. In an alternate exemplary embodiment, the invention comprises a plurality of T-slot shaped grooves running on axes arranged radially in a round configuration. The object of the invention is to support affixing a workpiece immovably to the base plate. In an embodiment, the object of the invention may also be to affix an embodiment of a base plate immovably to the machine tool table. The work holding system may utilize one or more clamp embodiments. The various clamp embodiments may provide high holding forces, or progressive pressure, as appropriate, and may depend upon the strength of the part to be machined and its physical properties. The work holding systems described herein may provide the capability of holding a workpiece on its inside or outside periphery, or both at the same time. The work holding systems described herein may provide a means of securing a wide variety of blanks and workpiece shapes, from traditionally shaped rectangular prism workpieces, to thin walled, delicate workpieces having dimensions that would be difficult to secure with previously known clamping mechanisms, such as ring-shaped, or non-linearly faced workpieces that otherwise would require a custom solution on a per part basis. For example, in an embodiment, the work holding system may provide one or more pivoting clamps that are free from the constraints of conventional unidirectional clamping. The pivoting clamps can hold a vast array of workpiece geometries without the need to create special work holding on an individual part basis. Additionally, the workholding system may provide one or more wedge clamps that utilize a downward force applied by a fastener, which is translated into securing against and pulling down of the workpiece against the worksurface.

Furthermore, the embodiments described herein provide for work stops that allow for repeatable positioning of workpieces that can be applied before or after the workpiece is affixed to the base plate, work stops that can also be machined as an integral part of the work holding system. Said work stops are a time saving feature of this work holding system that are often required to be custom machined as an integral part of other work holding methods, such as building what is referred to as a fixture.

Still further, the embodiments described herein provide for T-slot protectors that can be inserted into a T-slot groove, to keep what are commonly referred to as swarf or chips in the machining process from entering the grooves within the base plate's top surface, which is undesirable. Swarf that enters a T-slot can prevent further positioning of clamping units and impedes production, and must be cleaned out for further use, which can be laborious and time-consuming. Additional time savings in machining workpieces can be achieved through the use of various embodiments described herein combined with zero-point clamping for repeatable interchange of base plates to increase productivity. A modular system that allows for affixing a multitude of otherwise difficult and time consuming to secure workpieces.

In accordance with embodiments of the present disclosure, an elongated T-slot protective device is provided having an elongated form, presenting a member having a body, a pair of sidewalls and a pair of legs. The protective device may be placed into an elongated opening of a t-slot, and may cover the elongated opening to prevent debris from entering the T-slot formed in a work surface.

In an embodiment, the elongated T-slot protective device has a body that has an upper surface with a concave profile. The protective device may also have a pair of substantially planar sidewalls terminating in an upper radiused surface and a lower radiused surface, and each of the pair of legs are separated by a concave undersurface. The concave profile of the upper surface presents a first radius of curvature, and the concave undersurface presents a second radius of curvature that is smaller than the first radius of curvature.

In an embodiment, each of the upper and lower radiused surfaces of the protective device may extend laterally beyond a plane defined by the pair of substantially planar sidewalls. The lower radiused surface may then engage an inside surface of the T-slot that is perpendicular to the pair of sidewalls of the protective device.

In an embodiment, the T-slot has a pair of upper surface chamfers, located at the juncture of the T-slot and the work surface, and the upper radiused surfaces of the protective device may abut against at least one of the pair of upper surface chamfers, without extending above the plane of the T-slot work surface. The upper radiused surface may then serve to prevent over-insertion of the protective device into the T-slot.

In an embodiment, the protective device has a pair sidewalls that are compressible, whereupon each of the legs that make up the pair of legs are urged toward each other. The elongated T-slot protective device may be directed into the T-slot through a linear opening at the top of the T-slot while in a compresses state, whereupon the protective device may resiliently seek to spring back from the compressed state, securing the protective device, so that it may removably reside within the T-slot in a friction fit manner.

In an embodiment, the elongated T-slot protective device is an elongated extruded member is deformable. The elongated extruded form may have a length that is readily adjustable by hand, and may be readily adjustable by the use of simple tools, such as a cutting blade and scissors.

In an embodiment, the elongated T-slot protective device may be an extruded material. In an embodiment, the elongated T-slot protective device is a material that is one of silicone rubber, latex, natural or vulcanized rubber, neoprene, polypropylene, polyethylene, polycarbonate, nylon, polytetrafluorothylene, polyetheretherketone, polyoxymethylene, or acrylonitrile butadiene styrene.

In an embodiment, the elongated T-slot protection device may conform to dimensions of both the T-slot having imperial dimensions and metric dimensions.

In an embodiment, the elongated T-slot protection device may further have a temperature resistant strip, or a temperature or chemically resistant coating, such as a fluoroelastomer coating, that is bonded to a top surface of the device.

BRIEF DESCRIPTION OF THE DRAWINGS

The embodiments herein may be better understood by referring to the following description in conjunction with the accompanying drawings in which like reference numerals indicate identically or functionally similar elements, of which.

Figure 1:
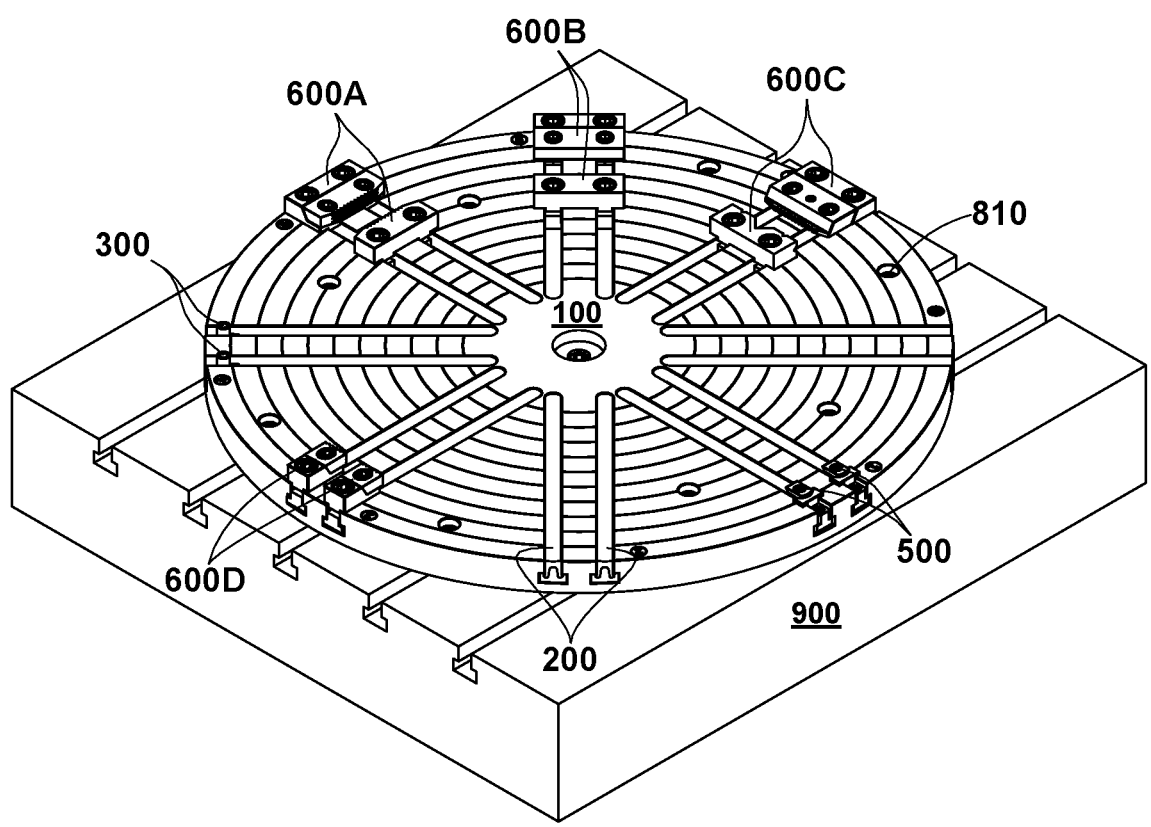
FIG. 1 is a perspective view of an exemplary embodiment of the work holding system in a round configuration depicting various exemplary embodiments of clamps positioned within a plurality of T-slots, and affixed to a machine tool table.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, an exemplary embodiment of the present disclosure will be described in detail with reference to the accompanying drawings. As those skilled in the art would realize, the described embodiment may be modified in various different ways, all without departing from the spirit or scope of the present disclosure. Further, throughout the specification, like reference numerals refer to like elements.

The terminology used herein is for the purpose of describing a particular exemplary embodiment only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The invention is explained in greater detail below with reference to embodiments of a modular machine tool workholding system. This invention may, however, be embodied in many different forms and should not be construed as limited to the embodiments set forth herein; rather, these embodiments are provided so that this disclosure will be thorough and complete and still fully convey the scope of the invention to those skilled in the art.

Referring now to an exemplary embodiment of the present disclosure, a modular machine tool workholding system 1 as discussed herein, and generally shown in FIG. 1 may include some or all of the following components: a base plate 100 provided with a plurality of T-slots, and one or more clamp components suitable for securing a workpiece to a base plate, where the clamp components may be secured to the base plate within a T-slot. In an exemplary embodiment, the one or more clamps provided as part of the workholding system may be in the form of one or more of the various clamp components described herein, for example, a pivoting clamp 500, a serrated hard jaw wedge clamp 600A and stop, a smooth faced, soft jaw wedge clamp 600B and stop, a low profile serrated hard jaw wedge clamp 600C and stop, and/or a single slot serrated hard jaw wedge clamp 600D. Though it is contemplated that the work holding system may be employed with any of the clamps known by those skilled in the art as suitable for use in clamping a workpiece, and secured within a T-slot. In an exemplary embodiment, the workholding system may optionally provide one or more of: a T-slot chip guard 200; and/or a T-slot work stop 300. The features and operation of these workholding components will be discussed below, Now with reference to the exemplary embodiments depicted in FIGS. 1-17, the modular machine tool workholding system 1 will be discussed referencing a plurality of configurations.

Figure 2:
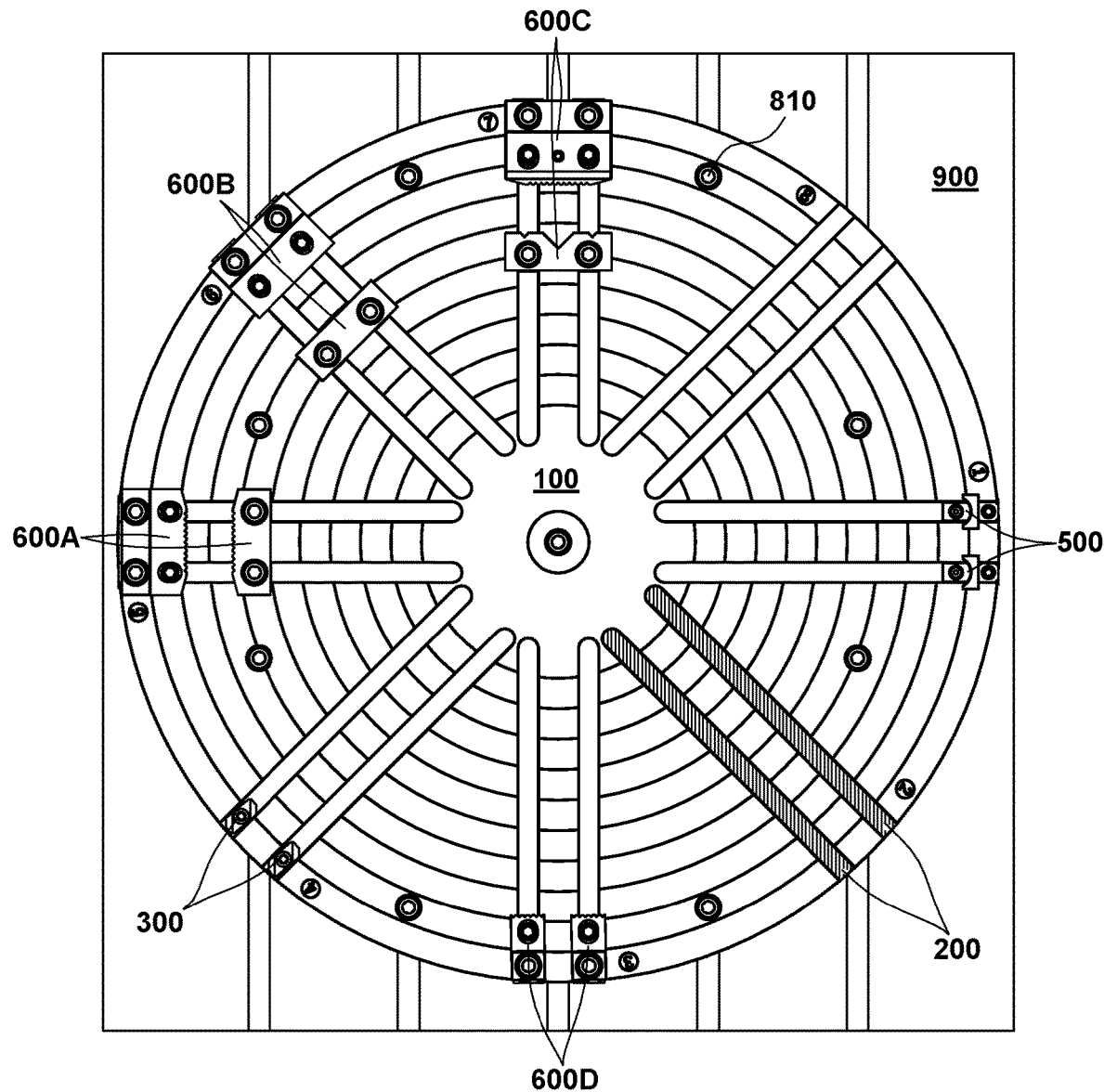
FIG. 2 is a top view of the exemplary embodiment of FIG. 1.
Figure 3:
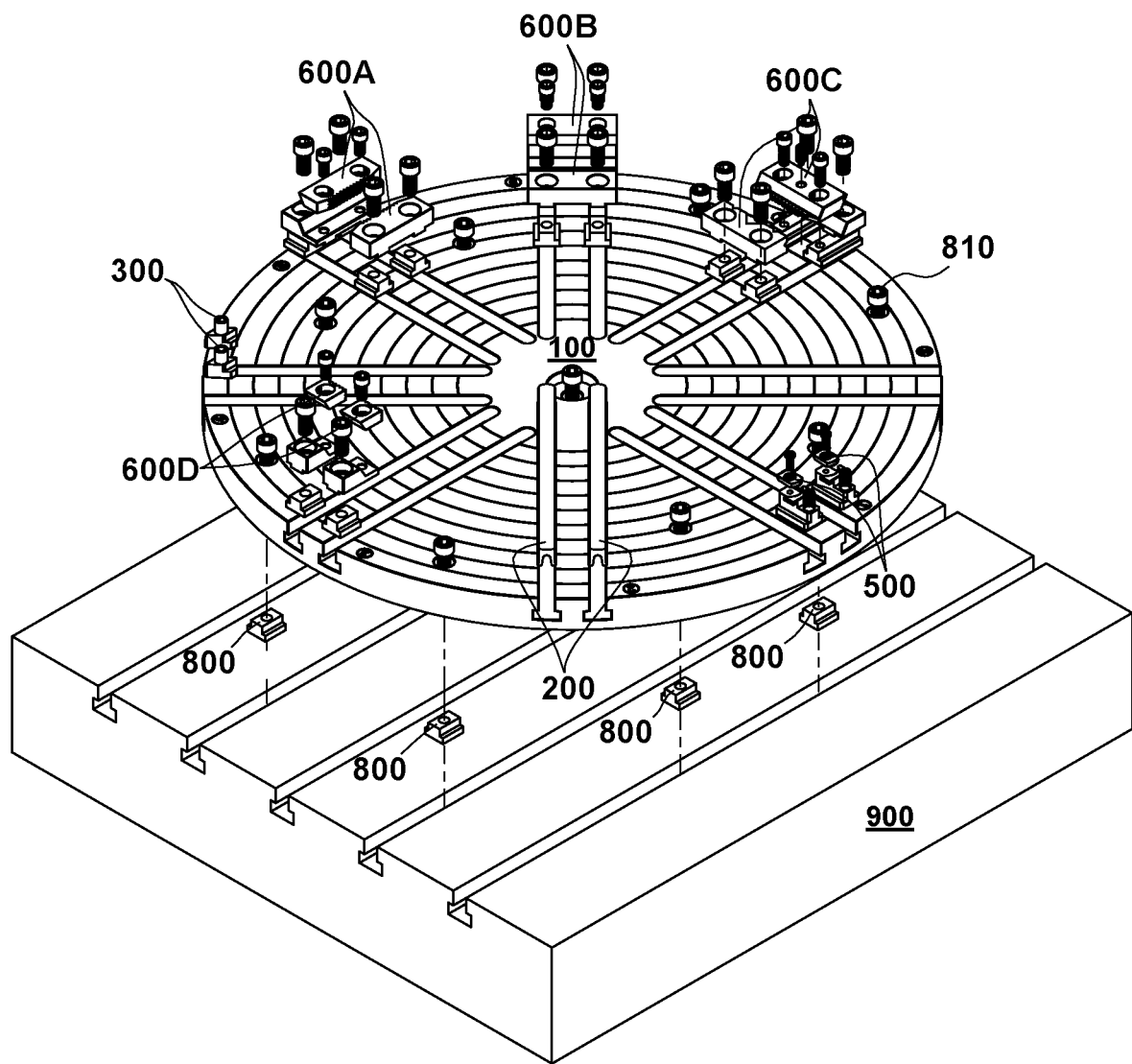
FIG. 3 is an exploded perspective view of the exemplary embodiment of FIG. 1.

As can be seen in the exemplary embodiment depicted in FIGS. 1-3, there may be provided a round base plate embodiment of 100, the workholding system embodiment depicted may have one or more of a clamp, a work stop, and/or a chip guard. The embodiment of the round base plate 100, as depicted, provides a plurality of T-slots, shown here arranged as T-slot pairs, where each pair of T-slots are aligned radially about the center of the round base plate. In the exemplary embodiment shown, the base plate provides eight pairs of T-slots, though it is contemplated that more or less pairs of T-slots may be provided. Additionally, it is contemplated that T-slots, as an alternative to paired T-slots, sets of T-slots that are aligned in parallel may number more than 2; for example a triple set of T-slots is contemplated, where a workholding element, such as clamp, can be deployed and secured within 3 parallel slots aligned adjacently, such that the triple clamp embodiment would be configured to provide a greater clamping force relative to the clamping force that can be applied by a unitary clamp that is secured within a single T-slot, or even dual T-slots. Each of the T-slots are aligned along an axis, with each of the T-slots comprising a pair being aligned along parallel axes. As can be seen, in FIG. 2, each of the pairs of T-slots are arranged radially, dividing the round base plate into equal sections, though it is contemplated that the round base plate may alternatively be divided into unequal sections. In the embodiment shown, the T-slots pairs extend generally in a radial fashion outwards to the perimeter of the base plate, and are extended towards the center of the round base plate, but, as shown, each of the T-slots is terminated prior to intersecting with another adjacent T-slot. In another embodiment, it is contemplated that the T-slots may intersect adjacent T-slots, and it is further contemplated that the T-slots may extend completely across the round base plate, having T-slot openings located at each of the outer edges of the round base plate, such that the axis the T-slot is in alignment with would form a chord of the round plate. As will be discussed below, it is contemplated that one or more of the T-slots provided in the round base plate embodiment may extend through the center of the round base plate, along an axis that forms a diameter of the round base plate, or alternatively the T-slot may not extend fully to the center, but may remain in alignment with an axis along the diameter of the circle.

In any of the embodiments having a base plate provided with a T-slot, the T-slot may have an opening (as can be seen, for example, in FIG. 1) where the T-slot encounters the edge, or each edge, as appropriate, of the base plate. Such a T-slot opening would present the same profile as the length of the T-slot, and the opening allows components, such as clamp components, work stops, chip guards, and T-nuts, for example, to be directed into the T-slot through the T-slot opening.

As shown in FIG. 1, one or more base plate securing fasteners 810, as may be known in the art, may be provided to secure the base plate 100 to a work surface, depicted here as T-slot table 900. As shown in FIG. 3, the fasteners may be in the form of a cap screw or other threaded fastener providing a threaded body and a head as known in the art. In an embodiment, the base plate securing fasteners 810 are threaded into a T-nut 800 that has been inserted into the slots of the table 900. Alternatively, the base plate securing fasteners 810 may be threaded directly into a correspondingly threaded receiving hole (not shown) within the table 900, or the base plate securing fasteners 810 may extend through the table 900, and threaded into a corresponding nut component that may be tightened against the underside of the table 900, to secure the base plate 100 against the table 900. The various components that may beneficially be provided as part of the workholding system are shown in exploded perspective view, in FIG. 3, and the details of the various components, such as various forms of clamps (600A-D, 500), work stops 300, chip guards 200 will be discussed below.

Figure 4:
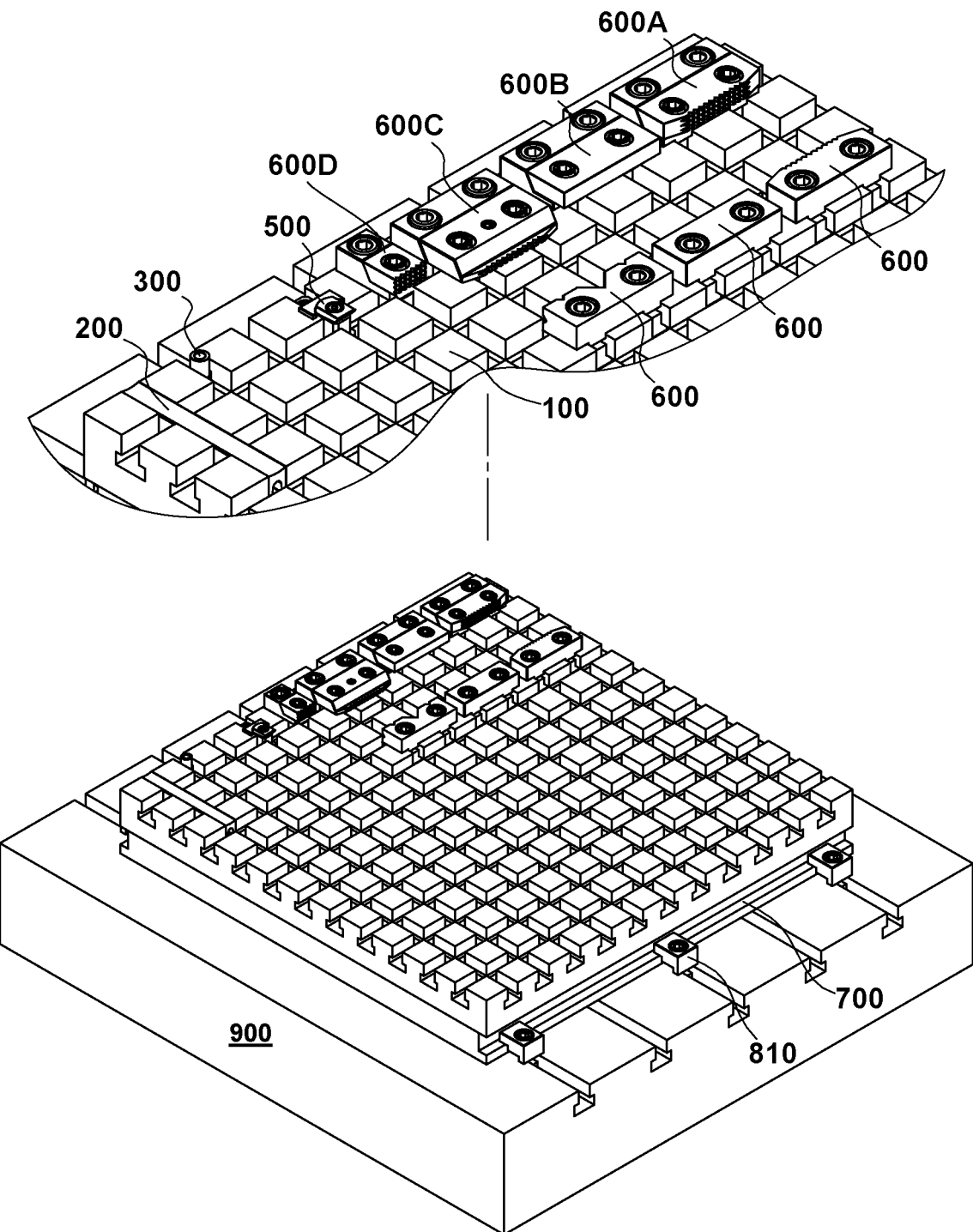
FIG. 4 is a perspective view of an exemplary embodiment of a base plate in a square configuration with a plurality of T-slot grooves aligned on the X axis, as well as grooves aligned on the Y axis, various exemplary embodiments of clamps positioned within a plurality of T-slots are depicted, with the base plate affixed to a machine tool table; and further depicts a partial enlarged view of the base plate embodiment, and various clamp embodiments.
Figure 5:
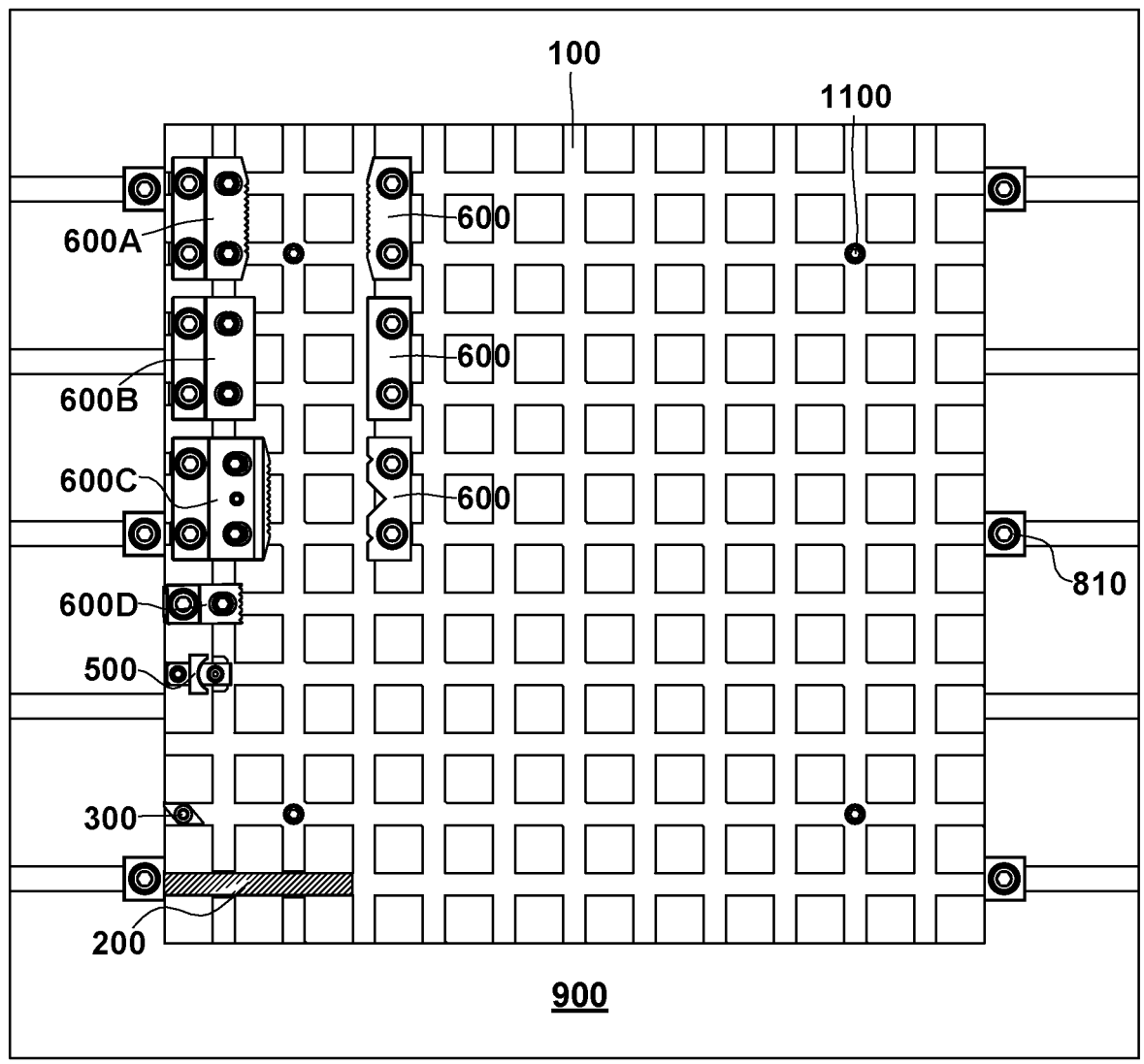
FIG. 5 is a top view of an exemplary embodiment of the base plate of FIG. 4.
Figure 6:
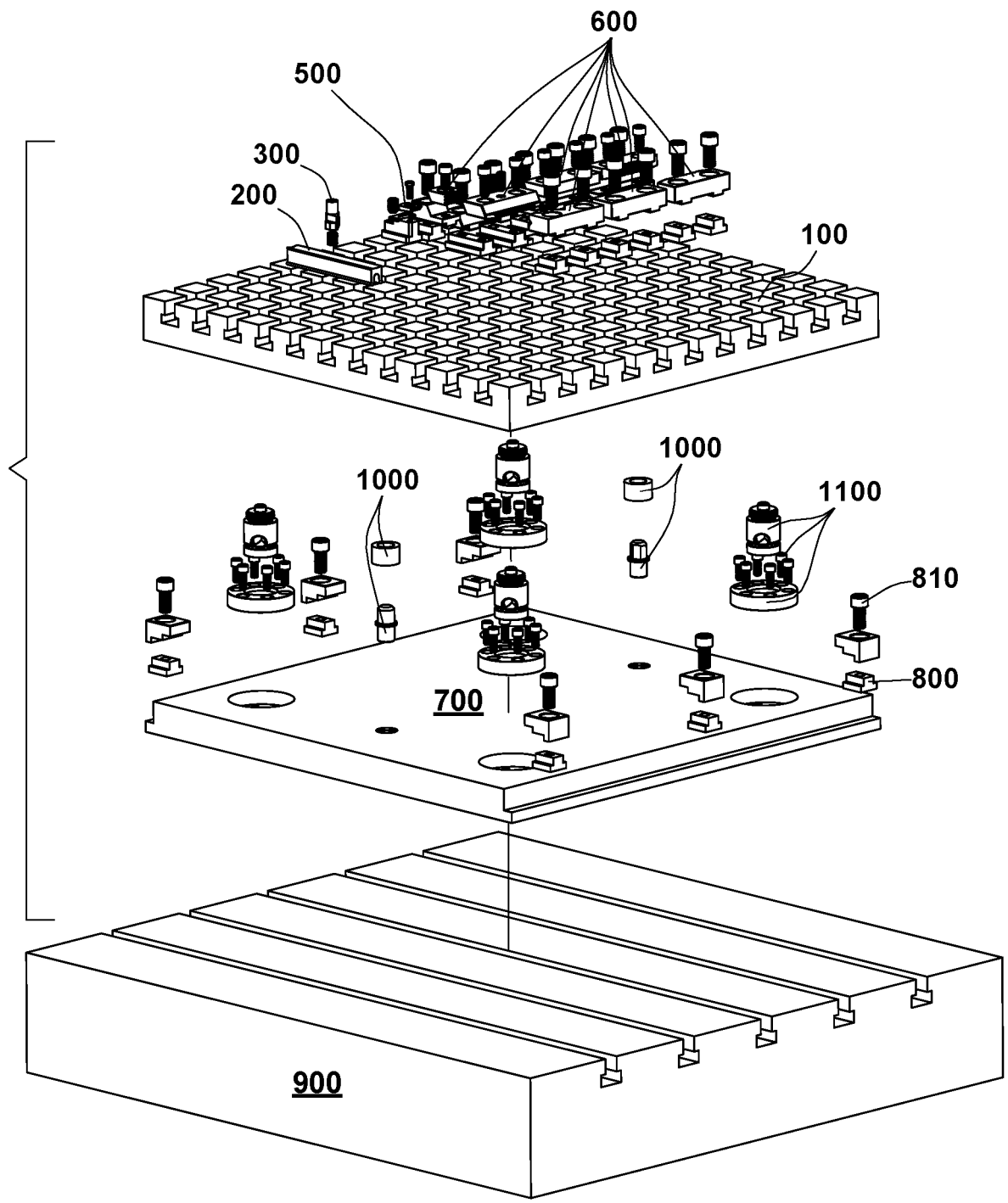
FIG. 6 is an exploded perspective view of the exemplary embodiment of the work holding system and components of FIG. 4, and further depicts an embodiment of zero-point clamping provisions for mounting the work holding system to a machine tool table.

In an alternate exemplary embodiment, depicted in FIGS. 4-6, there is depicted a rectangular embodiment of a base plate 100, providing a plurality of T-slot grooves aligned along multiple axes. In this embodiment, the base plate is depicted as a square, but it is contemplated that alternate sizes and shapes of base plates may be provided. As depicted in FIG. 4, the slots provided may be in alignment with either an X or Y axis, that are perpendicular to each other as commonly understood, in the plane of the base plate. It is contemplated that alternative slot alignments are possible and may easily be substituted for the depicted embodiments. For example, as was described with the round base plate embodiment of FIGS. 1-3, it is contemplated that the square base plate may be provided with T-slots or T-slot pairs extending radially from a center point of the base plate. Similarly, the round base plate embodiment may alternatively be provided with a plurality of T-slots that are in alignment with the X- or Y-axis, that are perpendicular to each other, simply by overlaying the slot pattern depicted in FIG. 4 onto the round base plate.

As depicted in FIG. 4, the inclusion of T-slots aligned with the X and Y axis provides the benefit of increasing the indexing locations and orientations (e.g. by being aligned along either axis) suitable for placement of the clamping devices, in order to secure a variety of shaped workpieces. It should also be mentioned the spacing of the T-slot grooves is denser than is typically found on machine tables providing T-slot grooves, thereby adding functionality, as the allows more refined placement of clamps or other components on the base plate. The increase in T-slot density can be seen by comparing the spacing between parallel slots on the base plate 100 of FIG. 4, relative to the spacing between the T-slots on the table 900. It is contemplated that multiple base plates may be joined together, or secured near, or adjacent to each other on the machine T-slot table surface 900, thereby serving to cover more of the machine table surface, and increasing the area of the work surface available for the work holding system.

Referring now to an exemplary embodiment of the present disclosure, a modular machine tool workholding system 1 as discussed herein, and generally shown in FIG. 4-6 may include some or all of the following components: a base plate 100 provided with a plurality of T-slots aligned along perpendicular axes "X" and "Y" as is commonly understood in the industry, and one or more clamp components suitable for securing a workpiece to the base plate, where the clamp components may be secured to the base plate within a T-slot. In an exemplary embodiment, the one or more clamps provided as part of the workholding system may be in the form of one or more of the various clamp components described herein, for example, a pivoting clamp 500, a serrated hard jaw wedge clamp 600A and stop, a smooth faced, soft jaw wedge clamp 600B and stop, a low profile serrated hard jaw wedge clamp 600C and stop, and/or a single slot serrated hard jaw wedge clamp 600D. Though it is contemplated that the work holding system may be employed with any of the clamps known by those skilled in the art as suitable for use in clamping a workpiece, and secured within a T-slot. In an exemplary embodiment, the workholding system may optionally provide one or more of: a T-slot chip guard 200; and/or a T-slot work stop 300.

As can be seen in FIG. 5, a square embodiment of base plate 100 is depicted as having fastener receiving base plate securing fastener through-holes 1100. The fastener receiving through-holes 1100 as depicted in FIG. 6 provide an optional means of applying zero-point clamps 1100, as generally understood by those skilled in the art. Zero point clamps provide a clamp mechanism that will simultaneously locate the clamped element precisely, and allowing rapid and accurate component exchanges, such as replacing a base plate with another base plate, where there is a need for the plates to be precisely clamped in the same location on one or more machines for processing. Alternatively, or in combination with zero point clamps 1100, the use of docking rings and pins 1000 can be used to securely locate base plate 100 to a sub-plate 700 which can be temporarily fixed to, or permanently fixed to the machine tool's table, utilizing fasteners as previously described, or alternatively, using fasteners that fit through clamping elements to grip the edge of the sub-plate 700, as can be seen in FIGS. 4-6. The use of locating devices, alone or in combination can provide repeatable relocation of the assembly for off-line loading of workpieces, or machining of workpieces in stages on multiple machines, thereby further increasing production and preserving quality of the machining.

Figure 7:
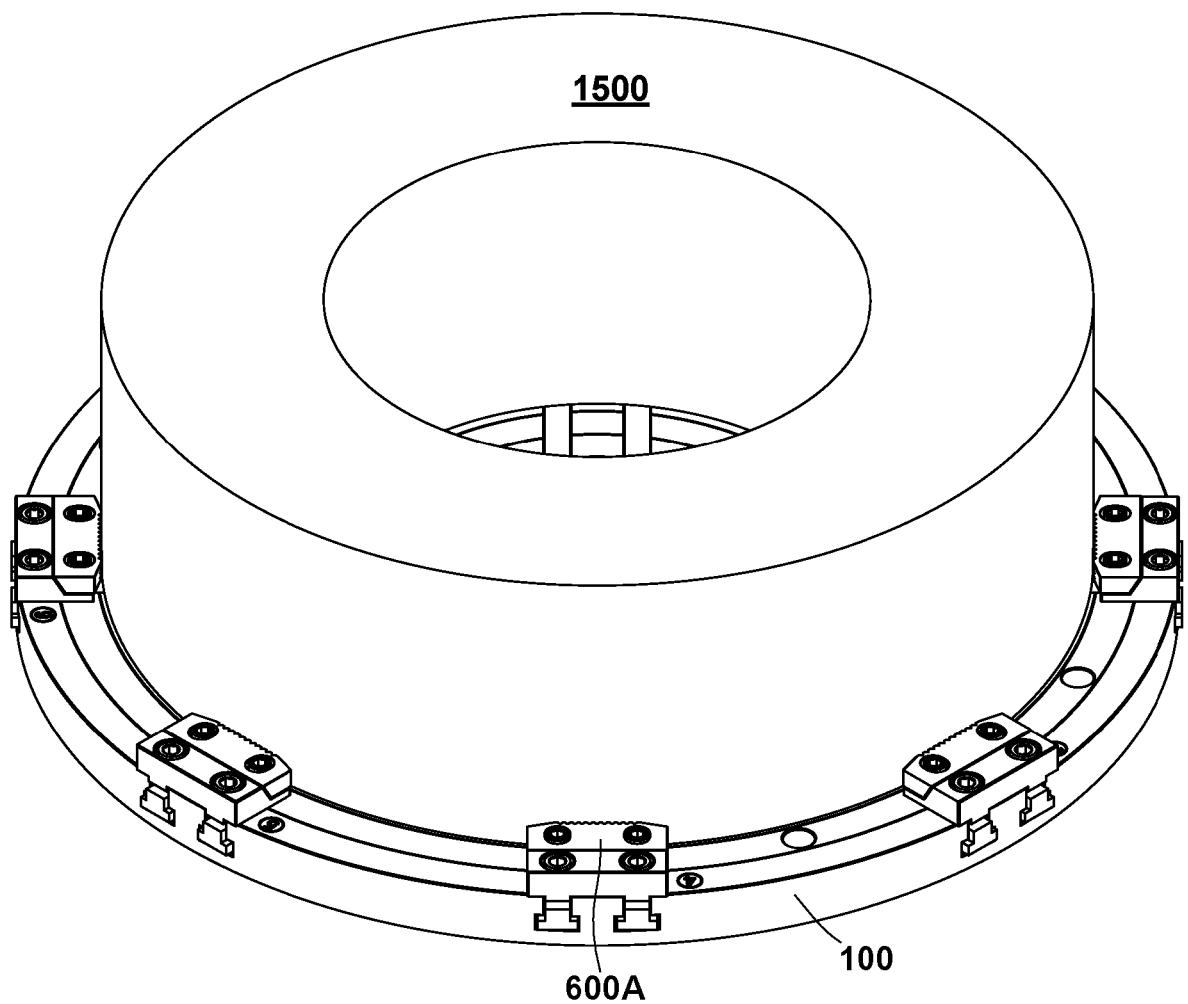
FIG. 7 is a perspective view of an exemplary embodiment of a work holding system depicting an exemplary embodiment of serrated hardened jaw configuration clamps suitable for use with the work holding system, and holding a workpiece securely on the base plate.

The use of the work holding system is shown in the exemplary embodiment depicted in FIG. 7, having a round base plate 100 and a plurality of clamp components. In this exemplary embodiment, the serrated hard jaw wedge clamp 600A is depicted securing a workpiece 1500, though it is contemplated that alternative clamp embodiments may be utilized similarly, so long as the workpiece 1500 is held securely in place for machining. As taught in FIG. 1, the round base plate may be secured to a slot table of a CNC machine. The workpiece 1500 depicted in FIG. 7 is of round exterior shape, and shown having been secured with five clamps depicted, though another 3 clamps would be hidden behind the workpiece, hidden by the perspective view. Thus, the workpiece would be clamping at 8 points equally spaced around the perimeter of the workpiece. Traditionally, round workpieces as shown in FIG. 7 would be held with a lathe chuck, as is generally known and understood in the industry, for processing on a machine. The use of the work holding system of FIG. 7 may provide the benefit of securing a large diameter workpiece, by employing a plurality of any of the clamp components described herein to clamp against the exterior surface, and optionally, against an interior surface of the round workpiece. In contrast, the use of a traditional lathe chuck to secure such a workpiece would limit the size of the workpiece that can be clamped, as a lathe chuck is a complex mechanism for holding round workpieces and often limited in its dimensional capacity, due to the complexity and cost of manufacturing a large lathe chuck. Furthermore, producing a lathe chuck that provides eight or more jaw stations, to match the number of clamping locations as shown in FIG. 7, on a round workpiece of a large diameter, is even more unrealistic in manufacturing, due to the complexity and cost of manufacturing a chuck incorporating eight jaws.

Figure 8:
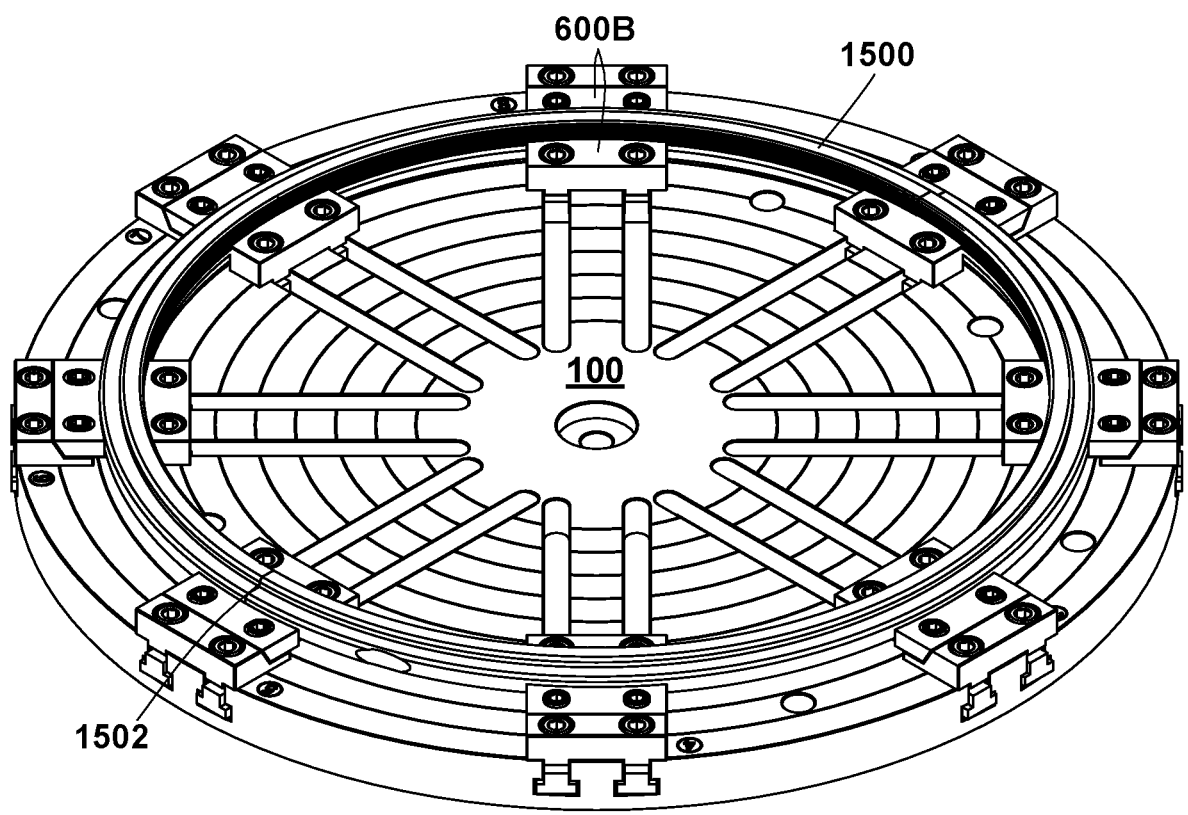
FIG. 8 is a perspective view of an exemplary embodiment of a work holding system depicting an exemplary embodiment of clamps suitable for use with the work holding system, and holding a workpiece both internally and externally for finishing operations.

The use of the work holding system is shown in the exemplary embodiment depicted in FIG. 8, having a round base plate 100 and a plurality of clamp components. In this exemplary embodiment, there is depicted a plurality of soft jaw wedge clamps 600B and respective stops fastened within T-slots, securing a workpiece 1500 to a round base plate 100; though it is contemplated that alternative clamp embodiments may be utilized similarly, so long as the workpiece 1500 is held securely in place for machining. As taught in FIG. 1, the round base plate may be secured to a T-slot table of a CNC machine. In the depicted embodiment of FIG. 8, the workpiece 1500 is a large diameter ring that has a thin wall in relation to its size, as well as being split 1502, and secured together within the plurality of soft jaw clamps 600B. It is preferred to hold such a ring shaped workpiece 1500, having a relatively this wall, relative to its size, at as many points of contact as possible, and further provide stops for the clamps to press against, so as to minimize distortion of the workpiece dimensions, as a thin-walled workpiece, when clamped by traditional clamping techniques would tend to distort or dent easily, analogous to grasping an aluminum beverage can too tightly, and creating a dent or distortion in the sidewall. The embodiment of a soft jaw clamp 600B and stop, depicted in FIG. 8, may optionally be machined to take on the profile that accommodates the shape of the work piece. The machined clamp profile is most evident in the left and right most clamps in FIG. 8, due to the perspective view, but it is contemplated that machining all of the clamps to the corresponding profile of the workpiece would allow the clamps to secure the workiece without creating distortion in the workpiece when clamped, as would tend to occur where a flat faced clamp is securing a round, thin wall workpiece as shown. Such a machinable clamp component may be made of a material suitable for machining, such as aluminum, or steel, or brass. By providing a soft jaw wedge clamp 600B with jaws that have been machined to match the rings finished inner and outer diameters, contact can be achieved sufficient in maintaining the ring's roundness when applying high holding forces to secure it in place. Additionally, the workpiece 1500 is secured on both internal and external dimensions over the area that encompasses the split 1502 in the workpiece, thereby ensuring that there is no opportunity for the workpiece portions adjacent to, and on opposite sides of the split 1502 to move relative to each other.

Figure 9:
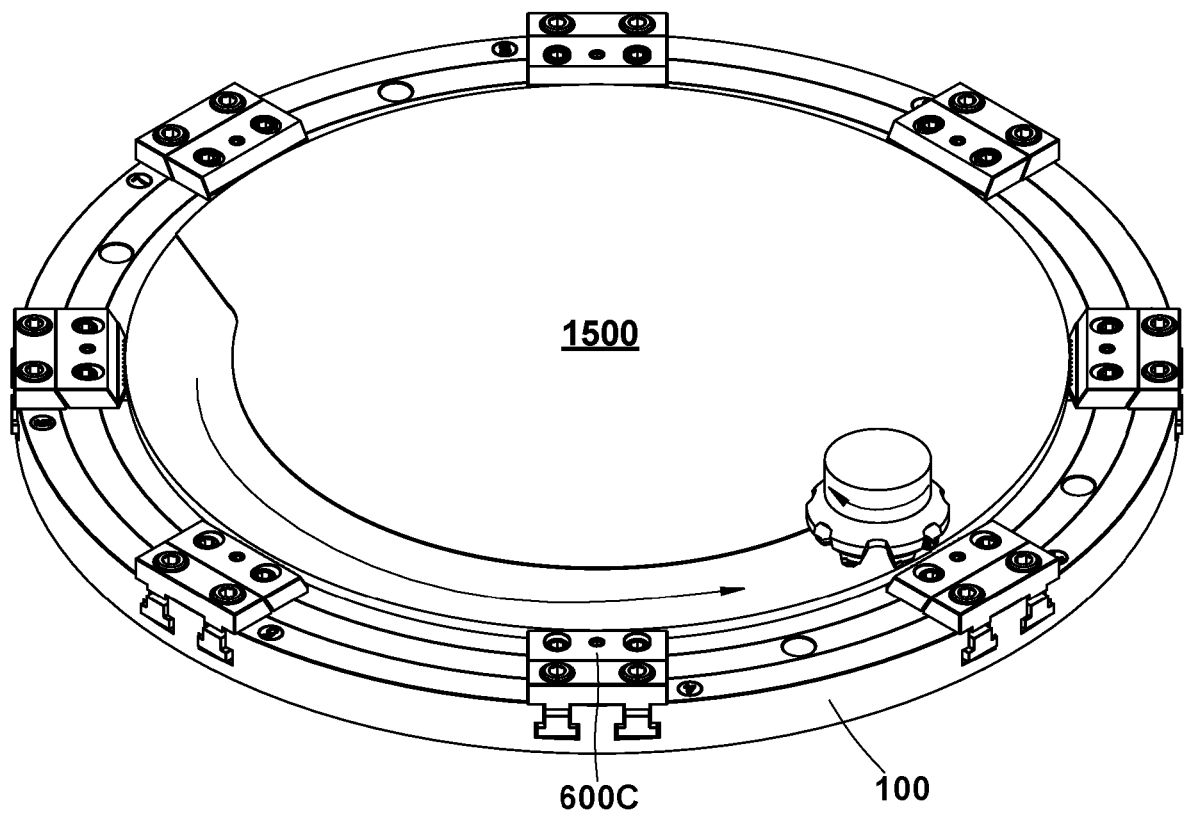
FIG. 9 is a perspective view of an exemplary embodiment of a work holding system depicting an embodiment of clamps in low-profile configuration and holding a workpiece by a small margin to allow a milling cutter to pass unobstructed over the workpiece.

The use of the work holding system is shown in the exemplary embodiment depicted in FIG. 9 having a round base plate 100, and a plurality of clamp components. In this exemplary embodiment, there is depicted a plurality of low profile serrated hard jaw wedge clamps 600C fastened within T-slots in the base plate, and securing a large diameter workpiece 1500 depicted as a large round, plate, presenting a short sidewall. As depicted in FIG. 9, the workpiece is to be machined in order to reduce its thickness, in a process referred to as "facing", that requires the milling of the entirety of the upper surface. This is typically very difficult without the use of a specialized form of chuck that uses vacuum, which are generally known in the industry, to secure the workpiece, where the workpiece is of nonmagnetic materials, as the cutting tool must pass beyond the outer diameter of the workpiece, without contacting the work holding. As depicted in FIG. 9, the clamps 600C are of a low profile, where the clamp is able to be secured against the lower portion of the workpiece, and the bulk of the clamp is setback somewhat from the workpiece, in order to provide the needed clearance for machining the entirety of the face of the workpiece. A description of the low profile clamp will be provided below.

Figure 10:
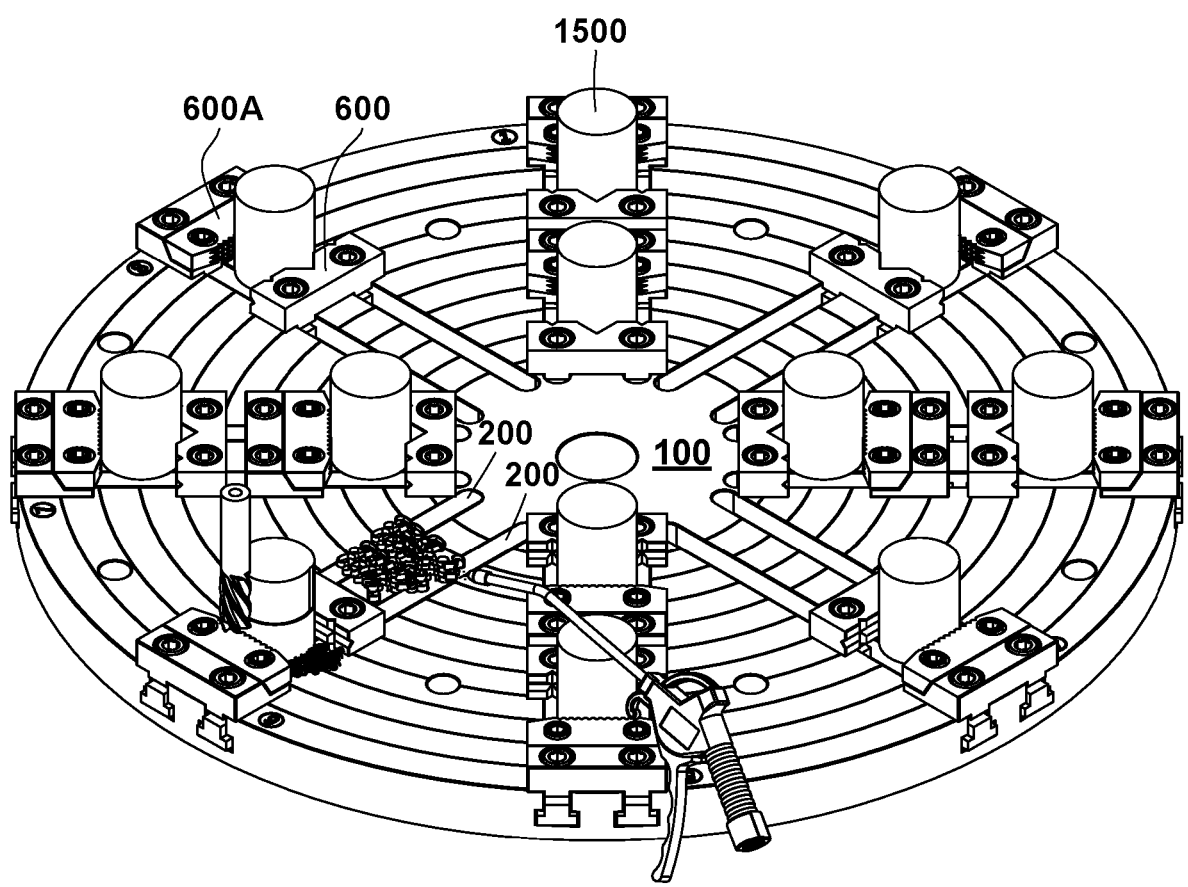
FIG. 10 is a perspective view of an exemplary embodiment of a work holding system depicting a round base plate configuration to hold multiple round workpieces, as well as depicting the use of an embodiment of a T-slot chip guard.
Figure 11:
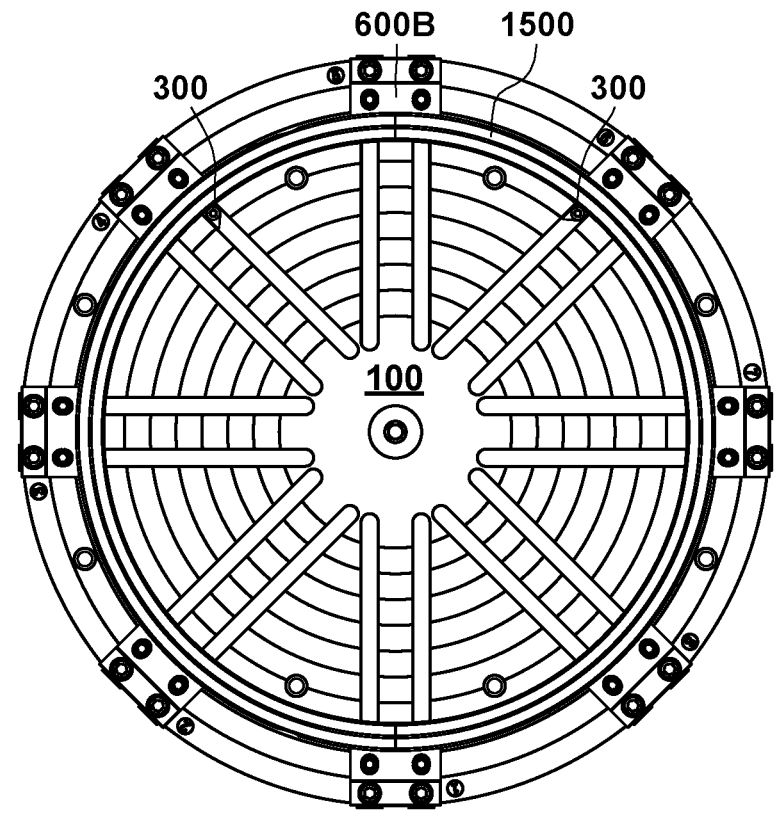
FIG. 11A is a top view of an exemplary embodiment of a work holding system depicting a round base plate holding a workpiece externally.
FIG. 11B is a perspective view of an exemplary embodiment of a work holding system depicting the round base plate adapted to be held in a horizontal lathe application.
Figure 11:
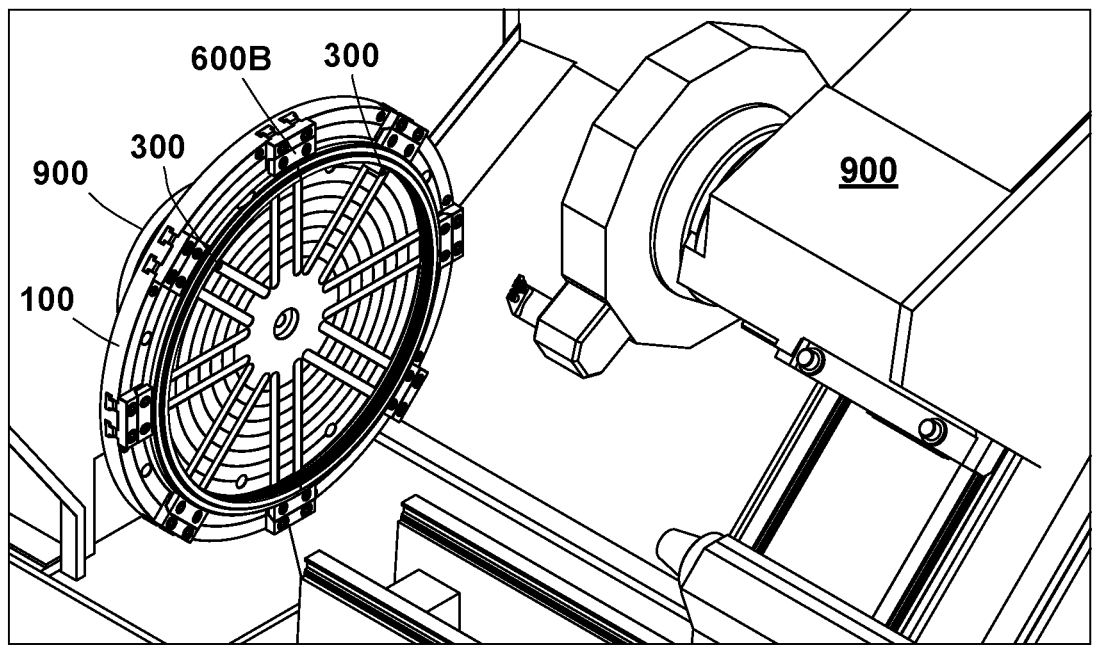

The use of the work holding system is shown in the exemplary embodiment depicted in FIG. 10 having a round base plate 100, and a plurality of clamp components securing a plurality of small diameter workpieces 1500 on the round base plate 100. In this exemplary embodiment, there are depicted several workpieces, each having been secured by a serrated hard jaw wedge clamp 600A and respective stops 600, each having been fastened within T-slots of the base plate, and tightened against the workpieces to hold each in place for milling. It is contemplated that multiple clamps or varieties of clamps may be utilized to secure any of the multiple workpieces on the base plate. In the exemplary embodiment of FIG. 10, the use of a T-slot chip guard 200 as a means of preventing swarf entering the T-slot grooves is depicted. As shown, the use of chip guards will greatly facilitate the post-processing clean up, or the preparation of the base plate for additional work, as the cuttings from the milling ("swarf") will be prevented from entering into the T-slots, and may be easily removed from the base plate surface, using any technique known to those skilled in the art, including the use of brushes, vacuum, or compressed air, as shown, for example. Additional details on the chip guard will be provided below.

The exemplary embodiments of the work holding systems depicted in FIGS. 7-10 are depicted has having a round base plate. It is contemplated that simply be replacing the round base plate with another form of base plate, such as the rectangular base plate whether having radially aligned T-slots or T-slot pairs, or alternatively having T-slots aligned with both the X and Y axes, the workpiece may be securely clamped using any of the clamp forms taught herein, and secured for machining in a similar fashion as has been described previously.

The use of the work holding system is shown in the exemplary embodiment depicted in FIG. 11A having a round base plate 100, and a plurality of clamp components securing a workpiece from the exterior direction. By clamping the workpiece only from the exterior direction, the workpiece may be turned or milled in the interior. As shown in FIG. 11B, the exemplary embodiment of the round base plate with T-slots arranged in radial pairs, as depicted in FIG. 11A, is shown being adapted for use in a horizontal lathe, where the round base plate embodiment 100 is fitted to a rotatable work surface, shown here as horizontal lathe having a lathe chuck 900, and is thereby increasing the capacity of the lathe for holding large diameter workpieces for turning. It is common for a lathe to be equipped with a chuck of a limited capacity, typically six to ten inches in diameter and having a working range of twelve to twenty inches of turning diameter. As discussed previously, increasingly larger capacity chucks are available at much greater additional cost and complexity, though not able to provide the flexibility and number of clamping points relative to the various embodiments described herein. Holding a workpiece that is larger in diameter than the chuck that is used creates unsupported material overhanging the chucks body, which can cause vibration and deflection inherit in such unsupported work, and is undesirable. As depicted in FIG. 11b, the round base plate 100, as it is of a larger diameter than the chuck to which it is attached, when the workpiece is secured to the round base plate with clamps, is able to securely hold the workpiece for milling, or turning, at dimensions that exceed the chuck capacity, thereby effectively increasing the dimensional capacity of the lathe, compared to the use of the lathe with the chuck alone.

Figure 12:
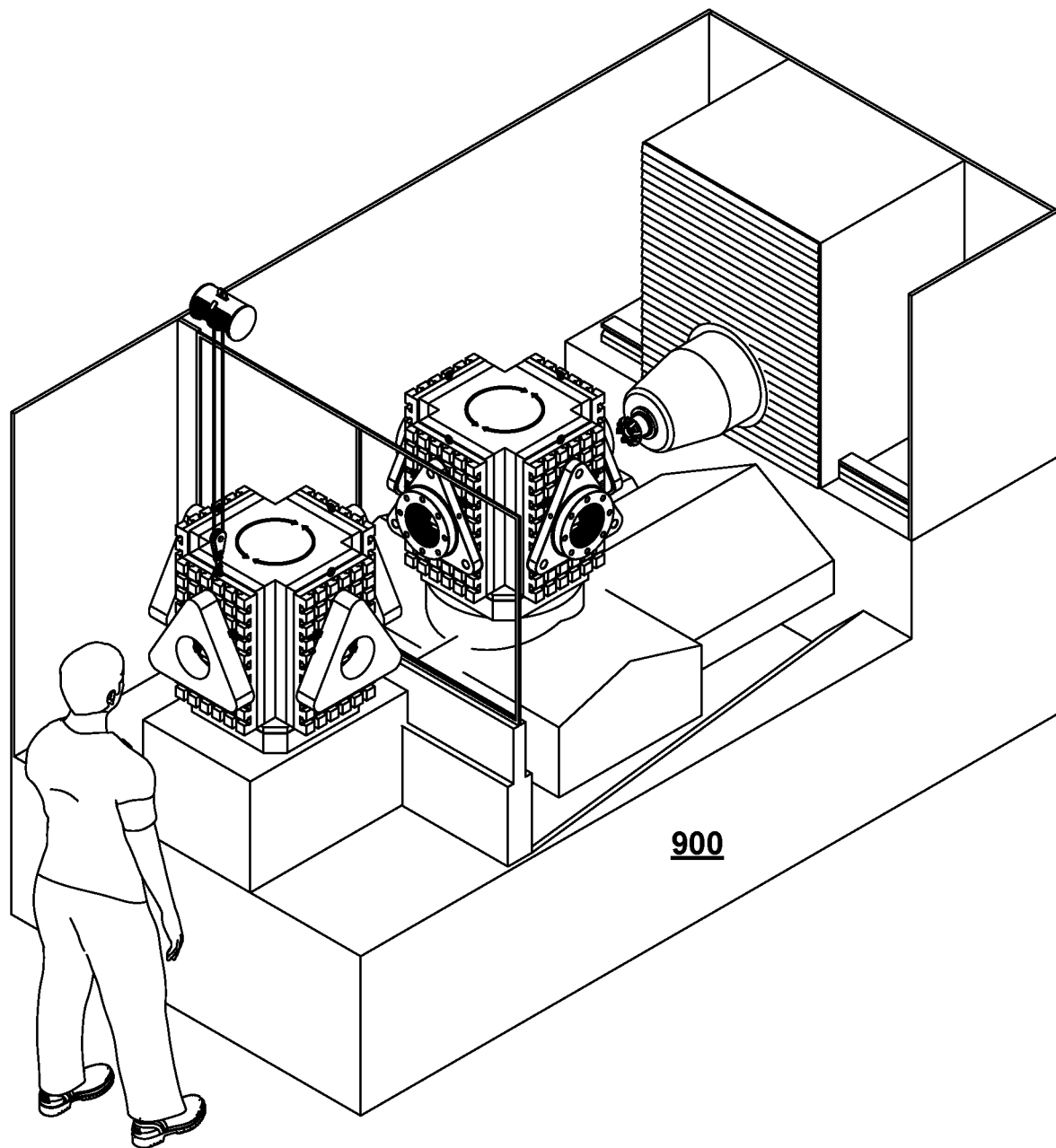
FIG. 12 is a perspective view of an operator tending to what is referred to as a pallet changing horizontal mill, configured to efficiently replace finished parts with parts in a rough state, where the parts are mounted on exemplary embodiments of the workholding system depicting a plurality of rectangular base plates.
Figure 13:
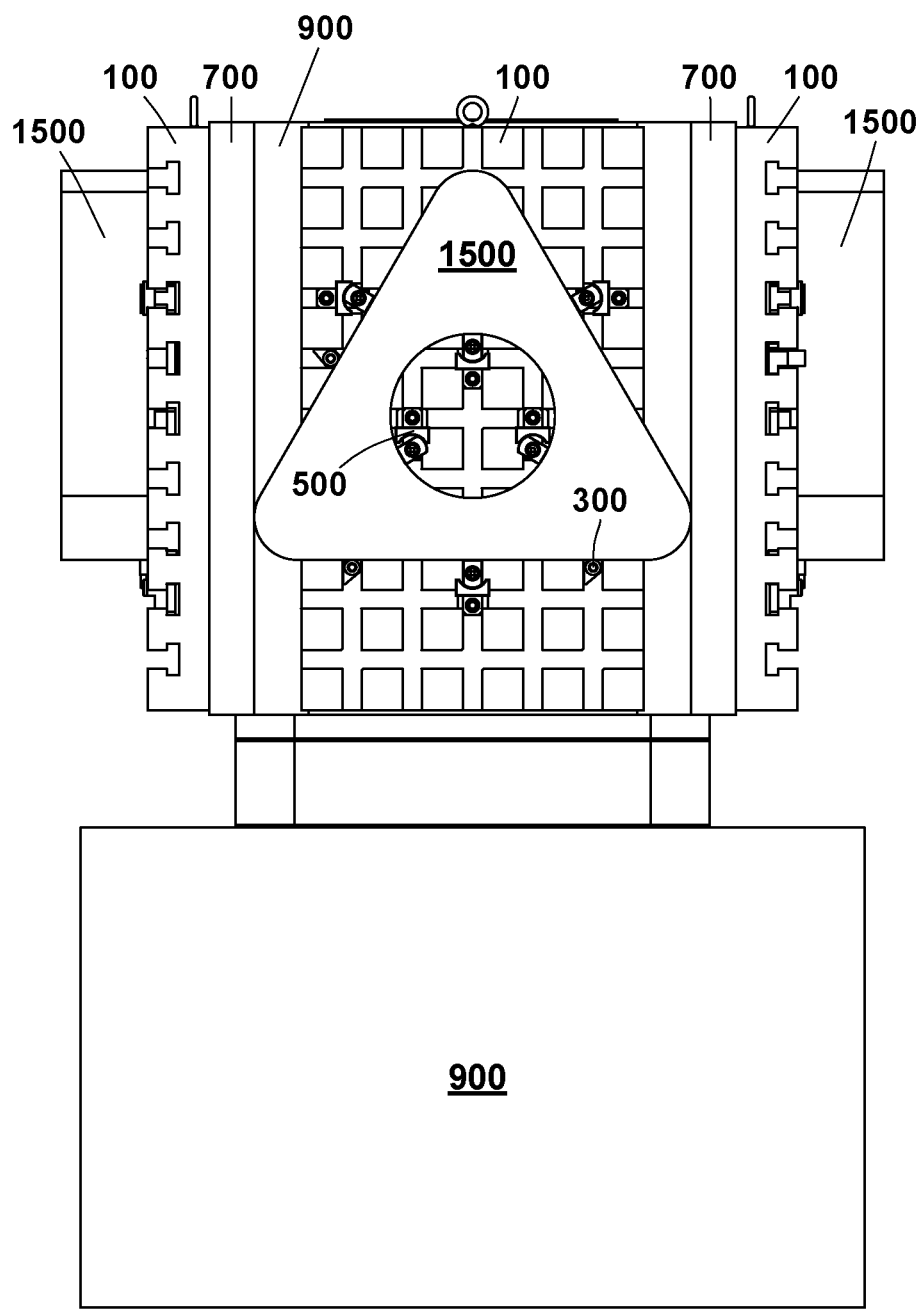
FIG. 13 is a front perspective view of exemplary embodiments of a work holding system mounted to a tombstone on a horizontal mill, configured to hold multiple base plates, and further depicting an exemplary embodiment of a clamp as a pivot clamp configured to secure a triangular shaped workpiece, and further depicting an exemplary embodiment of work stops, for repeatable machining.

The use of the work holding system is shown in the exemplary embodiment depicted in FIGS. 12-13, adapting a rectangular base plate 100 to a plurality of work surfaces, as represented in the horizontal milling machine 900 as is known to those skilled in the art. The milling machine 900, as depicted utilizes modular work support units, referred to as tombstones. In use, the tombstones facilitate machining multiple workpieces' faces by rotating about a rotary axis, such that multiple base plates can be affixed to each of the faces of the tombstone. A machine tool operator can repeatably position workpieces secured to base plates for machining. The workpieces may be presented as blanks in the initial state for machining to begin, and in a billet state, or alternatively may be mid-process (e.g., having been machined to an intermediate stage, and are to be presented for additional machining). The use of tombstones with a milling machine allows the user to place the base plates and respective workpieces upon the multiple faces of the tombstones, from outside the machining envelope, so as to not interfere with continuous production. That is, while the milling machine head is engaged with the workpiece within the enclosed area of the machine, as shown, the user may offload, or load on other workpieces on base plates, without interrupting the milling operation.

The use of the work holding system on a tombstone is shown in the exemplary embodiment depicted in FIG. 13 having a plurality of rectangular base plates 100, and securing a plurality of workpieces 1500 via clamp components. In this exemplary embodiment, there are depicted workpieces positioned on each face of tombstone, having 4 faces, where the work pieces are positioned against a plurality of work stops 300 secured within a T-slot. As depicted, the base plate mounted to the tombstone is provided with T-slot work stops 300 to position a workpiece with three points of contact, aligning the bottom periphery of the workpiece 1500 parallel to the machine's X axis with a pair of work stops provided below the workpiece, and a third work stop providing a locating function in a lateral direction, where the workpiece is urged laterally in the X direction against the work stop. In this manner, the work piece may be precisely located, such that milling may be performed repeatedly, and preventing error due to mislocating of the workpiece. Furthermore, the workpieces may each be secured to the base plates by one or more clamps. Depicted in exemplary embodiment of FIG. 13, is the use of a plurality of pivoting clamps 500 to secure the workpiece. The pivoting clamps are well suited for any shape work piece, as it is able to accommodate and conform to a variety of angles presented by the workpiece. As shown, the pivoting clamps are secured within T-slots, such that three pivoting clamps 500 are opposing one another on the inner periphery, shown here at 120° increments within the circular interior of the work piece. Additionally, three pivoting clamps 500 are provided on the workpiece's outside periphery, one against each side of the exterior triangular dimensions of the workpiece. It is contemplated that any of the clamp embodiments and workstops described herein may be beneficially utilized in the embodiments utilizing a tombstone to increase the production.

FIG. 13 specifically provides an example of a workpiece that would typically require custom work holding to be created, as the geometry of the workpiece clamping surfaces are generally not in alignment with the X or Y axis, and the use of the pivoting clamps shown, along with the multi-axis arrangement of the T-slots allow a wider variety of shaped workpieces to be secured than would otherwise be possible.

The various components that may be utilized in combination with one or more base plates to form the modular workholding system are described below. Along with the base plate(s), any of the following components may be employed singly or as a plurality, and may further be utilized alone, or in combination with any one or more of the system components described herein.

Figure 14:
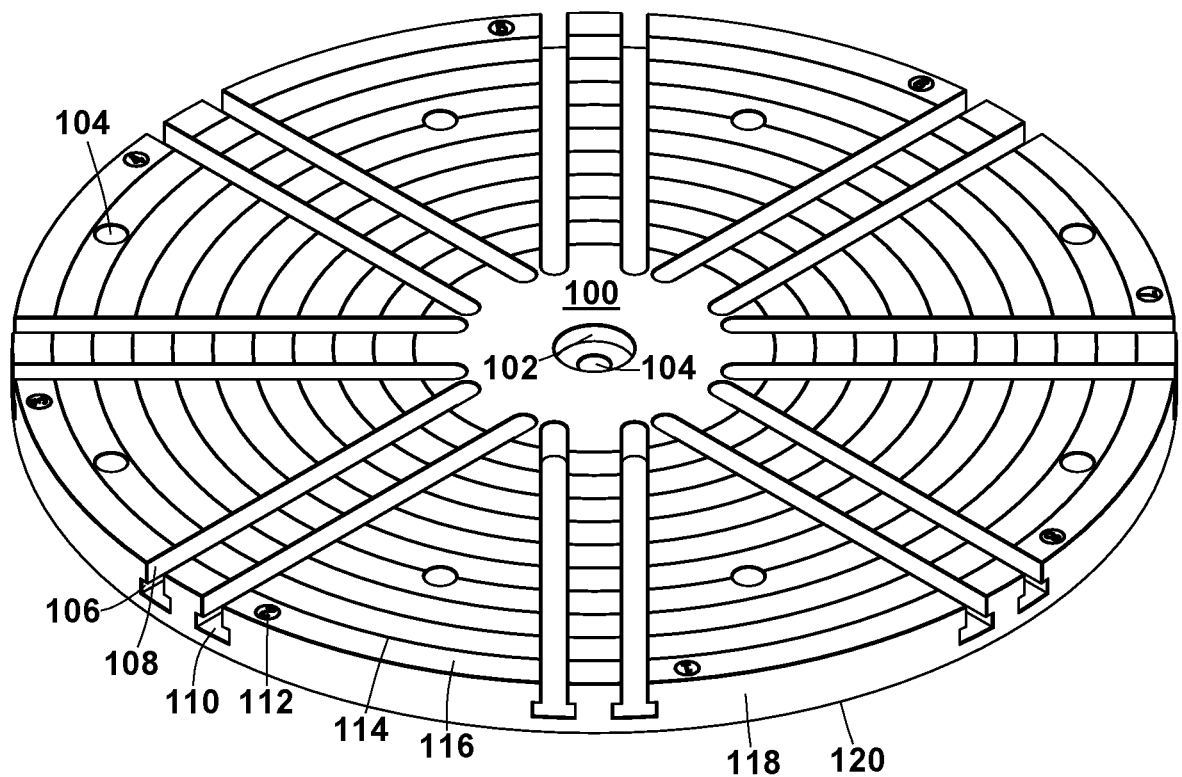
FIG. 14 is a perspective view of an exemplary embodiment of a round base plate having a plurality of T-slots, as depicted herein, the T-slots are arranged in pairs radially about the center of the base plate in an eight-sided configuration of the round base plate.

With reference to the exemplary embodiment depicted in FIG. 14, there is depicted a round base plate 100 configured having a plurality of pairs of radially aligned T-slots. As depicted, the round base plate 100 features a center bore 102, which may serve as a reference edge for indicating a reference location on the base plate, or may be utilized to probe the relationship between the machine's centerline in a lathe application, or the true center of the base plate wherever it is placed in a mill application. Once this true position is known, computer controlled movements may be calculated based on the known reference point location, or otherwise accounted for in manufacture of product. As depicted in this embodiment, the base plate 100 may be provided with a plurality of fastener receiving through holes 104 transverse to the upper surface 116 of the base plate 100, as a means to secure the base plate 100 to a machine table, by drawing fasteners inserted through the fastener receiving through holes 104 tight to a T-nut (as shown in FIG. 3). The round base plate features one or more T-slots, that are configured to accept a component having at least a portion corresponding to the "T" shape (in cross-section) in the element, so that it may be slidingly directed into the slot, where the T-slot has a first clearance wall 106 located adjacent to T-slot bottom surface 110, and a second clearance wall 108 located adjacent to the upper surface 116, where the spacing between opposing first and second clearance walls is uniform, as a consequence of opposing clearance walls being substantially parallel to each other over the length of the slot. What is referenced as the bottom surface 110 of the T-slot is to be a determined, consistent distance from the base plate's 100 working or upper surface 116, along the length of the slot. Optionally, the base plate may feature location markings 112, such as numbering, lettering, or other location identification markings, based on the radial orientation of the paired T-slots in the round base plate, divided as shown, in the exemplary embodiment of FIG. 14, in 8 similarly sized sections. Such location markings 112, if provided, may serve as a reference point, or otherwise aid in identifying a location on the base plate 100, furthermore, the markings may be useful to indicate the relation between a workpiece and the work holding components. In an exemplary embodiment, concentric circles 114, either in the form of surface markings (e.g. paint, or ink), or dimensional features, such as etching, or engravings may be formed onto, or into, as appropriate, the upper surface 116. These concentric circles may serve as a reference when centering a workpiece on the round base plate. A concentric outer edge 118 may serve to maintain balance in operations where the base plate 100 will be rotating. The round base plate may have a bottom surface 120 which is to be flat and parallel to upper surface 116.

Figure 15:
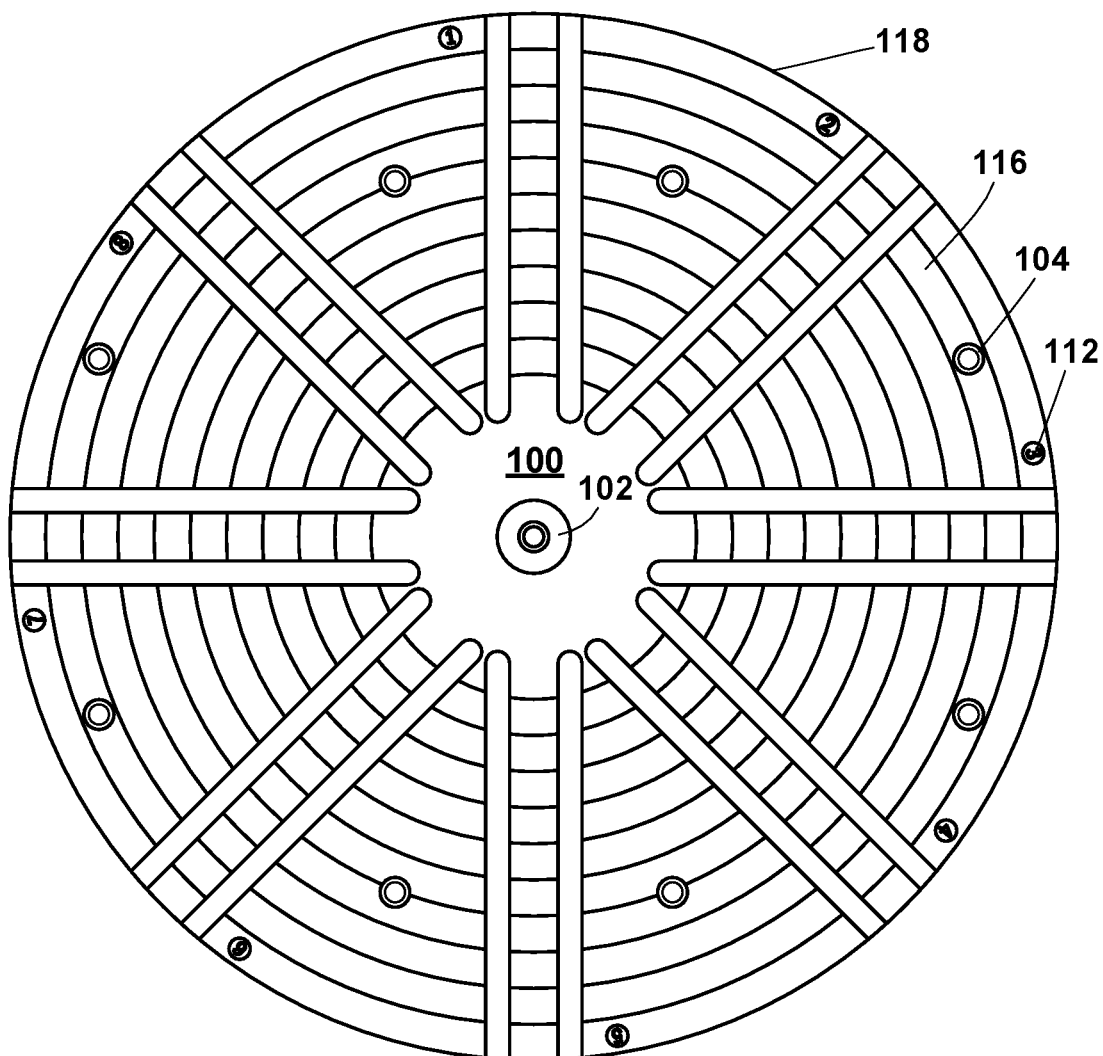
FIG. 15 is a top view of the round base plate of FIG. 14.

In the exemplary embodiment of FIG. 15, there is depicted a top view of the round base plate shown in the exemplary embodiment of base plate 100 of FIG. 14, having dual T-slot pairs arranged in eight station configuration. It is contemplated that the dual T-slots may be uniformly distributed radially about the round base plate, or may be non-uniformly distributed, as appropriate, based on the milling needs sought by the user. Furthermore, the T-slots as shown extend radially from a point generally near the center bore of the base plate, and are configured not to intersect with adjacent slots, and extend out to the concentric outer edge 118, to provide a T-slot opening, into which one or more correspondingly shaped T-slot components (e.g., T-slot nut) may be inserted into the slot, and secured, as will be described. Alternatively, one or more of the T-slots may extend across the base plate, wherein the axis that T-slot is aligned with forms a chord in the round base plate.

Figure 16:
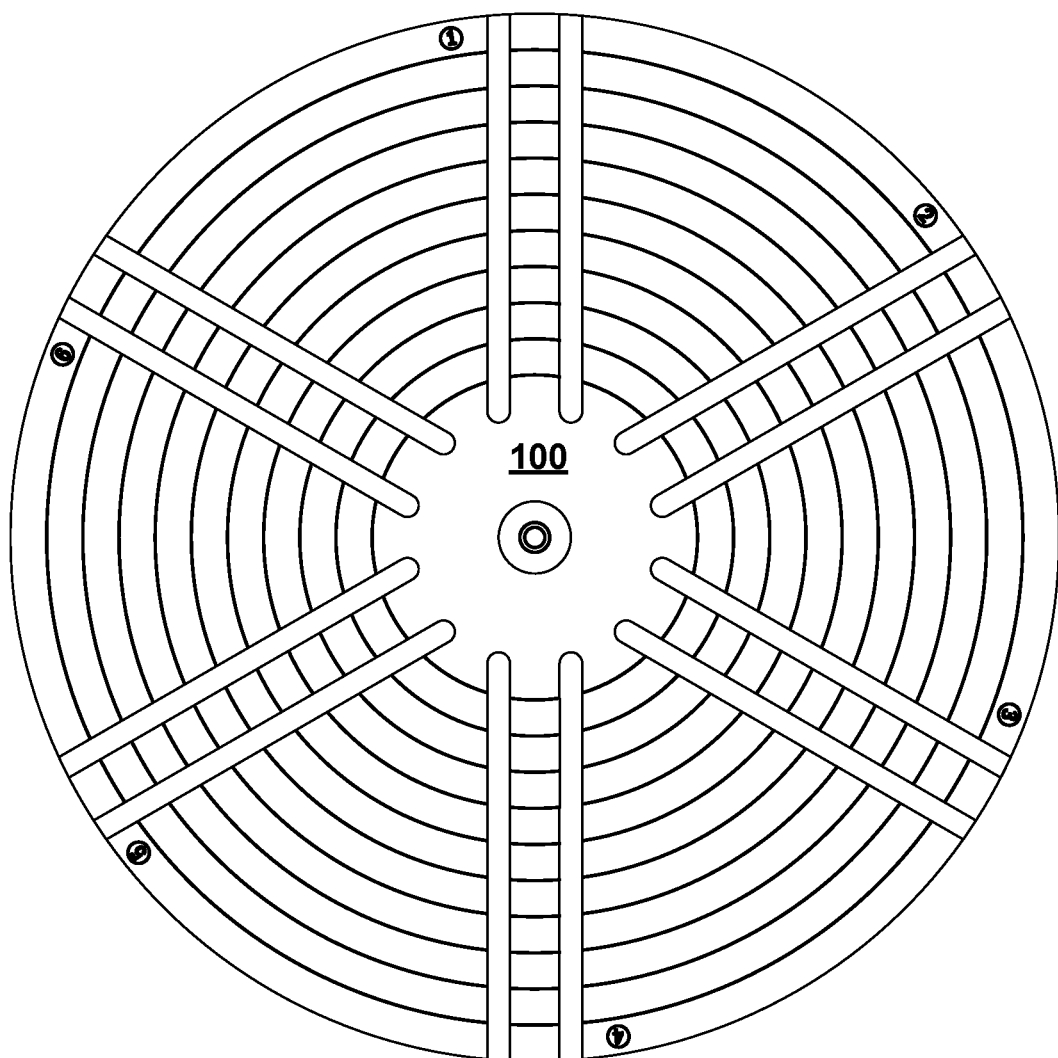
FIG. 16 is a top view of an exemplary embodiment of a round base plate having a plurality of T-slots, as depicted herein, the T-slots are arranged in pair radially about the center of the base plate in a six-sided configuration of the round base plate.

With reference to the exemplary embodiment depicted in FIG. 16 there is depicted an alternate embodiment of base plate 100. In this exemplary embodiment, the round base plate 100 is provided in a six-station configuration, having pairs of T-slots arranged radially about the center bore 102, in contrast to the eight station configuration described with reference to FIGS. 14 and 15.

Figure 17:
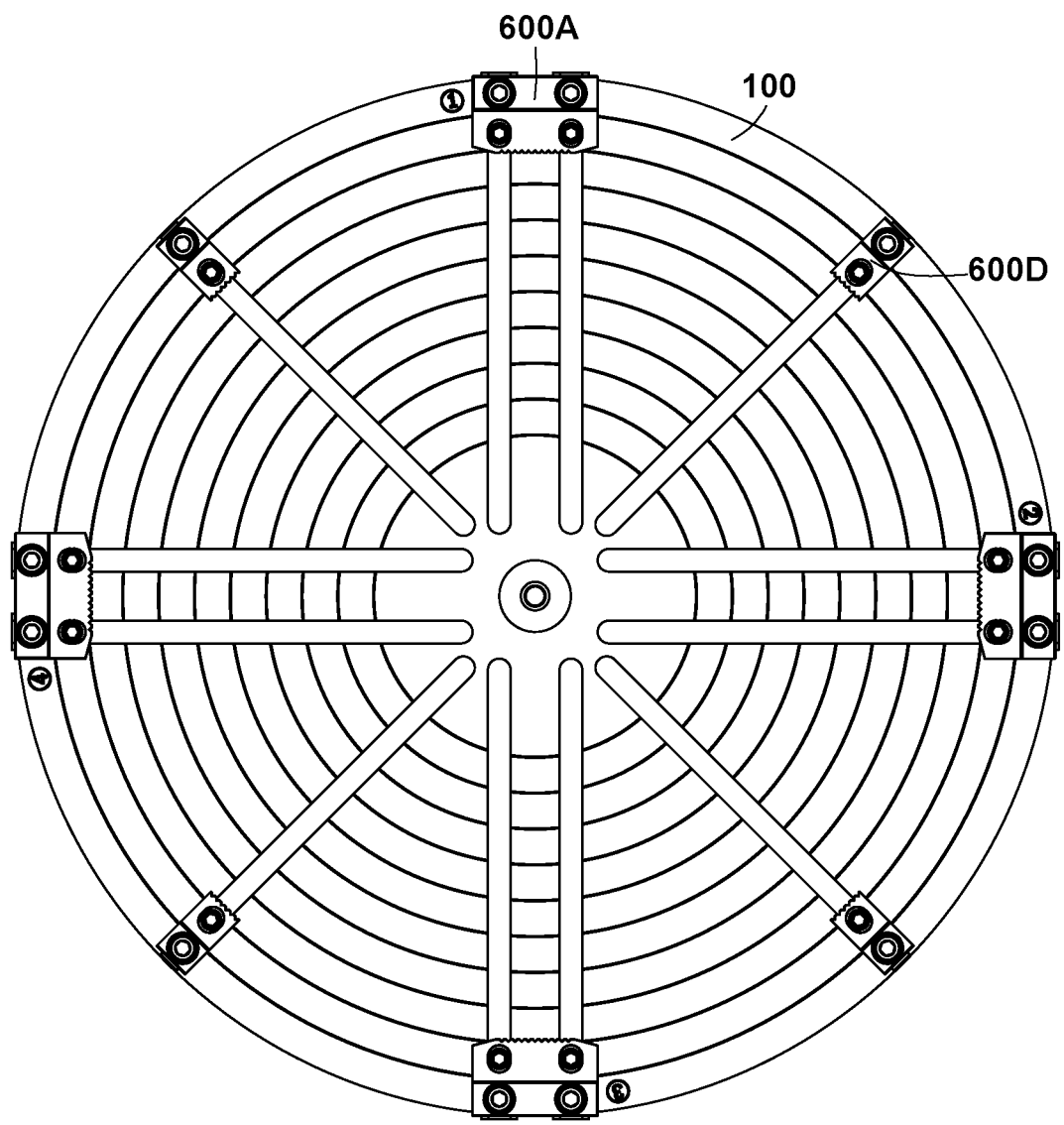
FIG. 17 is a top view of an exemplary embodiment of a round base plate having a plurality of T-slots, as depicted herein, the T-slots are arranged as a combination of pairs, and single slots, arranged radially about the center of the base plate, in a four-sided configuration; in this embodiment the single T-slots are configured between each double T-slot, and further depicting various exemplary embodiments of clamps positioned within a plurality of T-slots.

With reference to the exemplary embodiment depicted in FIG. 17 there is depicted an embodiment of base plate 100, in a four-station configuration, where the round base plate further provides four single T-slots, arranged radially, in between each of the adjacent T-slot pairs. In this embodiment, the single T-slot is substantially similar to the T-slots described previously, and is especially suited for accepting a single slot serrated hard jaw wedge clamp 600D, as shown. Alternatively, the single slot may receive one or more T-slot work stops 300, or the pivoting clamp 500.

With reference to FIG. 18A, there is depicted an exemplary embodiment of a wedge clamp. According to the teachings herein, a characteristic of a wedge clamp is the providing of a pair of opposing inclined surfaces, such that as the inclined surfaces are caused to slide or move relative to each other, the face of the clamp is caused to moved laterally, and vertically, when the clamp fixed body has been secured to a horizontal surface, and the clamping forces are applied. Examples of wedge clamps, according to the teachings herein, include clamps embodiments 600A-600D. With reference to FIG. 18B, the exemplary wedge clamp is a serrated hard jaw wedge clamp corresponding to 600A, but the operation of the wedge clamp components will be similar for the smooth faced, soft jaw wedge clamp 600B, the low profile serrated hard jaw wedge clamp 600C, and the single slot serrated hard jaw wedge clamp 600D. The wedge clamps, in the exemplary embodiments shown, feature the following major components: a fixed body 10, a sliding jaw 20, a plurality of fasteners 612, 804, 802, and one or more T-nuts 800. The wedge clamp of FIG. 18A, is depicted in exploded perspective view in FIG. 18B, for ease of understanding.

Referring to the exemplary embodiment depicted in FIGS. 18A and B, the fixed body 10 will now be discussed. The fixed body consists of a plurality of fastener receiving through holes 616 and 618, an inclined surface 606, a bottom surface 622, and a one or more tenons 610. The fastener through holes 616 and 618 are shown extending through the fixed body, transverse to the fixed body's top plane 604 and bottom surface 622. The inclined surface 606 of the fixed body 10 is obtuse relative to the fixed body's top plane 604. The bottom surface 622 of the fixed body 10 is substantially parallel to the top plane 604, and furthermore is generally parallel to the upper surface 116 of the base plate 100 (as can be seen in FIG. 1). The bottom surface 622 of the fixed body 10 may be generally planar, other than the one or more optionally provided tenons 610 that may protrude beyond the plane of the bottom surface 622. The tenon(s) 610 may protrude in an orientation which would be substantially parallel with the corresponding T-slot groove of the base plate, and when secured to the base plate, the tenon 610 is intended to reside at least partially in the upper region of its respective T-slot. Through holes 616 and 618 are cylindrical in nature and extend completely through the fixed body, and securement fastener receiving through hole 618 accepts one or more of fasteners transverse to top surface 604, which extend through the fixed body 10. Securement fastener receiving through hole 618 may be recessed below the fixed body's top surface 604 to allow a fastener, for example, a cap screw fastener, to rest below top surface 604, as such, through hole 618 may be counter-bored, as it is commonly referred to, to provide a low profile so as not to interfere with the milling equipment. The securement fastener receiving through hole 618 is not threaded, so as to allow the threaded portion of the securement fastener to slidingly pass through the hole 618, until the head enters into, and bottoms out within the counterbore. Clamping fastener receiving through hole 616 is transverse to resting surface 614 and extends completely through tenon 610. Clamping fastener receiving through holes 616 are threaded completely there through to receive clamping fasteners 804, which may be provided, for example, as a cap screw. Inclined surface 606 is obtuse to resting surface 614 and top surface 604. The inclined surface 606 may beneficially be substantially hardened, and free of surface imperfections or deviations to ensure smooth operation of the clamping mechanism.

The sliding jaw 20 will now be discussed, with reference to FIG. 18B, the sliding jaw consists of a plurality of jack bolt fastener receiving through holes 620 extending through the sliding jaw 20, transverse to the fixed body's top plane. A plurality of hardened serrations 602 may be provided on the sliding jaw, at the face that would provide the clamping force against the workpiece (the "clamp face"). For various clamp embodiments, for example, those clamps that are not hardened, the serrations may be absent, and a flat surface may be provided, which may be further customized in any manner, as appropriate, to accommodate a specific shape of work piece, as was discussed with reference to FIG. 8 above. Where the clamp features the hardened serrations on the clamp face, the serrations are generally uniform in nature, and form a clamping face that is transverse to the top surface 604 plane. The sliding jaw 20 further provides a sliding inclined surface 608 that is configured to reside against, and be parallel to the inclined surface 606 of the fixed body 10. One or more elongated slots or obround openings 624 may be provided, recessed below, or counter-bored into, the top of the sliding jaw, in order to allow a plurality of clamping fasteners 804, which may be provided in an embodiment in the form of cap screws, to rest against the counterbored shoulder, and be recessed below the top of the sliding jaw upper surface. The elongated slot 624 is to be substantially wider than the travel distance of sliding jaw 20, as the clamping forces are applied and released, as will be discussed below. The sliding jaw 20 may also be provided with jack bolt fastener receiving through holes 620 extending there through, which may be threaded to receive one or more jack bolt fasteners 612, which may be in the form of set screws.

The fasteners will now be discussed with reference to FIG. 18B. Securement fasteners 802, which may be, in an embodiment, provided as cap screw fasteners, are to be directed through fixed body 10 and threaded into a plurality of T-nuts 800. The securement fasteners 802 are to be of an appropriate length so as not to protrude below the bottom plane of the T-nuts upon assembly. Clamping fasteners 804 which may be, in an embodiment, provided as cap screw fasteners, are to be directed through obround 624, and received by and threaded into the fixed body 10 and the clamping fastener receiving through holes 616. Again, care must be taken to ensure the clamping fasteners are of an appropriate length so as to extend into fixed body 10 and its tenons 610 upon assembly, but not so long as to encounter the bottom surface 110 of the T-slot. Jack bolt fasteners 612 are received by, and threaded into the sliding jaw 20 and its through holes 620. Jack bolt fasteners 612 are to be of an appropriate length so as capable of being flush, or recessed within the sliding jaw dimensions, and not having to protrude beyond the top or bottom plane of sliding jaw 20, for example, while the workpiece is being processed by the machine.

Where the clamp is configured to be deployed using a single T-slot, it necessarily will not have multiple elements that would be otherwise required were it to be configured to be deployed using a pair of T-slots. For example, such a single slot clamp of 600D would have only one tenon 610, and only those fasteners and through holes required for use with one T-nut to be secured within a single T-slot.

The above description has been describing a clamp that has a top surface that is substantially planar, and parallel to the base plate. It is recognized that the top surface of the clamp sliding jaw or main body may not necessarily be planar or parallel to the base plate, in which case, the orientations of the through holes, fasteners would be transverse relative to the plane that would be the upper surface of the base plate, rather than the top surface as described above.

The operation and manner of use of the wedge clamp embodiment depicted in FIGS. 18A and B will now be discussed. As before, the exemplary embodiment of the FIG. 18 A is a serrated hard jaw wedge clamp (600A as shown, or alternatively as single slot 600D of FIG. 4), but any of the other wedge clamps described herein may be substituted as appropriate for the machining conditions. The serrated jaw embodiment is meant to secure workpieces in a blank, or rough state, where the serrations' bite into the workpiece surface will not be detrimental to the finished workpiece surface. The non-serrated (e.g., smooth faced), soft jaw clamp (see 600B of FIG. 4), which may be machinable, and may be employed to clamp a workpiece, without causing markings or distortions in the workpiece surface. For example, the soft jaw clamp may be machined to mirror the geometry, or otherwise correspond to the features of the workpiece, such as presenting a negative form of the workpiece, and thus distribute clamping forces over a greater percentage, even the entire surface, of the clamp face, rather than concentrating the clamp forces at only the leading edges of the serrations as would the serrated clamp embodiments, or be limited to contact points where the clamp face does not correspond to the features of the workpiece. The low-profile clamp variation (see 600C of FIG. 4) is meant to be utilized in order to provide additional tool clearance during the machining process. One skilled in the art should appreciate that the wedge clamp embodiments depicted herein are not limited to the examples provided. The basic principle described of applying each embodiment is common to each embodiment herein.

Figure 18:
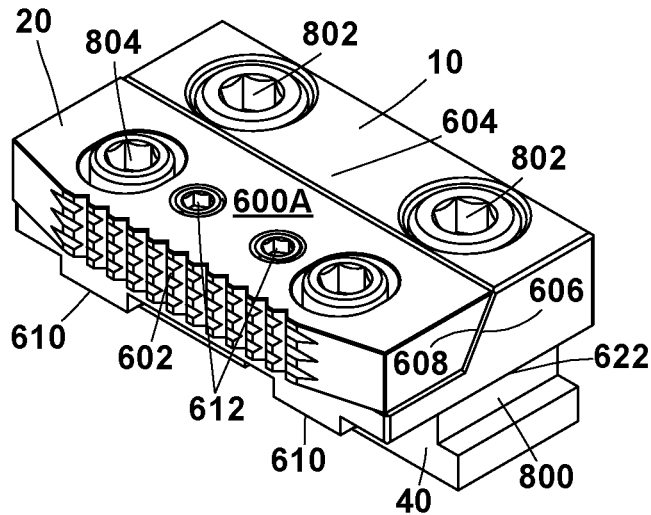
FIG. 18A is an assembled perspective view of the manually activated hard jaw clamp referenced as embodiment 600A.
FIG. 18B is an exploded perspective view of the manually activated hard jaw clamp of 18A.
Figure 18:
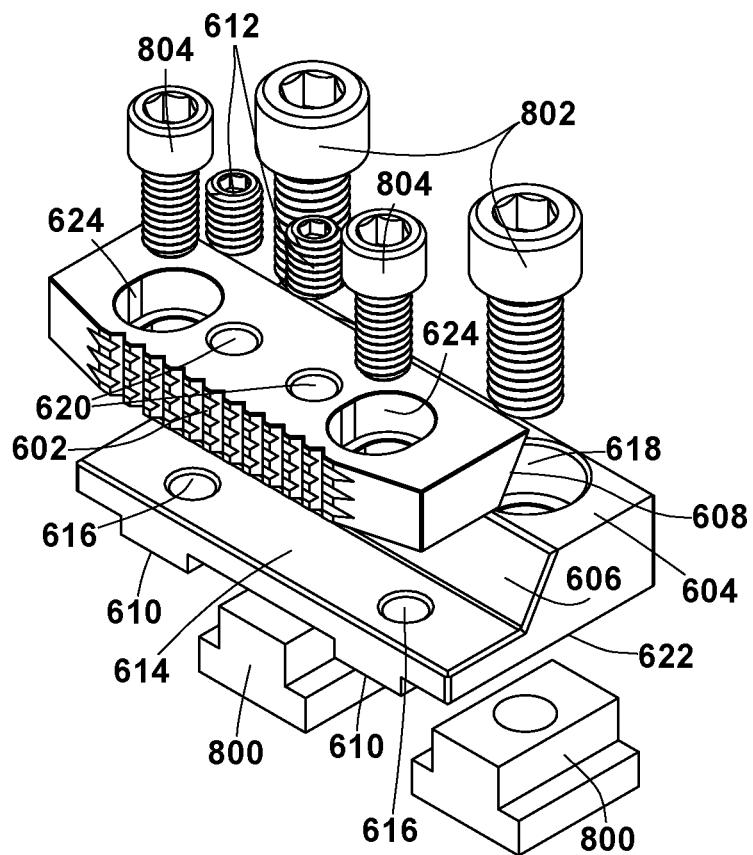
Figure 19:
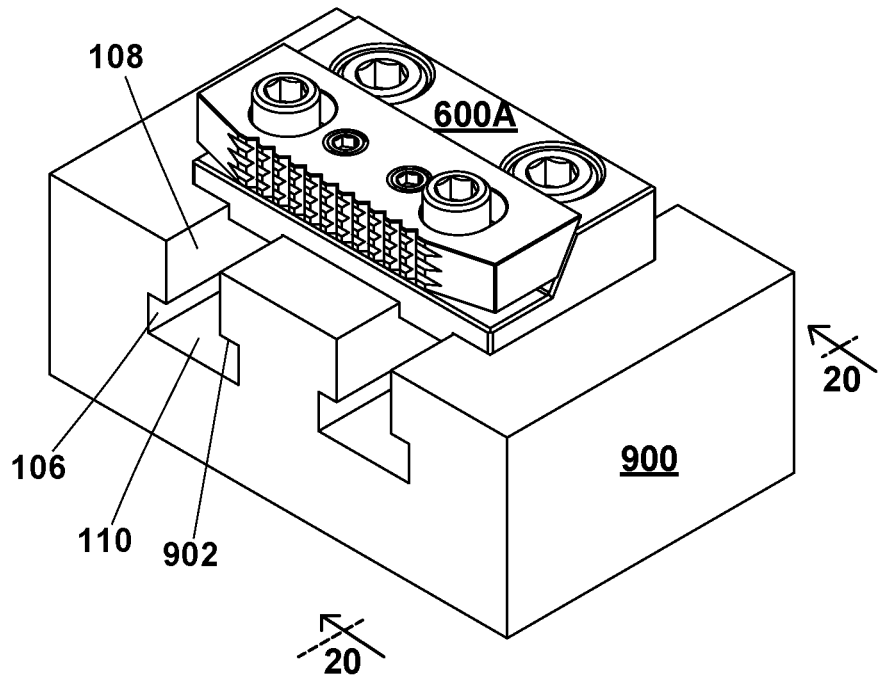
FIG. 19 indicates the directional perspective of the hard jaw clamp referenced as embodiment 600A, in an unclamped state.

In use the wedge clamps described herein, and with reference to FIG. 18 B, the jack bolt fasteners 612, depicted here as set screws, would be turned so as to be applied to resting surface 614 of the fixed body 10, by advancing the jack bolt fasteners 612 downward through the jack bolt fastener receiving through holes 620 in sliding jaw 20, and functionally raising the sliding jaw 20 above the top surface 604 plane of the fixed body 10 as depicted in FIG. 19. Such jack bolt fasteners 612 serve to raise the sliding jaw away from the resting surface 614. While in an unclamped state, the fixed body 10 would be positioned in close proximity to the workpiece (e.g., within the forward throw distance of the clamp), so as to cause the serrated teeth 602 (or clamp face) of sliding jaw 20 to be placed adjacent to, or come into contact with the workpiece periphery. Securement fasteners 802 would be applied, where rotation of the securement fastener 802 causes the head to encounter the counterbore, if any, in fixed body 10, and continued rotation of the fastener will draw the one or more T-nuts 800 upward within the T-slot track, thereby immobilizing fixed body 10 as the base plate 100 body would be clamped by the clamping forces drawing each the fixed body 10 and the T-nut 800 toward one another by the rotation of securement fastener 802. Jack bolt fasteners 612 would then be retracted from the resting surface 614 of the fixed body 10, and preferably retracted so as to fit entirely within the height dimension of the sliding jaw 20. With the jack bolt fasteners 612 drawn away from resting surface 614, the sliding jaw 20 would be free to move on the threaded body of the clamping fastener 804, without engaging the threads) as the clamping fastener is extended through a non-threaded, slotted opening or obround 624 of the sliding jaw 20. Such movement may be in a vertical direction (along the length of the fastener body, and also in a lateral direction within the length of the slot 624. Clamping fasteners 804 would then be applied or advanced into to fastener receiving threaded through holes 616. As the clamping fasteners 804 are threaded further into the through holes 616, the head of each clamping fastener 804, is drawn against the sliding jaw surface, or will bottom out within the counterbore, if any is provided, in the sliding jaw 20, and would thereby draw the sliding jaw 20 downward as the clamping fasteners 804 are turned. As the sliding jaw is pulled downward by continued rotation of the clamping fasteners 804, the inclined plane 608 of sliding jaw 20 contacts the parallel inclined plane of fixed body 10, defining a wedge slope. As can be seen with reference to FIGS. 19 and 20, as the inclined plane of the sliding jaw rides against the inclined plane of the fixed body in a downward direction, a resulting downward and simultaneous forward clamping force would be created in the clamping face of the sliding jaw 20. This angle of the wedge slope formed by 608 of the sliding jaw 20, riding against slope of the inclined surface 606 of the fixed body 10, in an embodiment applies force in a positive downward thrust, exceeding the forward (advancing the clamping face against the workpiece) thrust in wedge slope angles greater than 45°, relative to an angle of 0° of the table work surface 900 or base plate 100 upper surface 116. This driving force will cause the hardened teeth 602 (or clamp face as appropriate) of sliding jaw 20 to abut tightly against, or in the case of serrated teeth, to pierce or otherwise engage the periphery of the workpiece, effectively drawing the workpiece downward and as the clamp face is urged inward as well. This downward thrust on the workpiece is counteracted by base plate 100 upper surface 116 (as shown in FIG. 14). A workstop or clamp stop (as seen with reference to FIG. 1), or opposing clamp or wedge clamps arranged to oppose the force on the workpiece, such as on a surface of the workpiece opposite to the clamp being applied, may be placed to assist in immobilizing the workpiece and allow for secure machining. It is contemplated that multiple clamps may be utilized in concert, collectively applying compressive forces, and counteracting each of the other clamps, so as to secure the workpiece for machining, as can be seen with reference to, for example, FIGS. 8 and 9.

It is contemplated that by varying the wedge slope of the clamp embodiments (where each of the parallel planar surfaces 608 and 606 are supplementary angles to each other, relative to the table planar surface extending in a line corresponding to 0° and 180°), the force vectors applied via the clamp face can be controlled. As mentioned above, where the wedge slope is 45 degrees, the clamp force will equally draw downward on the work piece and advance towards the work piece. In an embodiment where more advancement of the clamp face is desirable, relative to the hold down force applied to the workpiece, the wedge slope may be provided with an angle less than 45°. Alternatively, where it is sought to apply more downward force to hold down the workpiece via the clamp face, and provide relatively less forward clamping throw, the wedge slope may be provided with an angle greater than 45°. In an embodiment, the wedge slope is provided having an upper range of: less than or equal to 75°, less than or equal to 60°, less than or equal to 55°, less than or equal to 50°, less than or equal to 45°, less than or equal to 40°, less than or equal to 35°, less than or equal to 30°, less than or equal to 25°; and having a lower range of: at least or equal to 15°, at least or equal to 30°, at least or equal to 20°, at least or equal to 25°, at least or equal to 30°, at least or equal to 35°, at least or equal to 40°, at least or equal to 45°, at least or equal to 50°, at least or equal to 55°, at least or equal to 60°, at least or equal to 65°.

Figure 20:
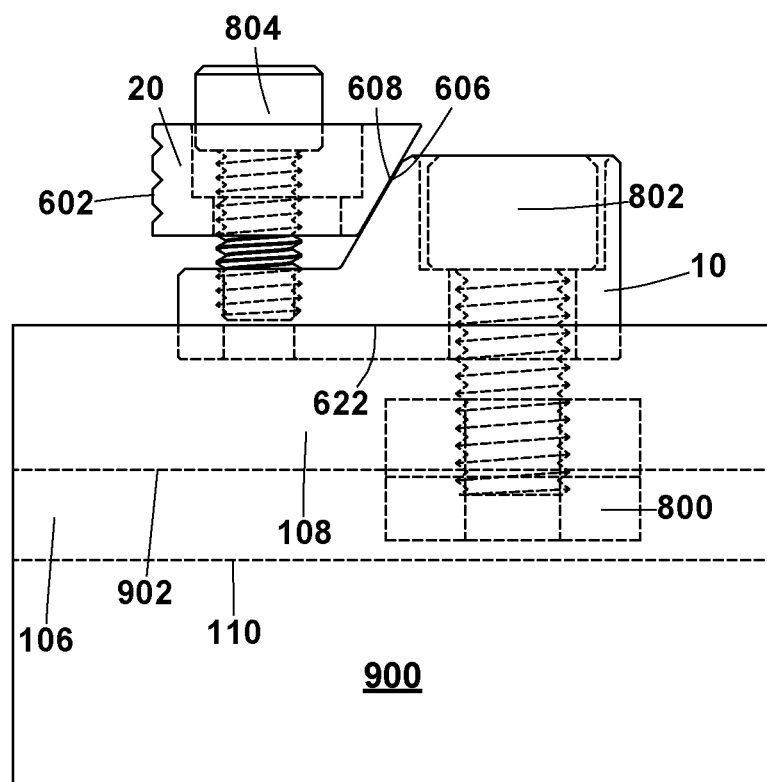
FIG. 20 is a cross-sectional side view of the embodiment depicted in FIG. 19.

Further depictions of the mechanical wedge clamp of the exemplary embodiment depicted in FIGS. 18A and B, are found with reference to the exemplary embodiment depicted in FIGS. 19 and 20. FIG. 20 provides a side cross-sectional view of the wedge clamp as depicted in FIG. 19. This cross section view of the exemplary wedge clamp embodiment depicts the clamp in an unclamped state residing within a t-slot. Fixed body 10 can be seen immobilized through the application of securement fasteners 802 into T-nuts 800, which are within a T-slot in the table 900. As depicted, there is provided substantial clearance, as can be seen below sliding jaw 20 providing space for sliding jaw 20 to move downward and forward as parallel inclined surfaces 606 and 608 interact.

Figure 21:
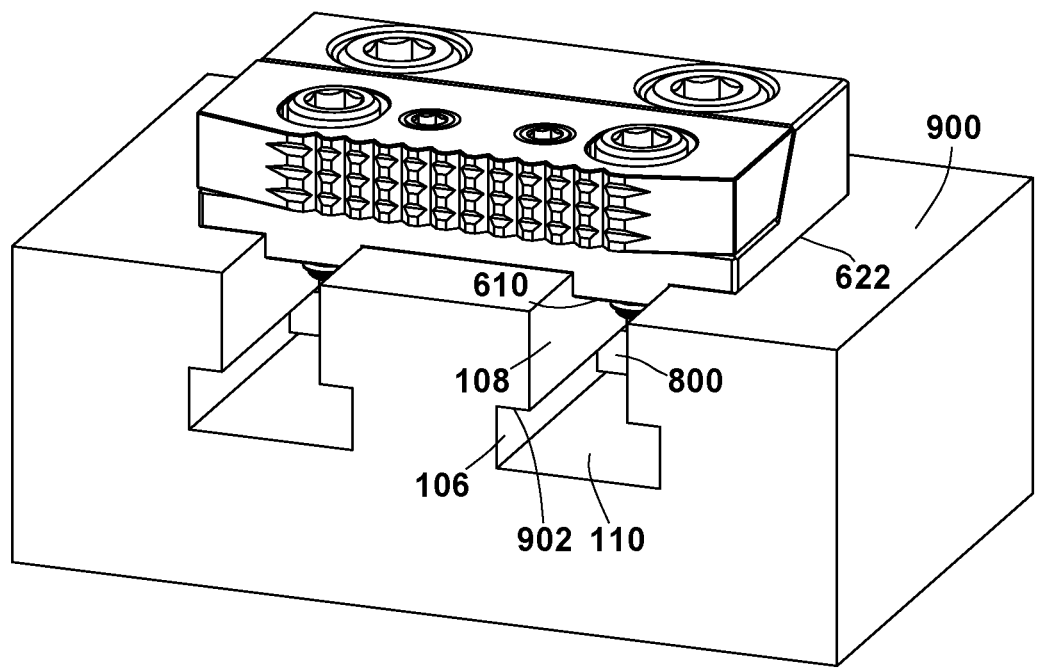
FIG. 21 is a perspective view of the exemplary clamp embodiment depicted in FIG. 19, shown secured in a T-slot, and in a clamped state.

Referring now to the embodiment of FIG. 21, an exemplary embodiment of a wedge clamp is depicted so as to illustrate the wedge clamp embodiment secured in a T-slot and in a state where it may be clamping against a workpiece. In this exemplary embodiment, the surface of the table 900 is representative of a flat plane for bottom surface 622 of the wedge clamp embodiment to locate against. These surfaces are to be substantially parallel. A tenon 610 may be positioned between T-slot sidewall surfaces 108, in the upper region of the T-slot. Restraining surface 902 within the T-slot is configured to retain a T-nut 800 from being pulled upward through the T-slot. Bottom surface 110 of the T-slot is to be substantially lower than restraining surface 902 to allow the T-nut 800 to pass through the T-slot freely. A clearance should exist between tenon 610 and side surface 108 of the T-slot to provide free movement. As the securement fasteners 802 of the wedge clamp are advanced by rotation, the T-nut 800 is drawn towards the clamp by the threads of the securement fastener 802, until the T-nut 800 encounters the restraining surface 902. Continued turns of the securement fastener 802 will cause the fixed body 10 to be pulled downward as the head bottoms out within counterbore of the fixed body 10. The table 900 is thus clamped between the T-nut 800 residing against the restraining surface 902, and the fixed body 10 having bottom surface 622 secured against the upper surface of the table 900, or top surface 116 of the base plate 100.

Figure 22:
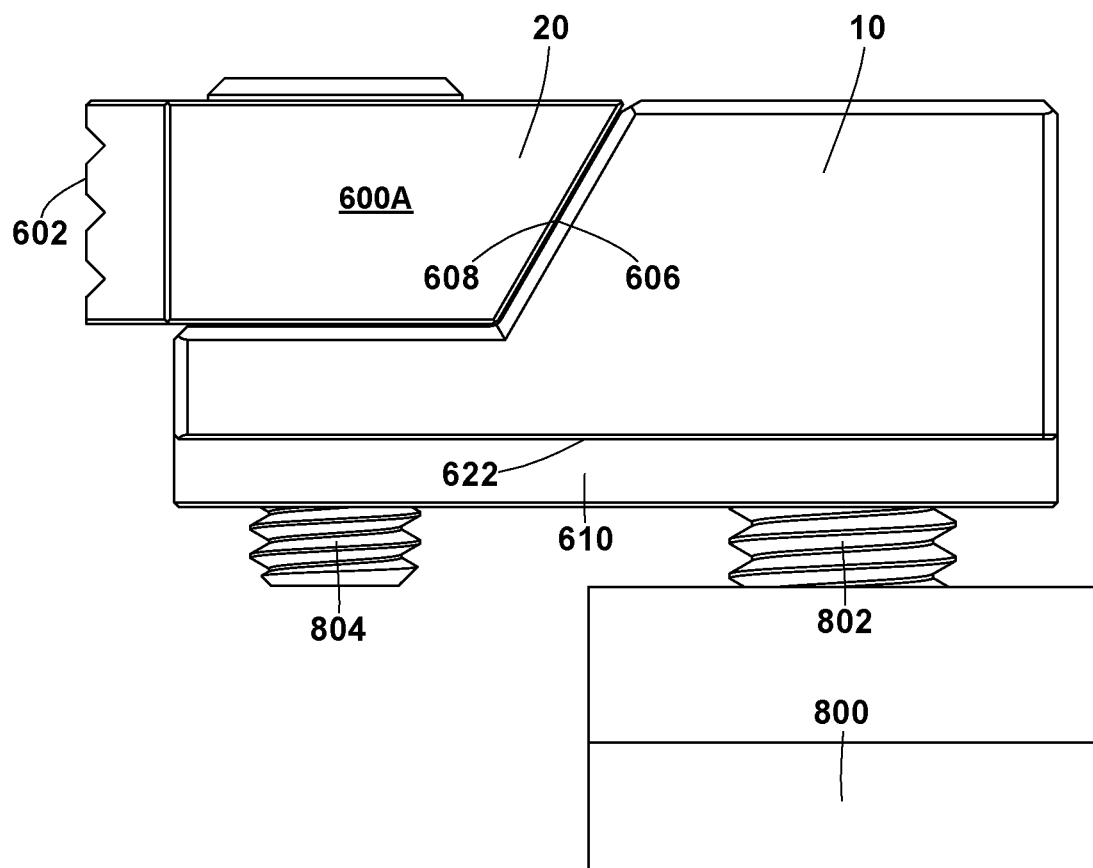
FIG. 22 is a side view of the exemplary clamp embodiment depicted in FIG. 20.

In reference to the exemplary embodiments of FIGS. 22-30 additional views are provided of the exemplary wedge clamp embodiments. In FIG. 22, there is depicted a side perspective view of the wedge clamp embodiment of claim 20, depicted for clarity without the T-slot table 900. In this view, the securement fastener 802 extends out from the tenon 610 which is along the bottom surface 622 of the fixed body 10. The threads of the securement fastener 802 are visible, and extend into the T-nut 800 that would reside within the T-slot. Also depicted in FIG. 22 is the clamping fastener 804 that is recessed within the counterbore of the sliding jaw 20. Sliding jaw 20 is depicted as being fully advanced and clamped, resting against resting surface 614 of the fixed body 10, as the inclined surface 608 of the sliding jaw 20 has been slid fully downwards, and forwards, against the parallel inclined surface 606 of the fixed body 10. As depicted, the serrations 602 of the clamp face have thus been advanced to the furthest extent that the clamp embodiment depicted would allow.

Figure 23:
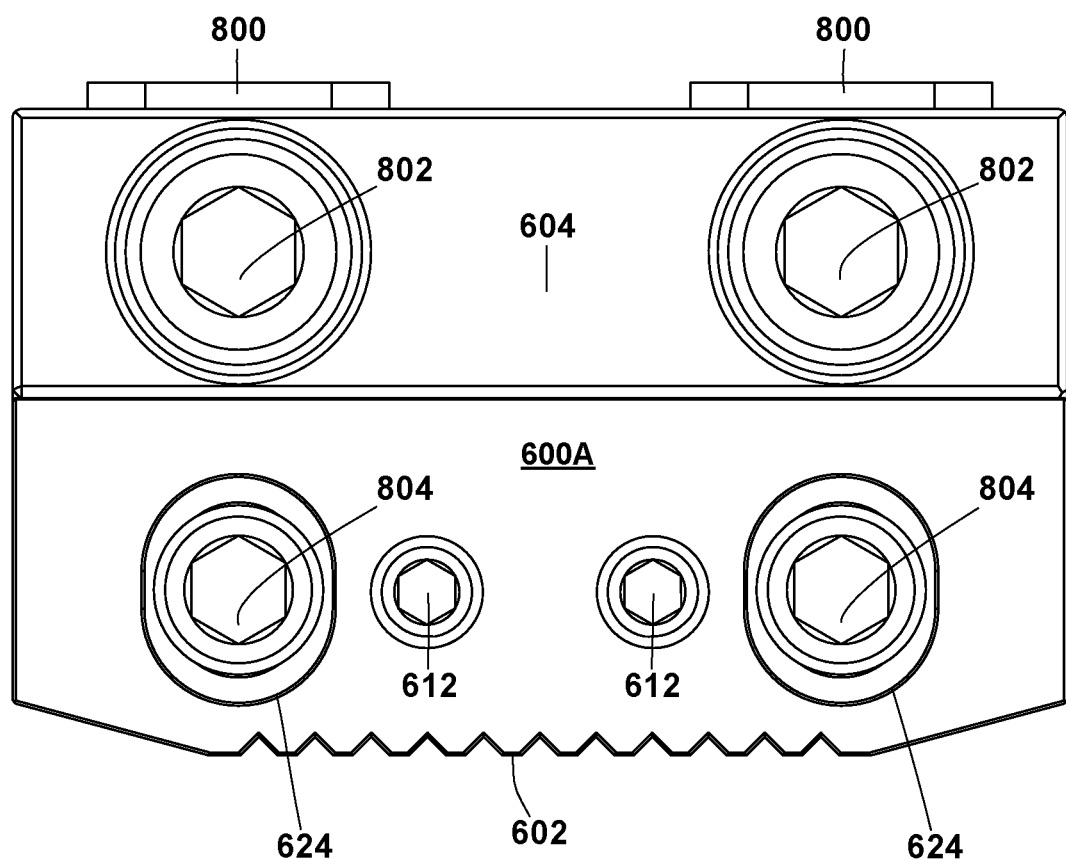
FIG. 23 is a top view of the exemplary clamp embodiment depicted in FIG. 21.

With reference to the exemplary embodiment depicted in FIG. 23 there is depicted a top view of the exemplary clamp embodiment of FIG. 22. As depicted, the clamping fasteners 804 that apply the clamping force to the sliding jaw 20 are clearly visible residing in a pair of obround openings 624. The obround openings are slotted so as to allow the head of the clamping fasteners 804 to travel within the slotted openings as the clamp is secured or loosened by the turning of clamping fasteners 804, where the advancing or retracting movement of the clamp face is a result of the sliding jaw movement directed by the sliding of the inclined planes against each other (with reference to FIG. 19). Also visible in the embodiment of FIG. 23 are the fasteners 612 which serve as jack bolts, and the securement fasteners 802 that secure the fixed body against the T-nut 800.

Figure 24:
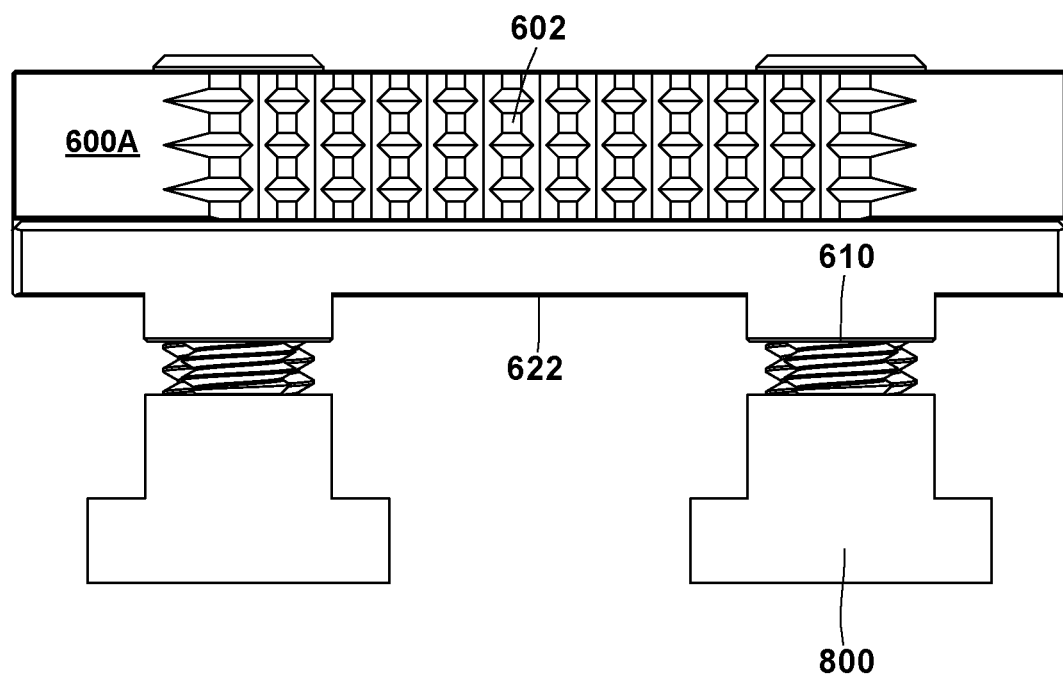
FIG. 24 is a front view of the exemplary clamp embodiment depicted in FIG. 21.

With reference to the exemplary embodiment depicted in FIG. 24, there is depicted a front view of the exemplary clamp embodiment of FIG. 22. As depicted, the clamp face provides a plurality of serrations 602, that may serve to grip and secure the work piece as the clamping mechanism is actuated. Also shown are the dual tenons 610, and T-nuts 800. The depicted clamp is a dual slot clamp, providing a large clamp face that may be utilized to secure a work piece.

Figure 25:
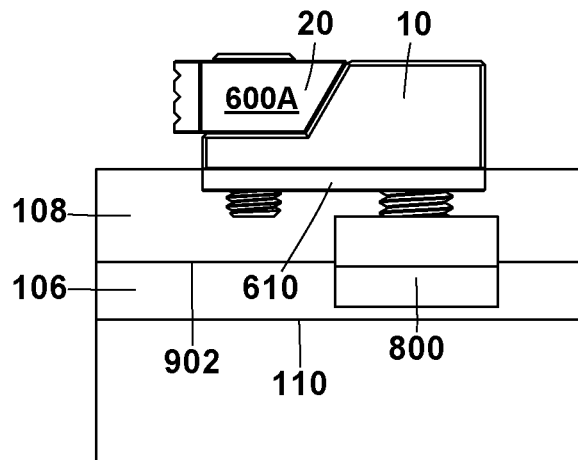
FIG. 25 is a side view of an exemplary clamp embodiment, depicted as a manually activated hard jaw clamp, shown in a clamped state, and mounted to a base plate portion.
Figure 26:
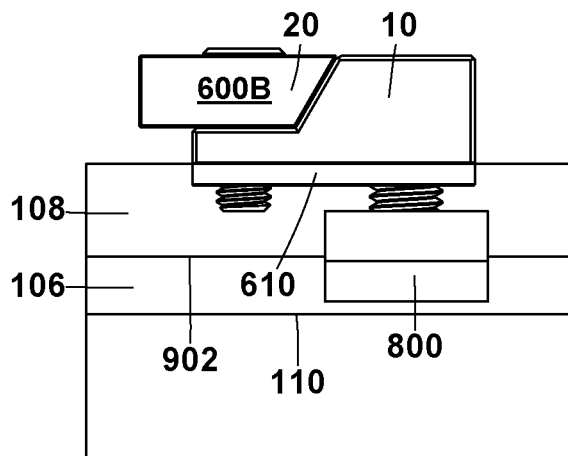
FIG. 26 is a side view of an exemplary clamp embodiment, depicted as manually activated smooth faced, soft or machinable jaw clamp, shown in a clamped state and mounted to a base plate portion.
Figure 27:
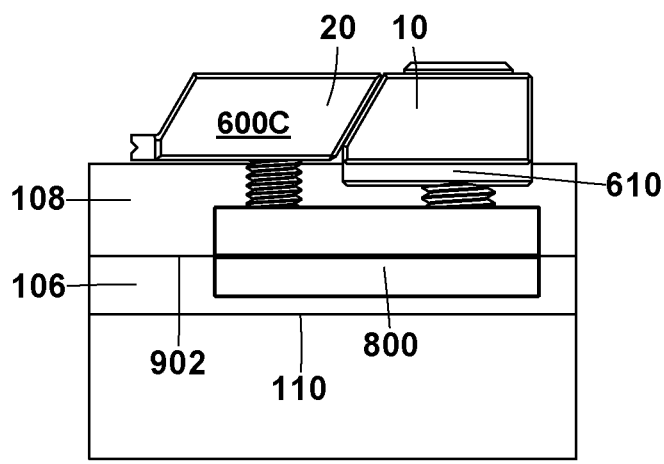
FIG. 27 is a side view of an exemplary clamp embodiment, depicted as manually activated low profile jaw clamp, shown in a clamped state and mounted to a base plate portion.
Figure 28:
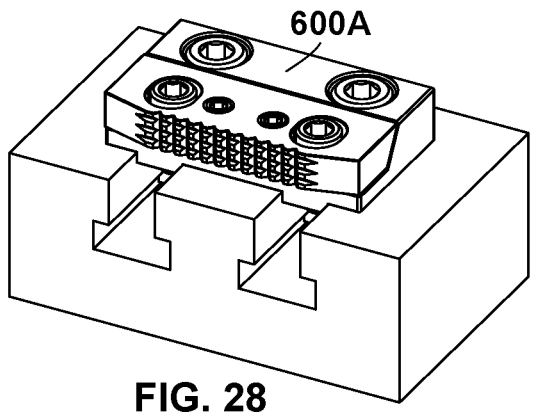
FIG. 28 is a perspective view of the exemplary clamp embodiment of FIG. 25.
Figure 29:
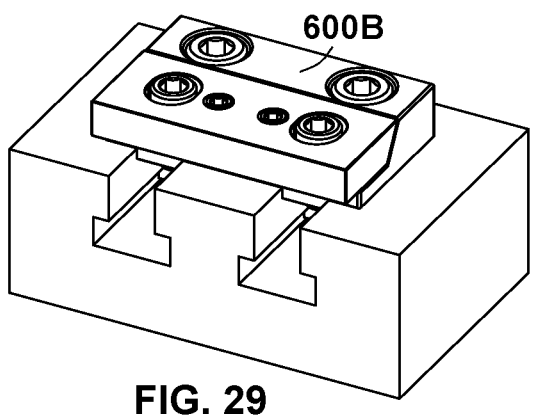
FIG. 29 is a perspective view of the exemplary clamp embodiment of FIG. 26.
Figure 30:
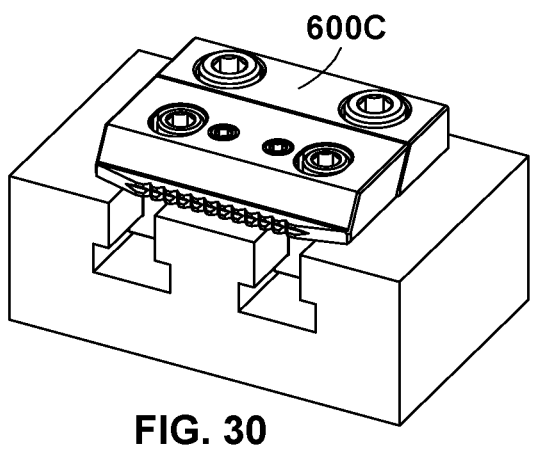
FIG. 30 is a perspective view of the exemplary clamp embodiment of FIG. 27.

As has been previously mentioned, the clamping actions provided by the fasteners and inclined planes may be employed in a variety of clamp embodiments. For example, merely be replacing the sliding jaw embodiment, the nature of the clamp may be changed. For example, FIG. 25 depicts a side view of an embodiment of a serrated hard jaw clamp 600A, as has been previously described, also shown in the perspective view of FIG. 28. FIG. 26 depicts an alternate embodiment, in side view, of the clamp where the sliding jaw is that of a soft jaw clamp mechanism 600B, also shown in perspective view in FIG. 29. The smooth faced, soft jaw clamp exemplary embodiment, as depicted in FIGS. 26 and 29, may optionally be machined to be provided with the profile of the clamp face corresponding to the workpiece. Alternatively, the clamp face may be left square, with a smooth face, for clamping against a suitable workpiece without marring the surface, as would otherwise be likely with the application of the clamp face embodiment having serrations. FIG. 27 depicts still another alternate embodiment, in side view, of the clamp where the sliding jaw is that of a low profile clamp 600C, also shown in perspective view in FIG. 30. The low profile clamp exemplary embodiment provides a protruding clamp face of low profile that can grip the workpiece when clamped, yet provide adequate clearance such that the entirety of the workpiece surface may be machined, and may beneficially not encounter the clamp mechanism. As shown, the protruding clamp face has a height dimension that is approximately one third of the overall height dimension of sliding jaw 20. The protruding clamp face may have a height dimension that is in the range of 50% to 15%, in the range of 40% to 20%, in the range of 35% to 25% of the height dimension of the sliding jaw. The protruding face should have a height dimension that is adequate to resist the compressive forces when applied, so as to ensure that the protruding face would not significantly be deformed or buckle when applied against a workpiece by the clamping forces. It is contemplated that the low profile clamp embodiment may have the protruding element that protrudes forward out of the sliding jaw an amount that is equal to the height of the protruding face, thus presenting a protrusion:height ratio of 1:1. The protruding portion allows the sliding jaw to be somewhat setback away from the workpiece, and provides clearance from the machining tools, so as to mitigate the potential of the machining tools colliding with the low profile clamp 600C. The actual dimensions of the protrusion portion of the low profile clamp 600C will vary with the dimensions of the clamp, but it is anticipated that the protrusion:height ratio referenced above will preferably be around 1:1, and may be in the range of 2:1 to 1:4, or any combination in between, and would be largely dictated by the user needs. Note that in the exemplary embodiment of FIGS. 27 and 30, the fixed body may also be revised, so as to allow the sliding jaw to rest directly against the table 900 surface, rather than against the resting surface 614 of the fixed body; thereby further lowering the overall profile of the low-profile clamp embodiment. In this particular embodiment, it is contemplated that the clamping fastener 804, for use in the low profile clamp embodiment would be threaded into a fastener receiving through hole of an extended t-nut 800 residing in the T-slot, correspondingly below the fixed body, where the T-nut is configured with dual fastener receiving through holes so as to receive both the securement fastener 802 and clamping fastener 804, and is of a length that extends within the T-slot in a direction towards the clamp face, to receive the clamping fastener 804. Alternatively, it is contemplated that the clamping fastener 804, for use in the low profile clamp embodiment may be threaded into a fastener receiving through hole of an extended tenon portion of the fixed body, where the tenon extends within the T-slot towards the clamp face, so as to extend at least to receive the clamping fastener 804. It is contemplated that, in the low profile clamp embodiment of FIGS. 27 and 30, the clamping fastener 804 may be directed into a secondary T-nut that may reside within the T-slot at a point at which the clamping fastener 804 may be received and such that the secondary T-nut allows the clamping fastener to be threaded downwards, and thereby pull the sliding jaw downwards, and driven forwards along the wedge slope. In the embodiment of a low profile clamp where the sliding jaw is configured to rest against the surface of table 900, the jack bolt fasteners 612 when advanced in a direction towards the table 900 will encounter the upper surface of the table 900, or base plate 100, as appropriate, whereupon continued turning of the jack bolt fasteners 612 will result in the sliding jaw being elevated, similar to the operation of the jack bolts in previously described clamps. The mechanical wedge clamping function of the Serrated Hard Jaw Wedge Clamp 600A, Soft Jaw Wedge Clamp 600B, and Low Profile Serrated Hard Jaw Wedge Clamp 600C are equivalent, as all rely on the sliding of inclined planes across each other at wedge slope angles, as has been previously described, to effectuate the clamping action.

Figure 31:
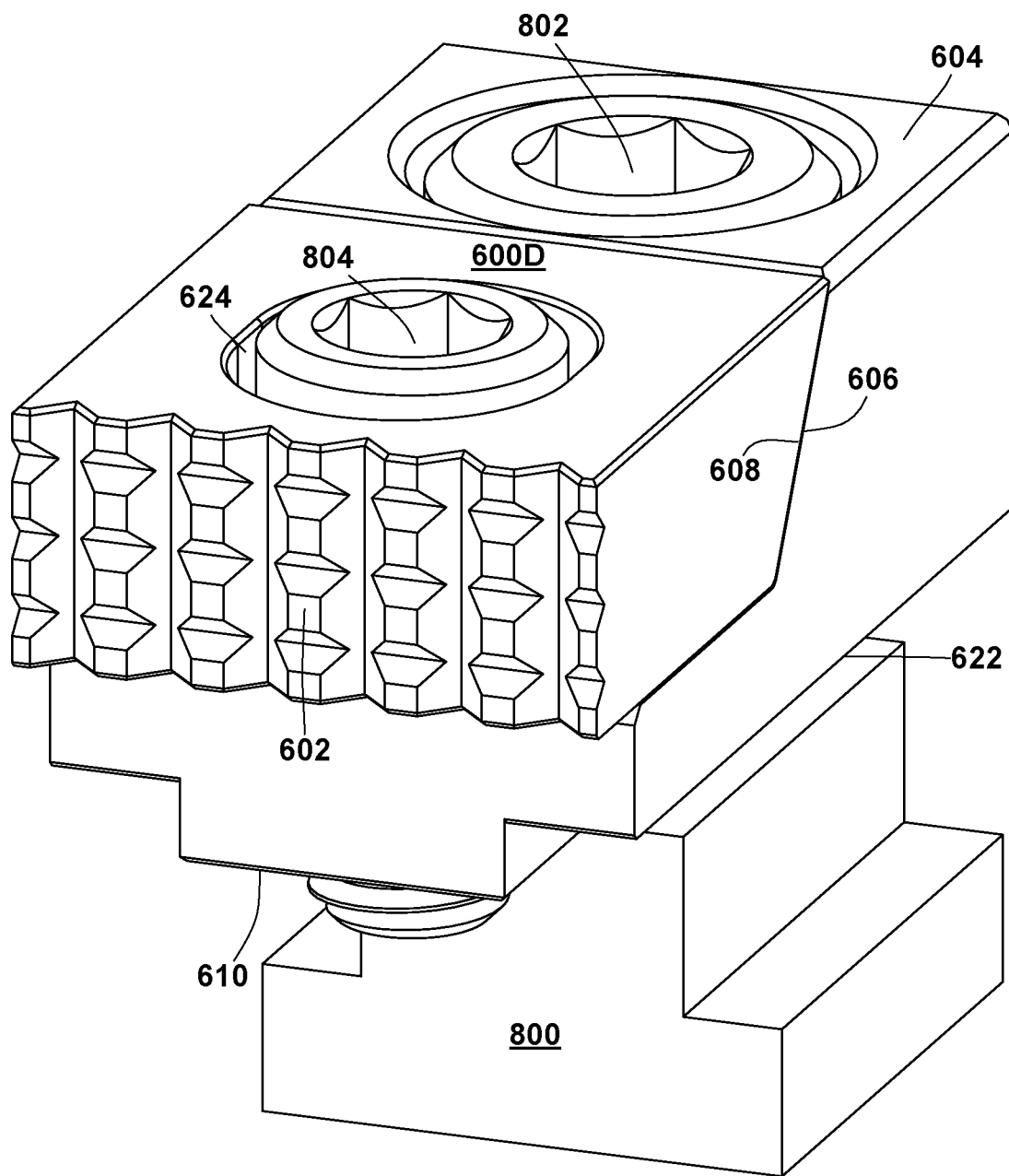
FIG. 31 is a perspective view of an exemplary embodiment of a clamp component suitable for use with the workholding systems described herein, as depicted, the clamp component is a manually activated, single slot hard jaw clamp, shown secured in in a clamped state.

With reference to the exemplary embodiment depicted in FIG. 31, there is depicted a single slot serrated hard jaw wedge clamp 600D. The single slot wedge clamp may be utilized in combination with, or independent of the fixed distance dual slot embodiments of clamps previously discussed. Additionally, the single slot wedge clamp of FIG. 31 may be utilized within any of the slots of known machine tool T-slot tables. The single slot clamp of FIG. 17 as depicted is the single slot serrated hard jaw wedge clamp 600D, though, it is contemplated, as with the various dual slot clamp embodiments previously described, the sliding jaw of the single slot clamp may instead be a single slot form of the soft clamp, or low profile clamp embodiments discussed previously. As before, the clamping is effectuated by tightening of the clamping fastener 804, which causes the sliding jaw 20 to slide the inclined plane surface 608 against the inclined plane surface 606 of the fixed body 10, to cause the clamp face to be advanced toward the workpiece and simultaneously pulled downwards, in order to grip and secure a workpiece against a table.

With reference to the exemplary embodiment depicted in FIGS. 32-40, there is shown an embodiment of a pivoting clamp 500, comprising the following major components: a fixed body 60, a pivoting jaw 50, and a plurality of fasteners 520 and 522.

Figure 32:
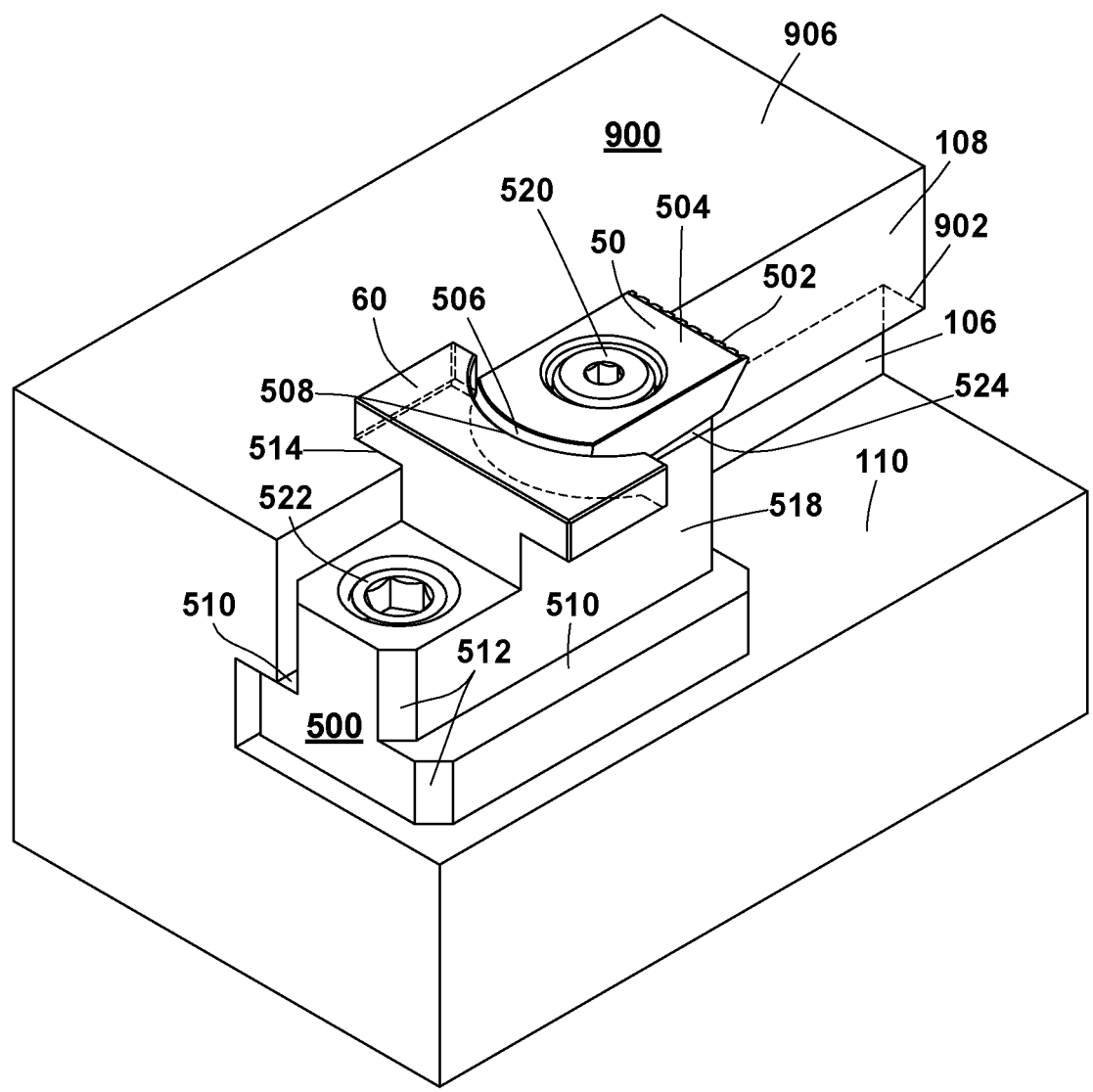
FIG. 32 is a perspective view of an exemplary embodiment of a clamp component suitable for use with the workholding systems described herein, as depicted, the clamp component is a pivoting clamp, as shown in partial section view residing in a T-slot.
Figure 34:
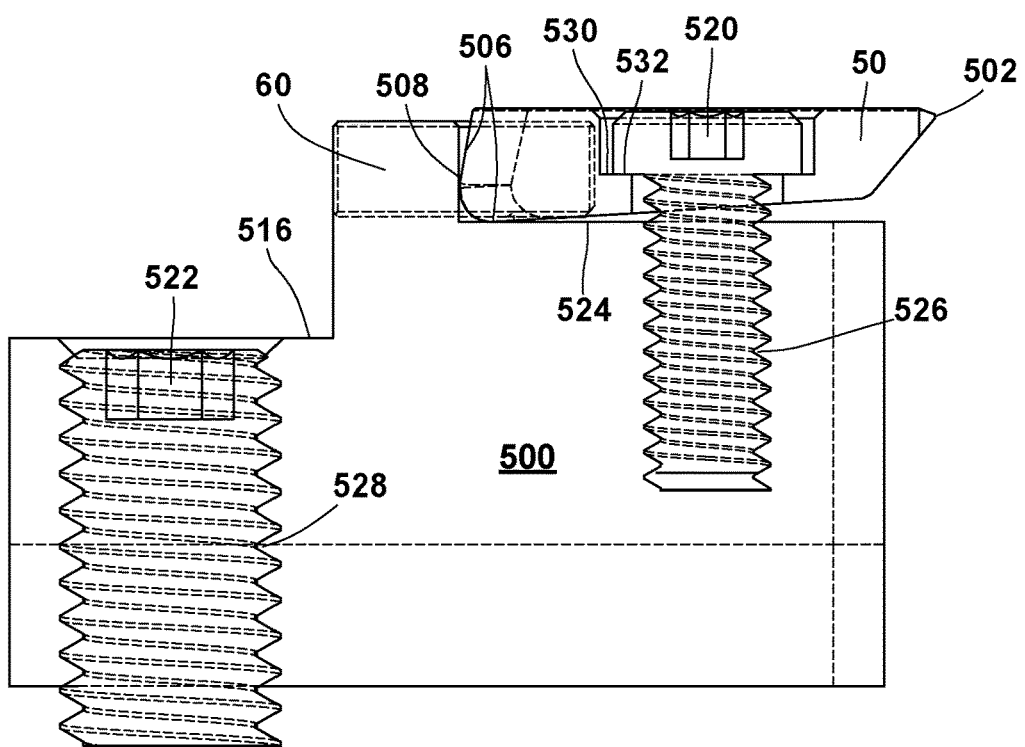
FIG. 34 is a right-side cross-sectional view of the exemplary clamp embodiment of FIG. 33, depicted in a clamped state.
Figure 36:
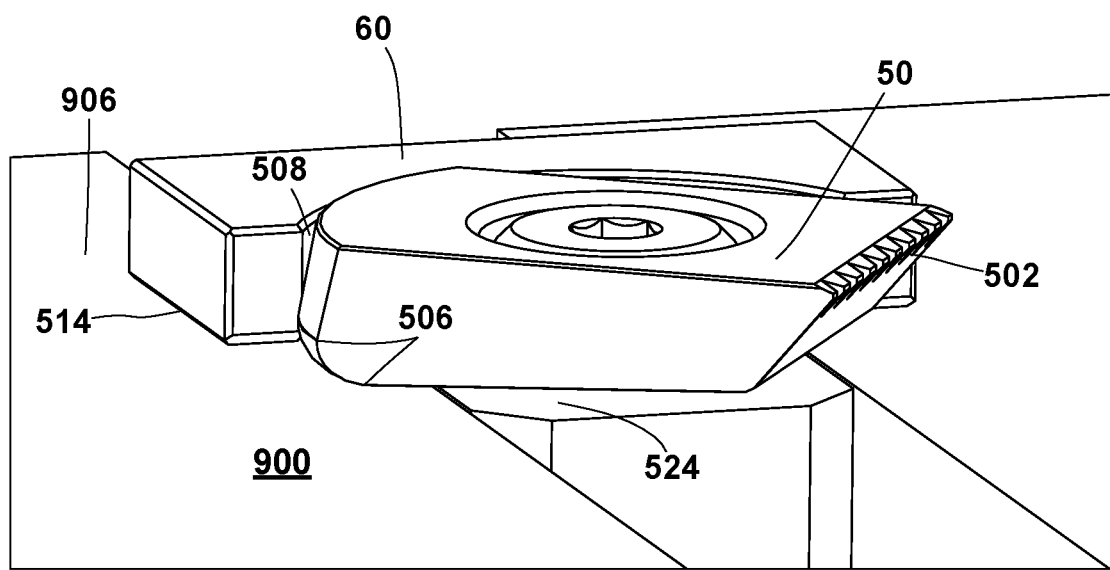
FIG. 36 is a perspective view of the exemplary clamp embodiment of FIG. 33, depicting a pivoting clamp resting upon the t-slot surface and in a clamped and partially pivoted state.

The fixed body 60 of the exemplary embodiment depicted in FIG. 32 provides a generally T-slot profile shape, and provides a pivot jaw cradle configured to reside at the top of the T-slot shape. The fixed body is provided with a plurality of fastener receiving threaded holes 526 and 528 (visible in FIG. 34) extending into the fixed body in a vertical direction when the pivoting clamp is residing in a horizontal T-slot table or base plate, additionally, the fastener receiving threaded holes are arranged transverse to the upper and lower surfaces of the fixed body. Arranged in the upper region of the fixed body 60, there is provided the jaw receiving cradle, having a curved backstop wall 508 surface, and a jaw rest planar surface 524 for the pivoting jaw 50 to be rest against. The jaw rest planar surface 524, when in use, should be in the same plane as the upper surface 906 of the T-slot table 900, or upper surface 116 of the base plate 100 as appropriate. As can be seen in FIG. 34, the curved backstop wall 508 surface is transverse to the jaw rest planar surface 524 of the jaw rest. As will be discussed, the pivot jaw cradle is configured to receive the pivoting jaw 50. There is provided a clamping fastener receiving threaded hole 526 in the jaw rest planar surface 524. A threaded clamping fastener 520 is directed through the pivoting jaw 50, and threaded into the clamping fastener receiving threaded hole 526. The threaded clamping fastener 520 provides a threaded body and a head having a greater outside dimension than the threaded body. In an embodiment, the threaded fastener may be any known threaded fastener having a head, for example a bolt, screw. In an embodiment, the threaded clamping fastener 520 is low profile cap screw. In this manner, the pivoting jaw 50 may be movably secured in position at the top of the fixed body, within the jaw receiving cradle, as the threaded body of the threaded clamping fastener 520 is directed through a non-threaded through hole or slot provided in the pivoting jaw, such that the pivoting jaw is free to move in a vertical direction, as well as pivot around the threaded body of the threaded fastener. In an embodiment, the head of the threaded clamping fastener 520, is unable to pass entirely through the opening in the pivoting jaw, and further, the head provides a lower surface 532 that can be applied against the pivoting jaw as the threaded clamping fastener 520 is advanced into the fixed body 60. In an embodiment, the opening in the pivoting jaw 50 is provided with a counterbore, such that the height of the head of the threaded clamping fastener 520 may fit at least partially, or entirely within the counterbore of the pivoting jaw 50, but the head is unable to pass through the opening completely; thus the underside of the head would apply pressure to the shoulder within the counterbore, and the head can remain within the counterbore and provide a lower profile to the pivoting clamp. The counterbore is of a radial dimension that is large enough to accommodate the relative movement of the pivoting jaw as the clamp face is advanced or retracted, and, in an embodiment, the counterbore is a slot partially extending between the serrations and the radius edged surface 506. The clamping fastener receiving threaded hole 526 is at least of a depth that is able to accommodate the length of the threaded clamping fastener 520 extending into the fixed body 60 when the threaded fastener is fully threaded, but may optionally extend through the entirety of the fixed body. In an embodiment, the top of the head within the counterbore of the pivoting jaw would be in alignment with, or optionally reside in alignment below the top plane 504 of the pivoting jaw. As can be seen with reference to FIG. 32, the fixed body 60 has a lower region provided in a profile similar in profile to that of a T-nut, so that it may be movably placed within a T-slot, as has been described previously. Thus the lower region of the fixed body is able to reside in a standard T-slot, as can be seen in with reference to FIG. 32. Elongated member surface 510 provide a shelf substantially parallel to T-slot restraining surface 902, which prevents fixed body 60 from being lifted upward beyond surface 902 of the T-slot. An elongated member surface 518 is substantially perpendicular with the t-slot table top plane 906, said elongated member surface 518 extends upward until surfaces 524 and 906 are substantially co-planar. A radius edge forming the backstop wall surface 508, is formed as part of an elongated member at the top of the pivoting clamp that is configured to extend laterally beyond the width of the T-slot opening and have clearance between parallel surfaces 514 and 906 (as depicted in FIG. 36), such that the fixed body may be slidably moved within the T-stop slot. As depicted in FIG. 32, the fixed body 60 may be provided with chamfered edge surfaces 512 at the profile corners, and may beneficially ease insertion of the fixed body into the T-slot, and further may aid in removal of the fixed body if contaminates are present from machining operations.

Figure 35:
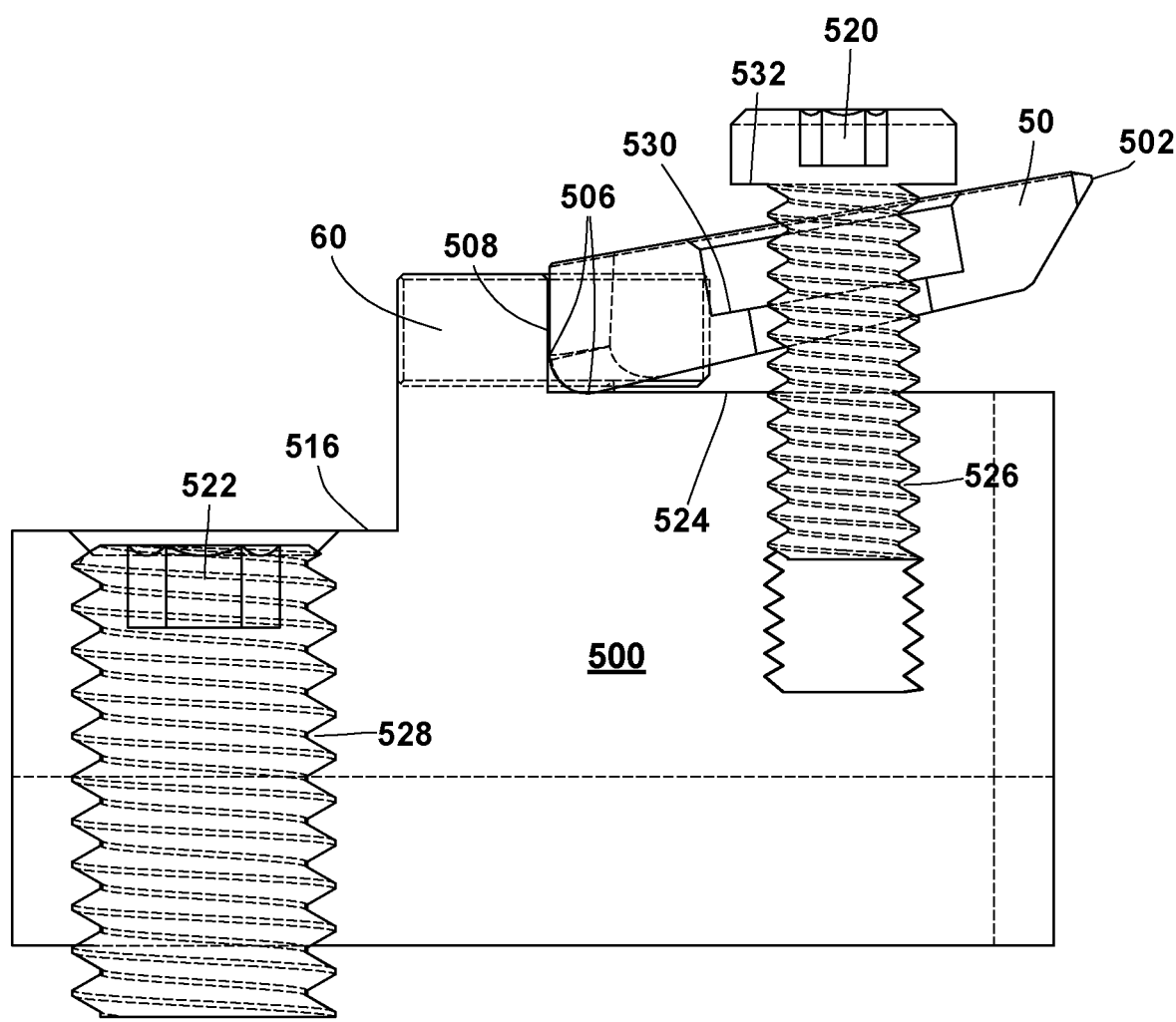
FIG. 35 is a right-side cross-sectional view of the exemplary clamp embodiment of FIG. 33, depicted in an unclamped state.

With reference to the exemplary embodiment of FIGS. 32-40, the pivoting jaw 50 will now be discussed. The pivoting jaw 50 may provide a plurality of hardened serrations 502, configured to grip the workpiece when applied there against. In an embodiment, the serrations may be uniform in nature, and arranged transverse to the pivoting jaw's top plane 504. The pivoting jaw may further provide a fastener receiving through hole, cylindrical or obround in nature extending here through, as well as a radius edged surface 506, and a top plane surface 504 which is the highest point of the pivoting clamp assembly, when clamped. In an exemplary embodiment, the pivoting jaw 50 is nearly rectangular, having two opposing lateral surfaces that are parallel to each other, a clamping edge that is perpendicular to each of the lateral surfaces, and at the opposite end away from the clamping edge serrations, there is provided an edge providing a curved profile. In an embodiment, the pivoting jaw 50 is provided as a slightly tapered body when viewed in cross section, as depicted in FIGS. 34 and 35, having a greater height dimension away from the serrations 502, and slightly tapering in a direction towards the serrations 502. The amount of taper in the cross section profile must not be so steep that the taper would interfere or provide too thin an amount of material below the counterbore that the material would be unsuitable for the head of a clamping fastener 520 to rest against and exert a clamping force against. In an embodiment, at least approximately $\frac{1}{3}^{rd}$ of the jaw thickness of material should remain below the counterbore, at its thinnest point, in the pivoting jaw 50, though this may be adjusted with fastener sizes, and the anticipated torque applied. The extent of the taper in the pivoting jaw may substantially increase once beyond the counterbore, as depicted in FIGS. 34 and 35, the taper changing to a steep slope towards the serrations 502 and the top plane of the pivoting jaw 50. At the end of the pivoting jaw opposite the serrations, the pivoting body is formed having a compound radius curve, where there is a radius edged surface 506, depicted in FIG. 36, where each of the curves making up the compound radius curve can readily be seen with reference to FIG. 37 in top view, and further a radius curve portion, also readily seen with reference to either of FIGS. 34 and 35 in cross section, where the radius edged surface 506 is approaching the jaw rest planar surface 524 of the fixed body. The compound radius curve as viewed in the top view, of FIG. 37, has a center point corresponding to the center of the clamping fastener 520, where the radius curve allows the pivoting jaw to pivot about the clamping fastener 520, within the backstop wall surface 508, so as to allow the pivoting jaw to be directed in a range of angles on either side of the axis aligned with the T-slot. In an embodiment, the pivot angle is at least 50 degrees, at least 45 degrees, at least 40 degrees, at least 35 degrees, at least 30 degrees, on either side of the T-slot axis. Additionally, the compound radius curve can be seen in cross-section profile in FIGS. 34 and 35. With reference to FIG. 35, the radius edged surface 506 may have a linear portion that abuts against the backstop wall 508 when the pivoting jaw clamp is in an elevated position, and unclamped. As the clamping fastener 520 is advanced into the fixed body 60, the head of the fastener encounters the pivoting jaw 50, and causes the pivoting jaw to pivot towards the jaw rest planar surface 524 of the fixed body, whereupon the curved region of the radius edged surface 506 abuts against the backstop wall 508, causing the pivoting clamp to be levered forward at the same time the serrations 502 are drawn down, thereby providing both clamping pressure and restraining pressure against the workpiece. In this manner, the profile of radius edged surface 506, when viewed in cross section of FIG. 34, may act as a cam mechanism, where the protruding rounded surface upon encountering the backstop drives the pivoting jaw in a clamping direction. The clamping actions will be discussed in further detail below.

Again, referring to FIG. 32 the plurality of fasteners will now be discussed. In an embodiment, clamping fastener 520 is a low-profile cap screw extending here through the pivoting jaw 50. In an embodiment, the securement fastener 522 is a set screw extending here through the fixed body 60. The securement fastener 522 may be threaded into threaded securement through hole 528, provided in the fixed body 60, the securement through hole 528 being configured to extend to the lower surface of the fixed body 60, such that the securement fastener 522 may be completely threaded through the fixed body, and protrude below the fixed body, as will be discussed. It is contemplated that alternative fasteners may be employed instead of a set screw as shown; for example, a fastener having a head and threaded body portion may be employed, if the dimensions of the fastener are appropriate for securing the fixed body within the T-slot.

Figure 33:
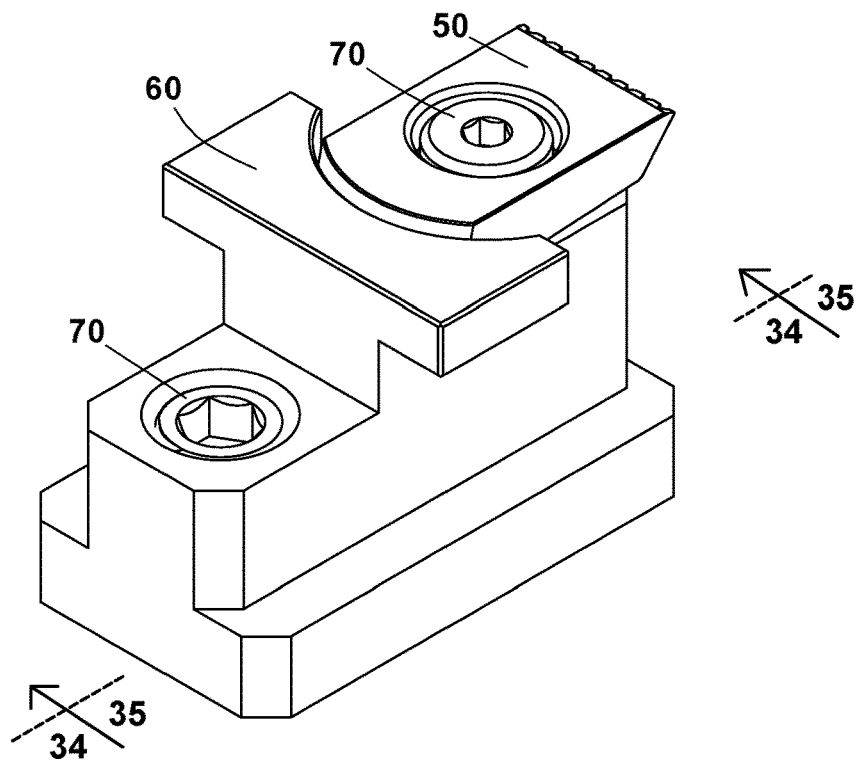
FIG. 33 is a perspective view of the exemplary clamp embodiment of the clamp of FIG. 32.
Figure 37:
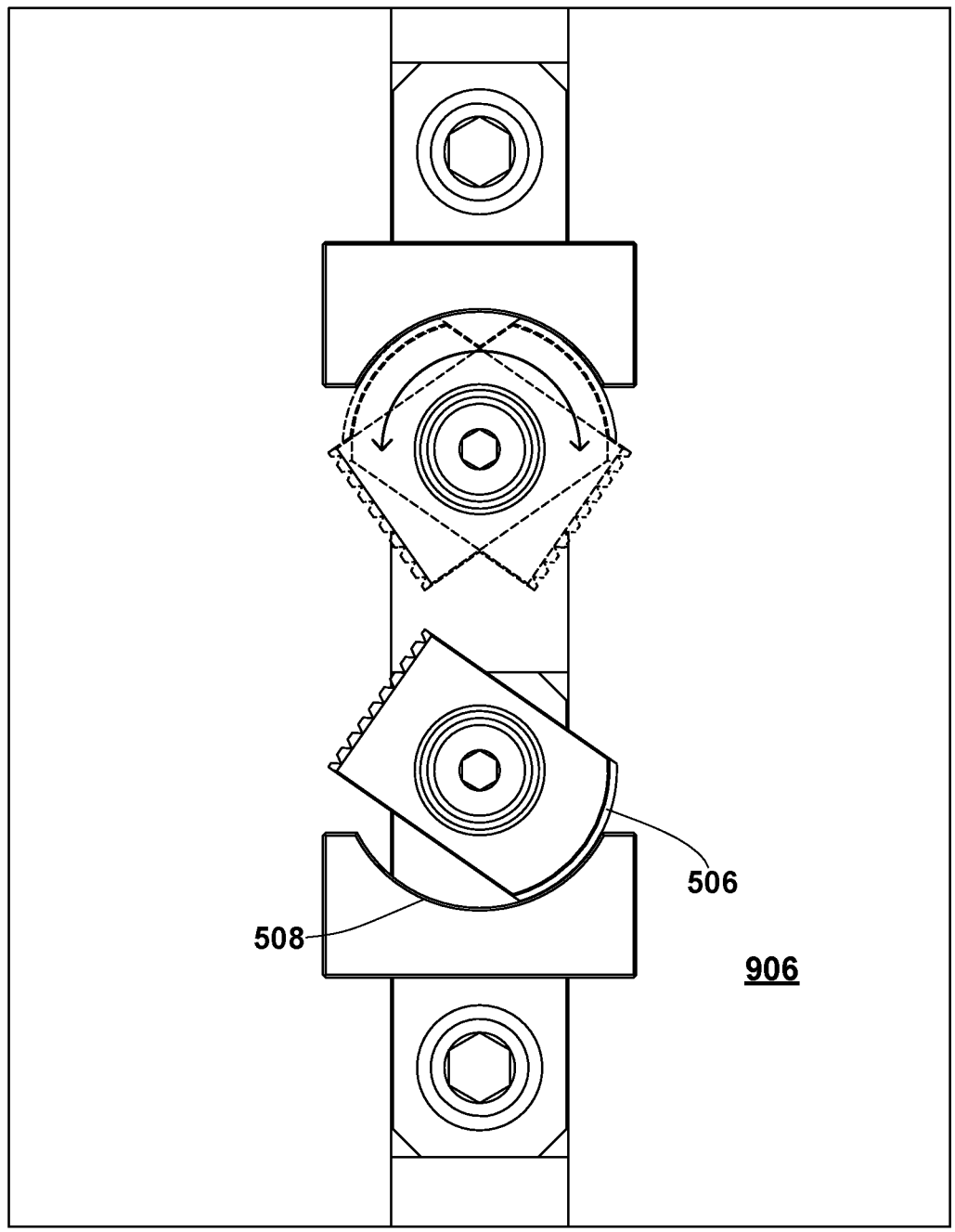
FIG. 37 is a top view of the exemplary clamp embodiment of FIG. 33, depicting a pivoting clamp demonstrating the rotational extents of the pivoting clamp.
Figure 38:
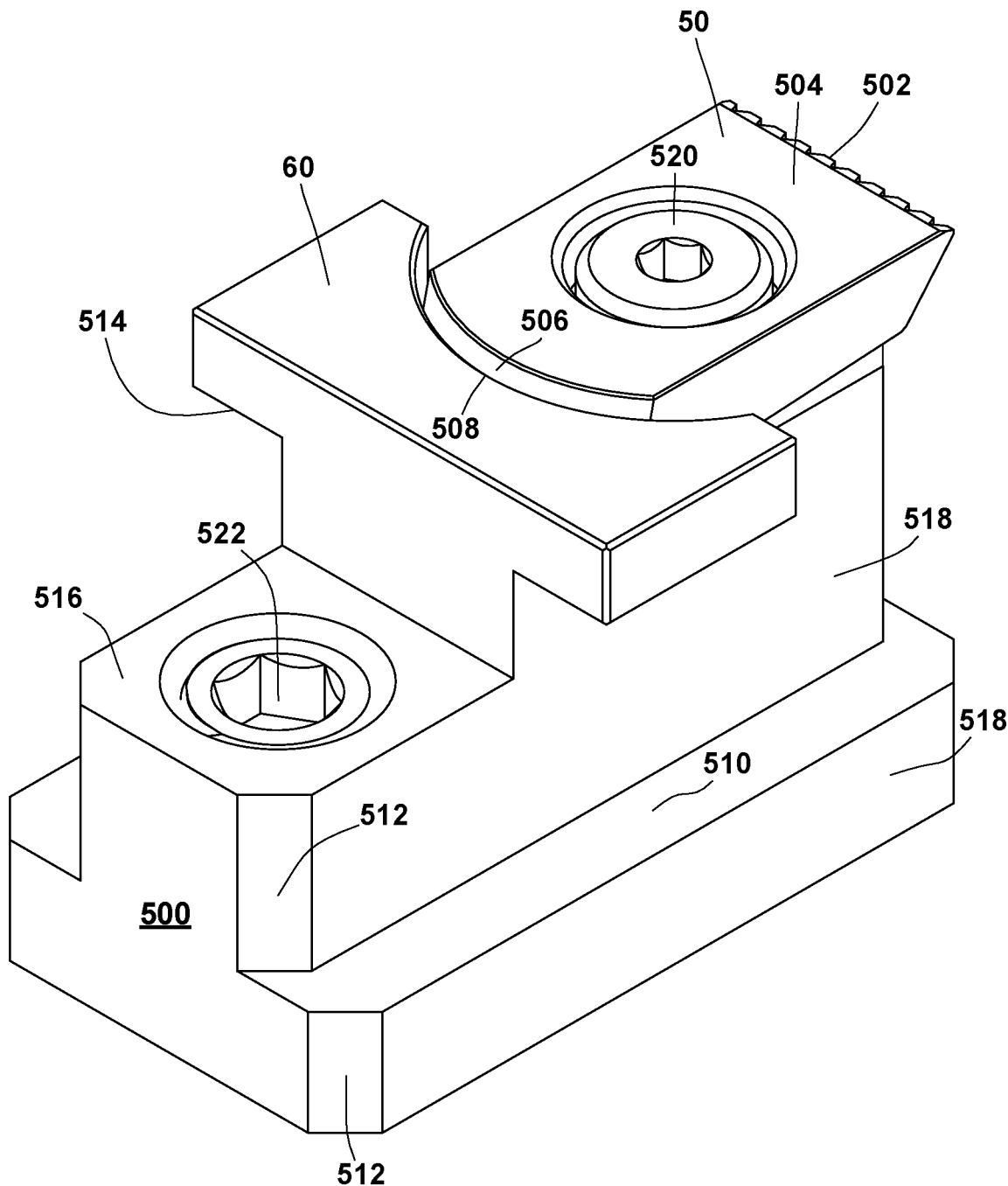
FIG. 38 is an enlarged perspective view of the exemplary clamp embodiment of FIG. 33, depicting a pivoting clamp.
Figure 39:
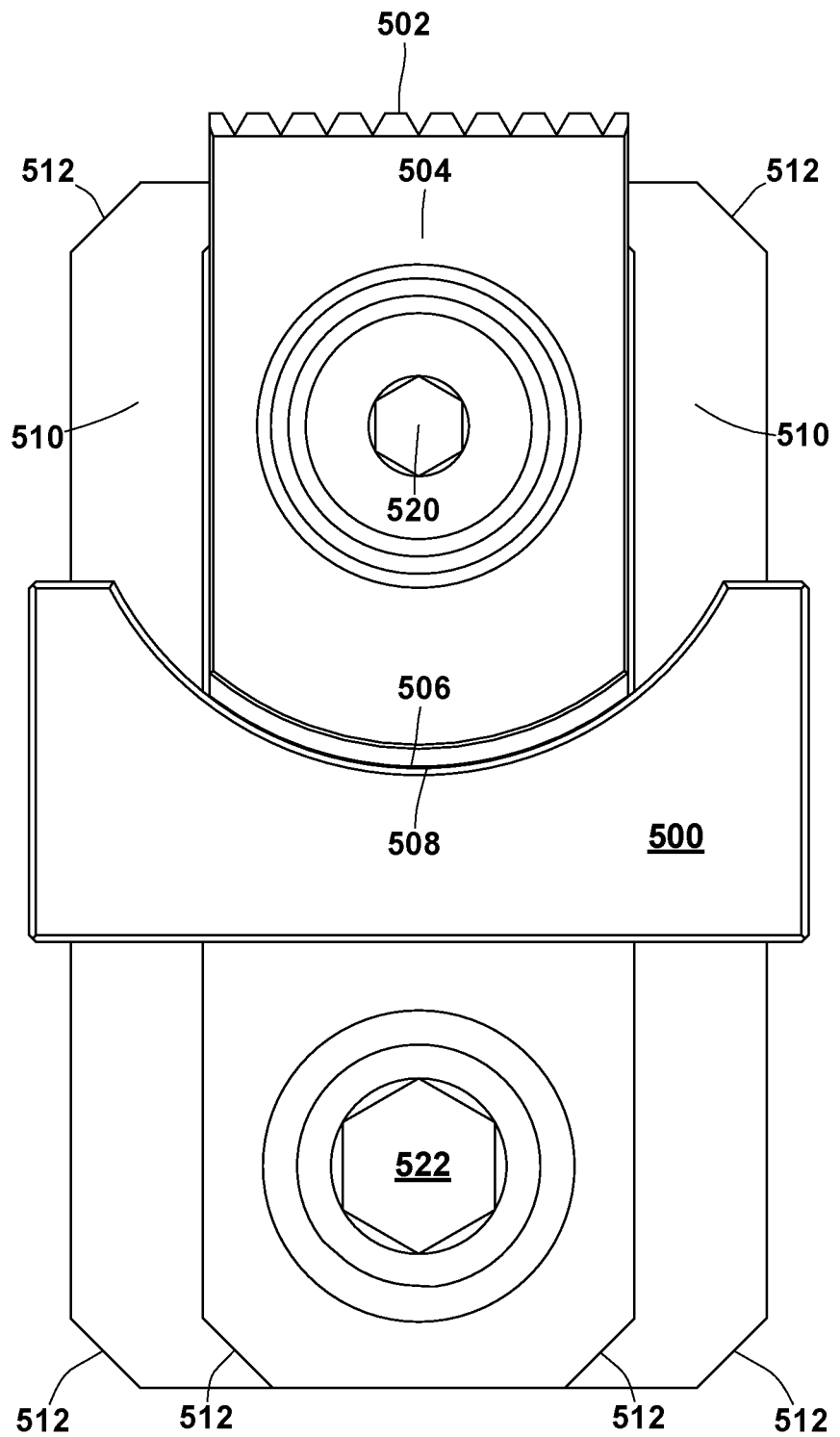
FIG. 39 is an enlarged top view of the exemplary clamp embodiment of FIG. 33, depicting a pivoting clamp.
Figure 40:
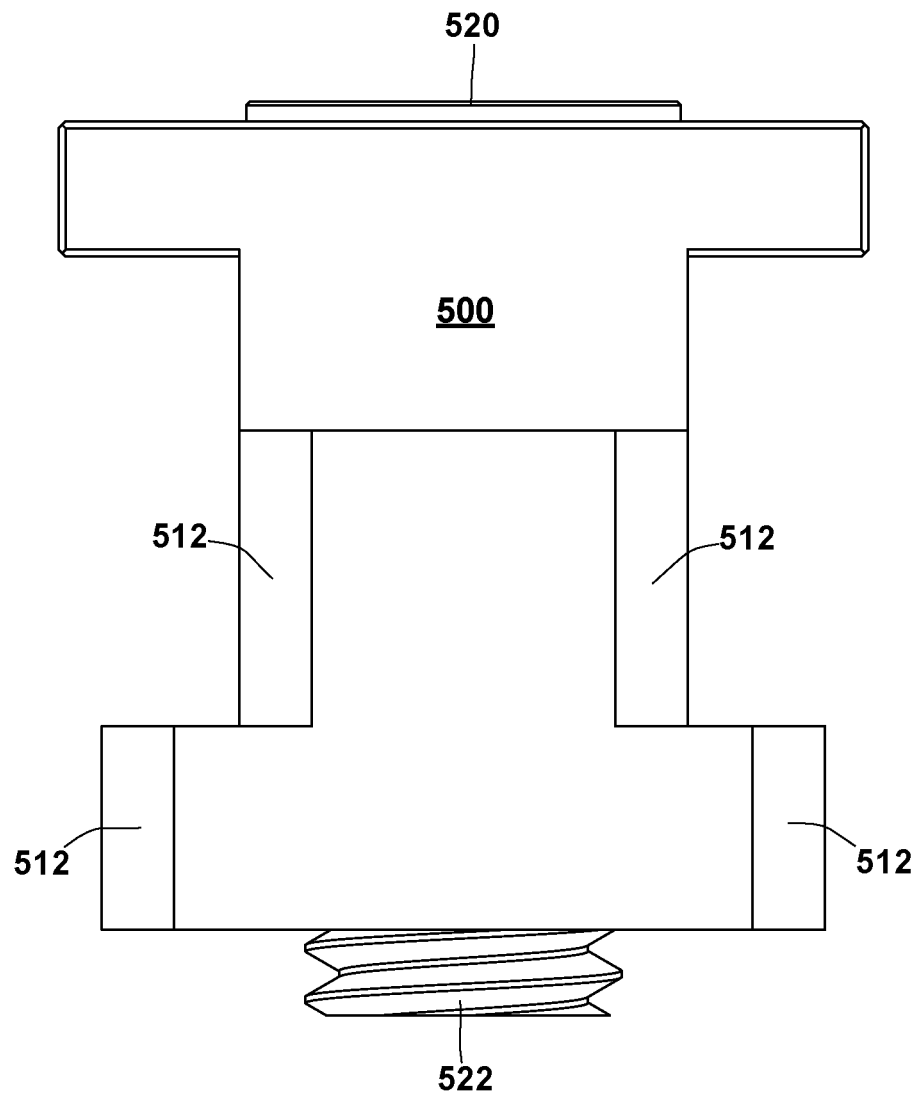
FIG. 40 is a back view of the exemplary clamp embodiment of FIG. 33.

The method of setting up and using the pivoting clamp 500 depicted in FIGS. 32-36 will now be discussed. FIG. 33 is side perspective view of the pivoting clamp, and indicates a side cross-sectional view of FIGS. 34-35 if cut vertically in a plane along the dashed line depicted. In use, a workpiece would be placed upon the Base Plate 100 or table 900, as appropriate. One or more of the pivoting clamp would be deployed for use by positioning the fixed body 60 in close proximity to the workpiece, by being advanced within a T-slot towards the workpiece. The clamping fastener 520 would be threaded away from fixed body 60, allowing the pivoting jaw 50 to move vertically and pivotably upon the clamping fastener 520 body. The pivoting jaw 50 is tilted upwards, away from the fixed body, and above the top parallel plane as can be seen in FIG. 35, and the fixed body 60 would then be positioned such that the hardened serrated teeth 502 contact the periphery of the workpiece. The pivoting jaw may have to be pivoted so that the serrated teeth 502 are all arranged against the work piece, or a maximal number of the teeth would be encouraged against the workpiece. At this point, the securement fastener 522 (for example, the set screw) would then be applied until extended out the bottom of the fixed body, and advanced toward t-slot bottom surface 110 as depicted in FIG. 32. The securement fastener 522 should be advanced further out of the fixed body 60 to contact the bottom surface 110 of the T-slot, and continued advancement of the securement fastener 522 will lift the fixed body 60 vertically until elongated member surface 510 contacts t-slot restraining surface 902. This contact between the substantially parallel surfaces serves to immobilize the fixed body 60. Referring back to FIG. 35, the clamping fastener 520 would then be applied, drawing downward through the fastener receiving through hole in the pivoting jaw 50, and into fixed body 60, advancing into the clamping fastener receiving threaded hole 526. The pivoting jaw 50 is provided with radius edged surface 506 that are radiused to allow the pivoting jaw 50 to pivot within the fixed body 60 matching radius of backstop wall surface 508, and also pivot above the jaw rest surface 524. As clamping fastener 520 is advanced, and the underside of the head of the fastener, having surface 532 contacts pivoting jaw 50 counterbore surface 530, the serrations 502 at the clamping edge of the pivoting jaw 50 are drawn downward and forward, as backstop wall surface 508 does not allow radius edged surface 506 to protrude beyond the backstop wall 508. Continued advancement of the clamping fastener 520 will cause the pivoting jaw 50 to continue to be drawn down until the top plane surface 504 of the pivoting clamp is substantially parallel or approaches parallel with the jaw rest planar surface 524 of the fixed body, as depicted in FIG. 34, and in front perspective view in FIG. 40. This drawing down motion creates a great deal of force, both downward and forward as fixed body 60 has been immobilized within the T-slot, as well as clamping against a workpiece when placed against an opposing pivoting clamp, or workstop. This downward and forward force causes the hardened and serrated teeth 502 to reside firmly against, or may pierce the workpiece outer periphery, effectively immobilizing the workpiece. Referring to FIG. 36, at least some clearance should exist between fixed body 60 bottom elongated member surface 514 and top plane surface 906 of the t-slot, so as to allow the pivoting clamp 500 to be movable within the T-slot, prior to securement fastener 522 being applied. Furthermore, fixed body 60 jaw rest surface 524 should be substantially coplanar with upper T-slot surface 906 of the T-slot table, or upper surface 116 of base plate 100, as appropriate. This coplanar relationship allows pivoting jaw 50 to be rotated within radiused edge of the backstop wall surface 508, while being supported where the pivoting jaw is extended beyond fixed body 60 jaw rest surface 524 as can be seen in FIG. 36. The top view of the pivoting clamp 500, as depicted in FIG. 37, depicts the travel extents of this pivoting rotation of the pivoting jaw 50, by sliding the radius edged surfaces 506 and backstop wall surface 508 against each other respectively, while still being supported by surface 906 of the T-slot surface the pivoting clamp is secured in, for example, the base plate 100, or the upper surface 116 of the T-slot table, as appropriate.

Figure 41:
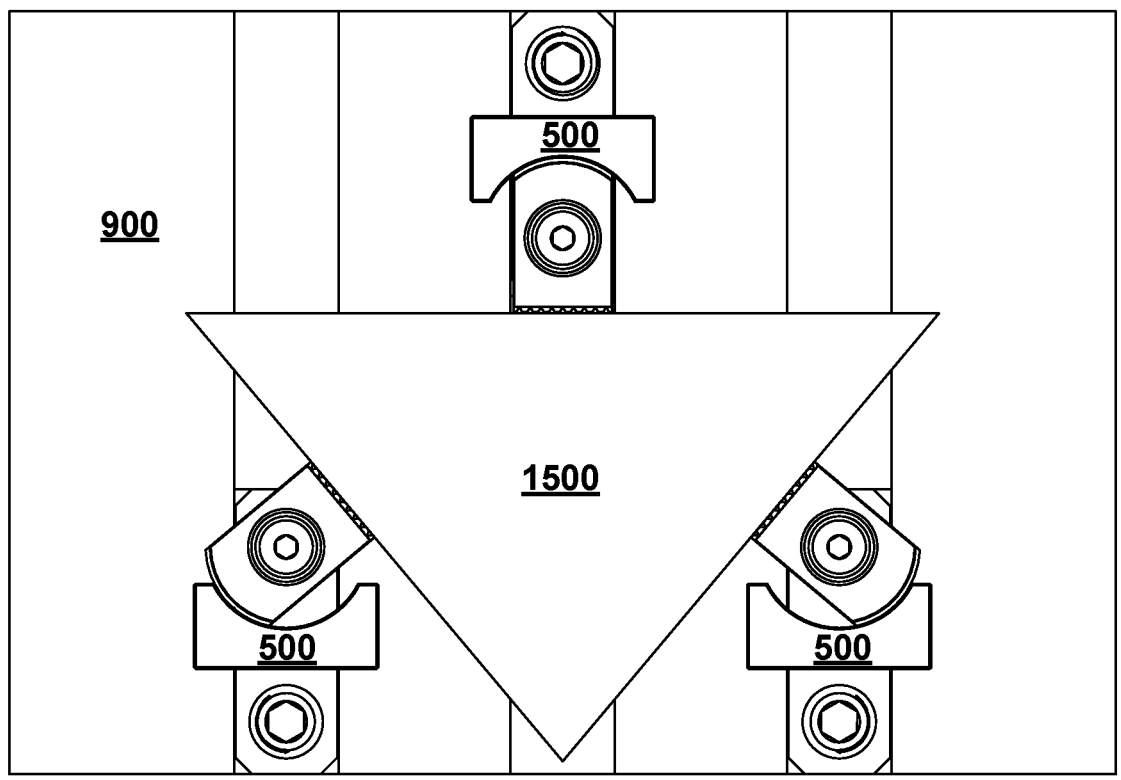
FIG. 41 is a top view of the exemplary clamp embodiment of FIG. 33, depicted as a plurality of pivoting clamps secured in a plurality of T-slots, the clamps cooperatively securing a workpiece of irregular shape.

FIG. 41 depicts the use of an exemplary embodiment having a plurality of pivoting clamps 500 positioned within T-slots on a surface 900, though it is contemplated that any of the base plate 100 embodiments described herein may be employed similarly. As shown in FIG. 41, there are provided 3 pivoting clamps corresponding to those described with reference to FIG. 33, configured to clamp an unconventional workpiece shape that would typically require custom workholding to secure as the majority of the workpiece sidewall surfaces suitable for clamping are not in parallel or perpendicular alignment with the T-slots. The clamping of the sidewall surfaces is beneficial where the workpiece is to be facemilled, and the tooling must be able to work the entire face of the workpiece, and must be clamped in a manner that will not interfere with milling any portion of the face of the workpiece. As depicted, there is one sidewall surface that is disposed perpendicularly to a T-slot, as depicted in FIG. 41, where the other two sidewall surfaces are at an angle other than perpendicular or parallel to the T-slot. Typically, where there is a need to effect the clamping of sidewall surfaces on workpieces having angles askew of the parallel or perpendicular alignment with the T-slots, there would be required specialized custom workholding to be created. By employing the pivoting clamp exemplary embodiments described herein, the workpiece is able to be secured by applying a plurality of clamps delivering opposing forces to the exterior periphery of the workpiece. In the exemplary embodiment depicted in FIG. 41, the use of 3 pivoting clamps, where each pivoting clamp force is counteracted by a pair of pivoting clamps, aligned collectively in opposition to the other clamp; as depicted here, the opposition force is created by staggering the pivoting clamps 500 at 120° increments relative to the shape to be secured. It is contemplated that more or less of the pivoting clamp embodiments may be employed to secure a workpiece, using only the pivoting clamps described herein, or in combination with one or more of any of the clamps described here in, or as known in the art.

With reference to the exemplary embodiment of FIGS. 42-49, there is depicted a T-slot work stop 300. The T-slot work stop as shown generally has the following major components: a work stop body 80, and a work stop fastener 90.

Figure 42:
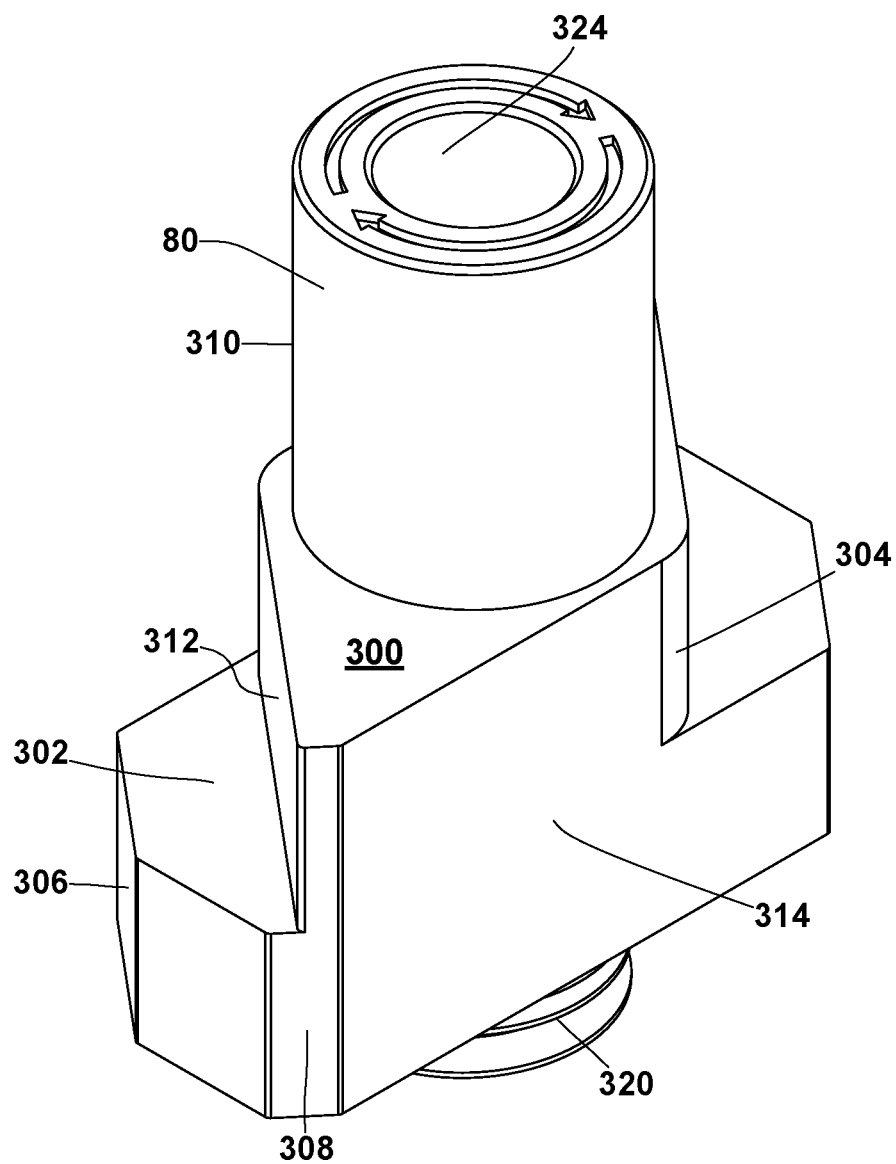
FIG. 42 is a perspective view of an exemplary embodiment of a work-stop component suitable for use with the workholding systems described herein.
Figure 43:
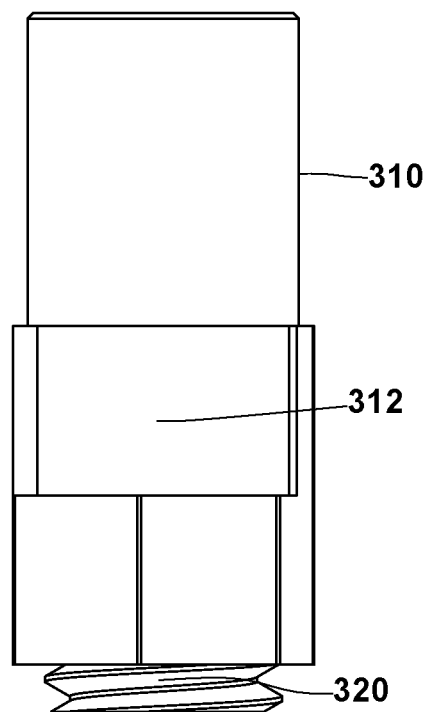
FIG. 43 is a front view of the work stop component of FIG. 42.

Referring to FIG. 42 the work stop body 80 will now be discussed. The work stop body 80 is comprised of a cylindrical upper portion 310 which is to be substantially round in horizontal profile and in an embodiment is uniform when viewed transverse to the top plane of the cylindrical portion. In an embodiment, the cylindrical upper portion 310 is a right circular cylinder, as this shape would beneficially provide a similar rest point for the workpiece to be placed against, regardless of the angle in which the work stop is rotated, when placed within a T-slot table. In another embodiment, the upper portion of the body may be a frustum of a right circular cone, where there may be a need for clearance between the upper face of the workpiece and the work stop body 80, but still provide a reliable rest point for the workpiece to be placed against. It is contemplated that in an embodiment, the upper portion of the body may be any shape suitable for the work piece to be located against, including multi-faceted prisms of, as non-limiting examples, triangles, rectangles, pentagons, and hexagons, among others suitable shapes. The work stop body 80 further houses a fastener receiving through hole 324 arranged transverse to the top plane of the work stop and extending here through. The work stop body 80 is provided with a lower portion that when viewed in end on profile, as depicted in FIG. 43, appears substantially rectangular, and when rotated by a determined amount, the end-on profile takes on a profile similar to that of a T-nut, as can be seen with reference to FIG. 47. The lower portion of the work stop body 80 is provided with a plurality of chamfered edges, 306 and 312 acute to the right plane surfaces 314 of the work stop body 80. In an embodiment, the lower portion of the work stop body 80 may also be provided with a plurality of chamfered edges minor that are obtuse to the right plane surfaces 314. The work stop body 80 may further be provided with a plurality of elongated planar surfaces 302 that are parallel to the work stop top plane, and transverse to, and extended between, chamfered edges 306 and 312.

Figure 44:
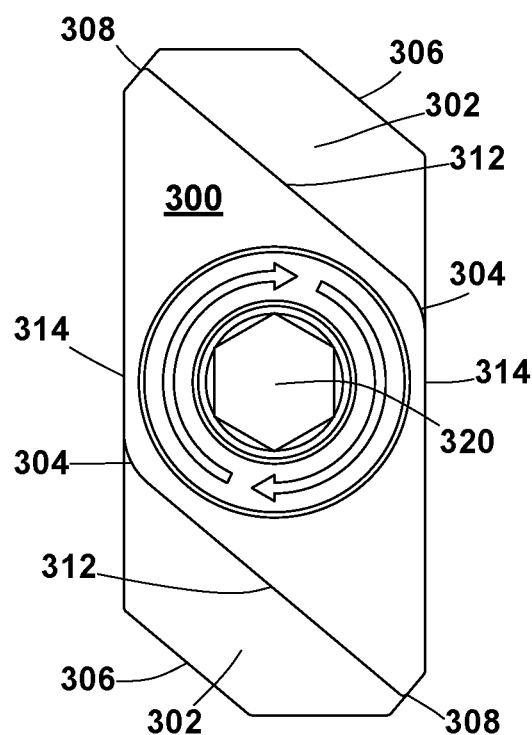
FIG. 44 is a top view of the work stop component of FIG. 42.
Figure 45:
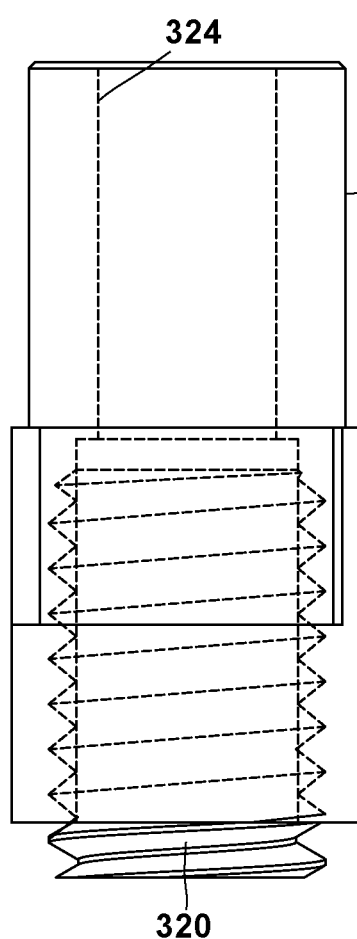
FIG. 45A is a front view of the work stop component of FIG. 42, depicting its internal features.
FIG. 45B is an exploded front view of the work stop component of FIG. 42.
Figure 45:
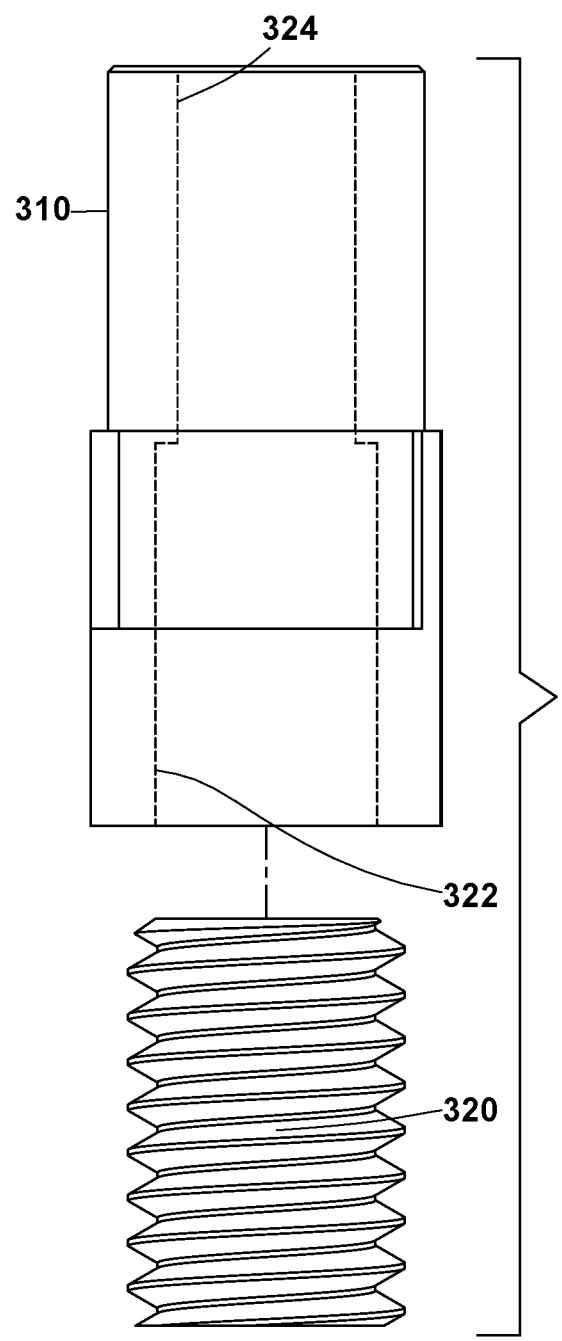

Again, referring to FIG. 42, the work stop fastener 320 for use with the T-slot work stop 300 will now be discussed. The work stop fastener 320 may be a threaded body, for example, a set screw. As depicted, work stop fastener 320 has threads on at least a portion of its length and configured to be threaded into the fastener receiving through hole 324, which is at least partially internally threaded to receive the work stop fastener 320, as can be seen in FIGS. 43-45. The work stop fastener 320, in an embodiment is to be substantially flat on the bottom, or may optionally be provided with a recessed drive feature, so as to accommodate a drive tool to thread the work stop fastener 320. In another embodiment, both the upper and lower surfaces of the fastener may be provided with a recessed drive feature.

Figure 46:
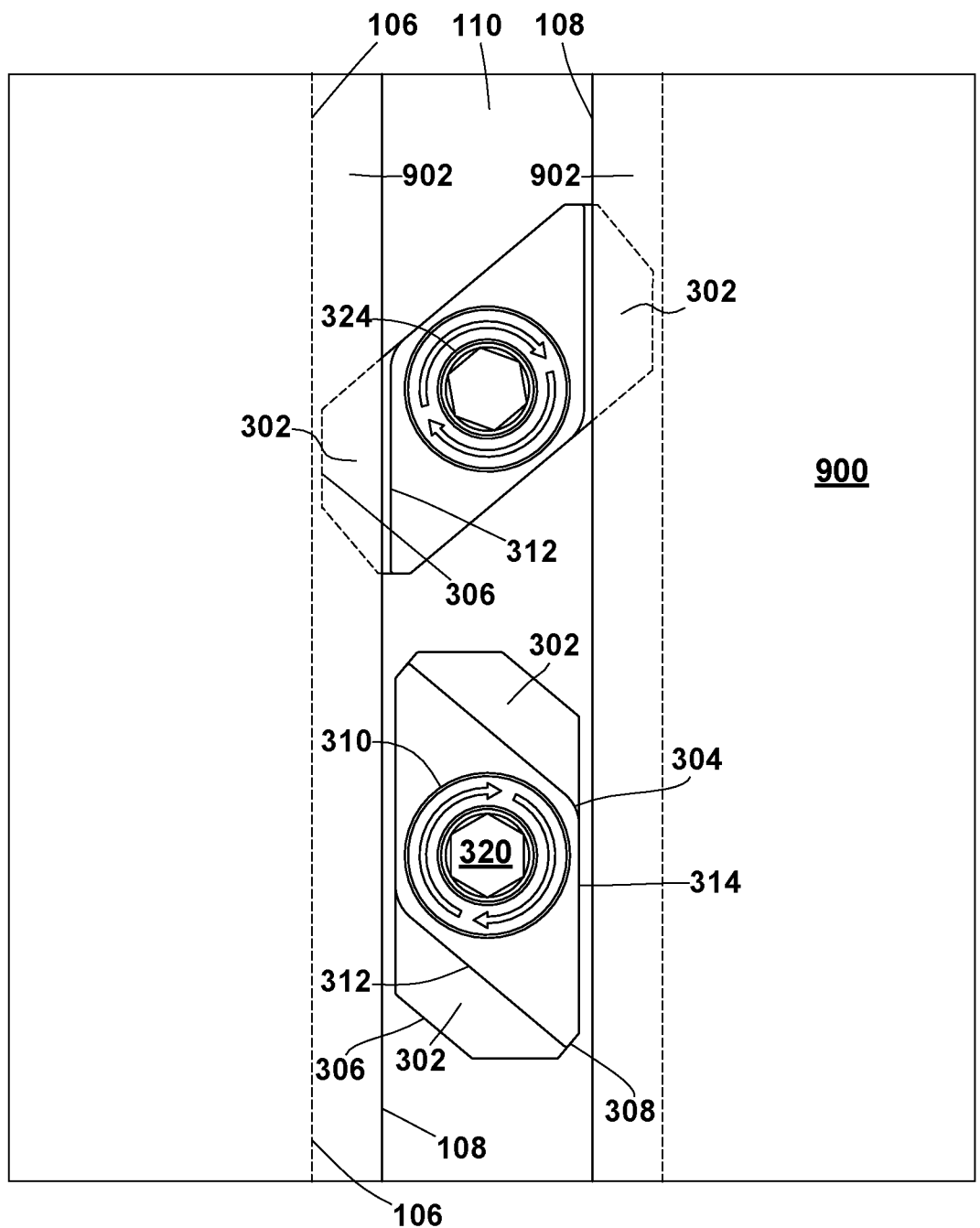
FIG. 46 is a top view of the work stop components of FIG. 42 at various stages of placement, and detailing one possible method of placement and securement of the work stop component in a T-slot.
Figure 47:
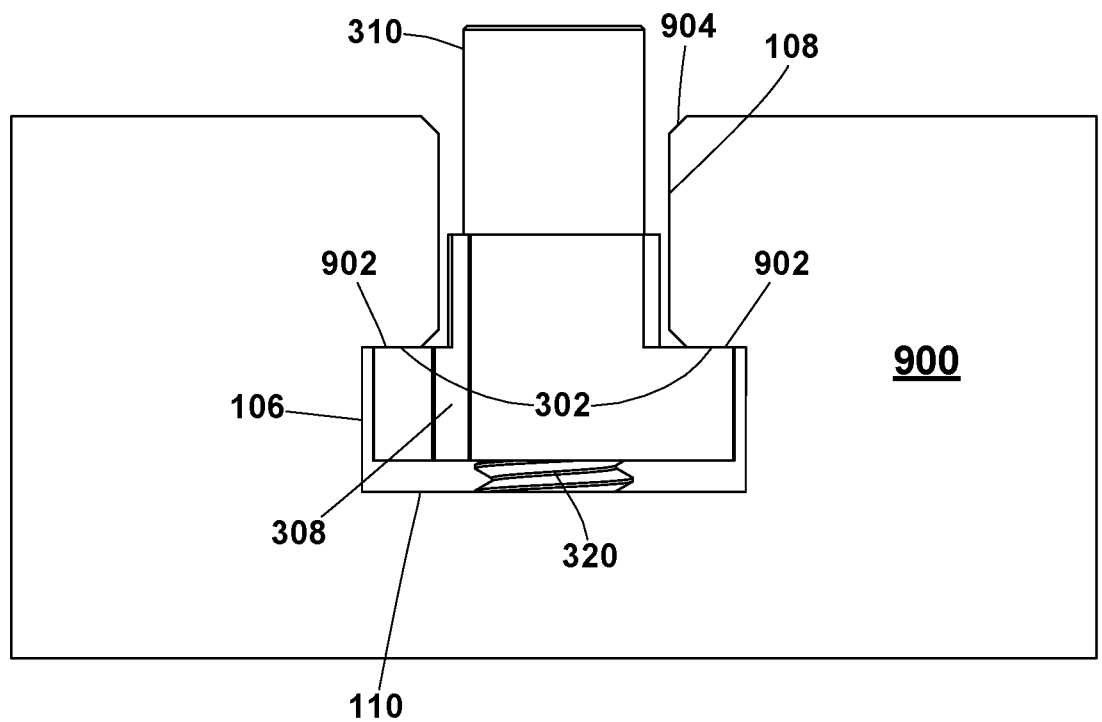
FIG. 47 is a front view of the work stop component of FIG. 42, secured within a T-slot.
Figure 48:
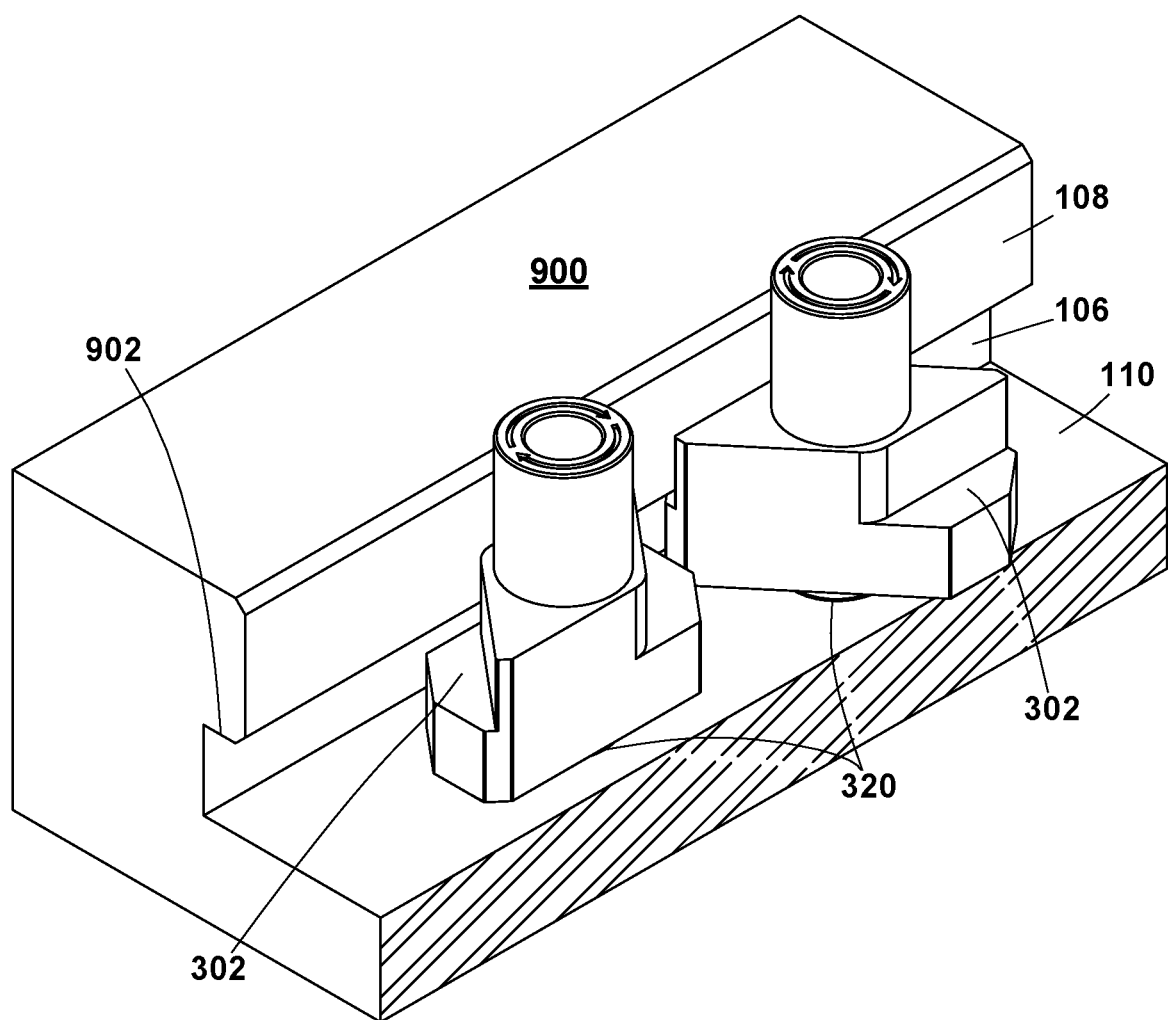
FIG. 48 is a perspective sectional view of the work stop components of FIG. 42 at various stages of placement, and detailing one possible method of placement and securement of the work stop component in a T-slot.

The method of setting up and using the T-Slot Work Stop 300, as depicted in FIGS. 42-49, will now be discussed. In an embodiment, a workpiece is to be placed upon a base plate 100 as depicted in FIG. 14, having a top plane forming an upper surface 116. The T-slot work stop 300 of FIG. 45B would then be assembled, by directing the work stop fastener 320 into the fastener receiving through hole 324 in the work stop body 80. As the work stop has a through hole that is configured to extend through the body, the fastener may be directed into the body via an opening provided in the top surface of the cylindrical upper portion, or via an opening provided in the bottom surface, and threaded upwards at least partially into or through the lower portion of the work stop body 80. At least a portion of the through hole 324 within the work stop body 80 features corresponding threads, so as to receive threaded work stop fastener 320. In an embodiment, the work stop fastener 320 would be threaded upward from the bottom surface of the work stop 300. The fastener through hole 324 in the top surface of the upper cylindrical portion may serve as an access point into which a drive tool, such as an allen wrench or other fastener driver, may be inserted from the top plane of the work stop, to engage a corresponding drive feature in the fastener that has been at least partially threaded into the work stop body 80. As can be seen in FIG. 46, there is depicted an internal hexagon drive feature, though it is contemplated that the drive feature may be of any variety that is suitably driven by axial rotation, including by way of example, but not limited to, slotted and cruciform drives, triangle, square and hexagon drives, torx drives, and variations thereof. The drive tool can then be rotated, so as to draw the fastener downward or upwards in the work stop body 80. While the work stop fastener 320 is substantially drawn into the through hole 324, and within the work stop body 80, the T-slot work stop may then be inserted into the T-slot from the open end of the T-slot. Alternatively, the work stop 300 may be inserted anywhere along the T-slot channel, as depicted in FIGS. 46 and 48, by rotating the work stop 300 so as to align the narrow width of the work stop 300 with the top opening of the T-slot, and lowering the work stop 300, passing through the upper opening of the T-slot until the lower portion of the work stop body 80 is residing within the T-slot channel. Additionally, by rotating the work stop 300, shown here in a clockwise direction, the work stop 300 will be angled such that the longer dimension of the lower portion of the body will ensure that at least a portion of the lower portion of the work stop body 80 is underlying the restraining surfaces 902 of the T-slot, as depicted in FIGS. 46, 47, and 48, so that the elongated planar surfaces 302 of the work stop body 80 would be underlying the T-slot restraining surfaces 902. Additionally, when rotated in this manner, the chamfered edge surfaces 306 (lower) and 312 (upper) would be in contact with the T-slot sidewall surfaces 106 and 108, respectively. In this rotated orientation, the work stop 300 lower portion of the body 80 would be retained within the T-slot, as the work stop 300 would be prevented from being withdrawn upwards out of the opening extending along the T-slot. The cylindrical upper portion of the work stop 300 would remain exposed above the surface of the base plate 100, as can be seen with reference to FIGS. 47 and 48. However, the T-slot when rotated as described may still be slidably moved within the length of the T-slot. The T-slot work stop 300 may be positioned in the desired location, within the T-slot, so as to provide a reference point on the work surface due to the projecting cylindrical upper portion of the work stop 300, or may be abutted to the workpiece, thereby providing a repeatable reference point. Referring now to FIG. 47, there is depicted a front view of the work stop 300 having been rotated within the T-slot, so as to extend the dimensions of the workstop and be retained within the T-slot. As depicted here, the work stop fastener 320 is accessed from the top plane via a drive mechanism inserted into the opening at the top surface of the work stop, and the drive mechanism is rotated, so as to draw the fastener downward, advancing the fastener out of the work stop body 80, and causing work stop fastener 320 to contact t-slot surface 110. Continued rotation of the fastener upon the threads, will result in an upward jack force being applied against the work stop body 80, as the fastener is in contact with the T-slot bottom surface 110, thereby incrementally raising the work stop with each turn of the drive tool. The upward movement of the work stop will cause the elongated planar surfaces 302 to contact t-slot restraining surfaces 902, preventing the T-slot work stop from being lifted further, and securing the work stop in place as the substantially planar surfaces of 302 and 902 are pressed together by the jacking force of the work stop fastener 320. The secured work stop 300 may be seen with reference to FIG. 47, and also in FIG. 46 in top plan view. The use of the work stop 300 has been described with reference to securing the work stop 300 within a T-slot of a base plate 100 embodiment, but may similarly be deployed in a standard T-slot table 900.

Figure 49:
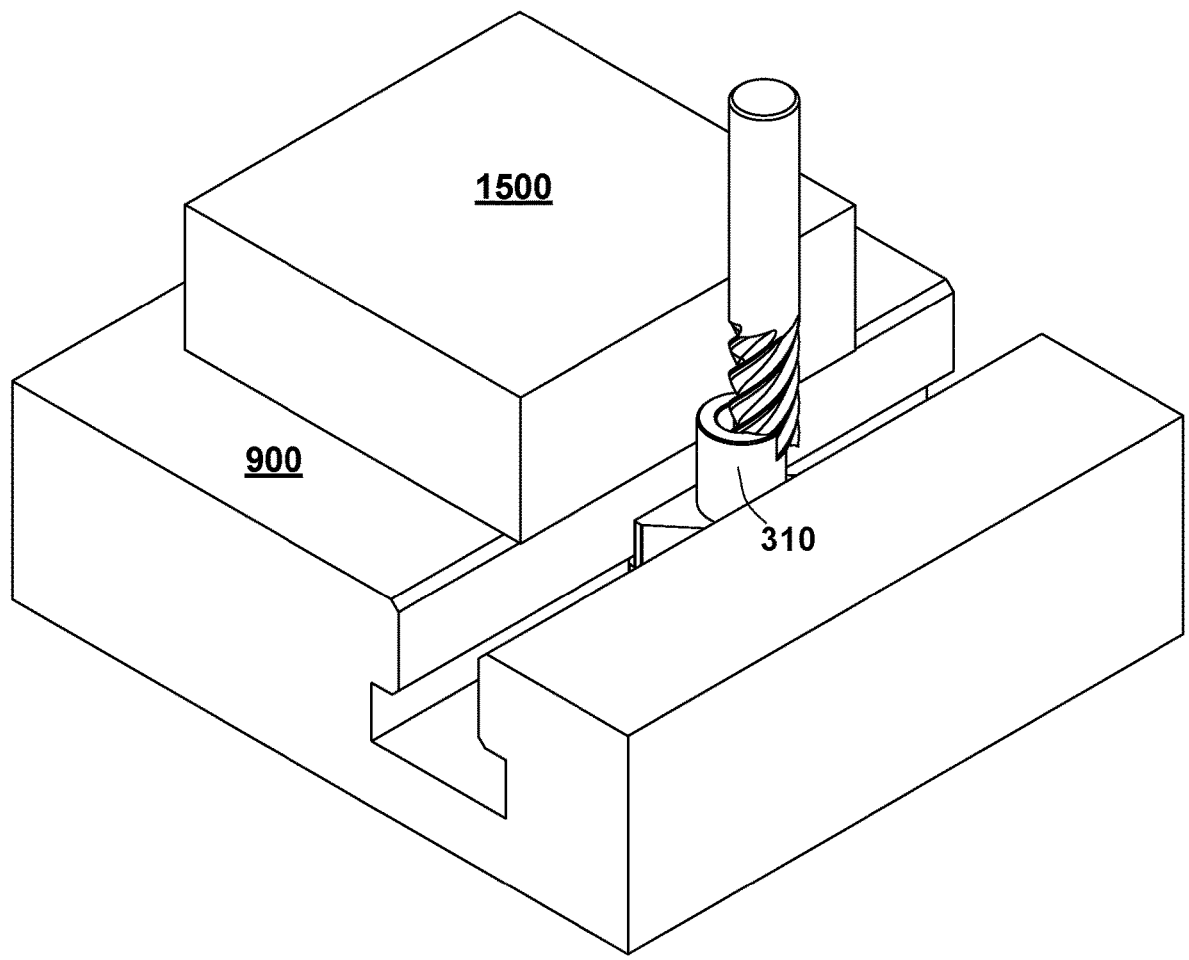
FIG. 49 is a perspective view of the work stop component of FIG. 42, depicted locating a workpiece for machining, and also demonstrating milling of the work stop component while secured within the T-slot.

In an exemplary embodiment, and as depicted in FIG. 49, a workpiece is shown being located by the T-slot work stop 300. In the depicted embodiment, the work stop cylindrical upper portion 310 is capable of being machined. For example, the cylindrical portion may be made of metal capable of being machined, such as aluminum, brass, or steel. Alternatively, softer material, such as polymers and plastics may be employed for the cylindrical portion of the work stop body 80. In an embodiment, the machineable material may be left in an annealed state, so as to allow machining of the work stop 300, if additional clearances are needed. As has been described, the work stop may preferably be of a design that requires clockwise rotation to secure the workpiece within the T-slot, as in this application, the cutting force experienced by the work stop 300 as it is milled would be directed into the rotational stop, in this case, the T-slot wall surfaces. The clockwise motion of the cutter, along with the clockwise motion of the tool's path also referred to as climb milling, are of a direction that may help to prevent the T-slot work stop 300 from being dislodged during machining. In an embodiment, the T-slot work stop can be hardened for a non-machinable embodiment that is more resistant to wear.

Figure 50:
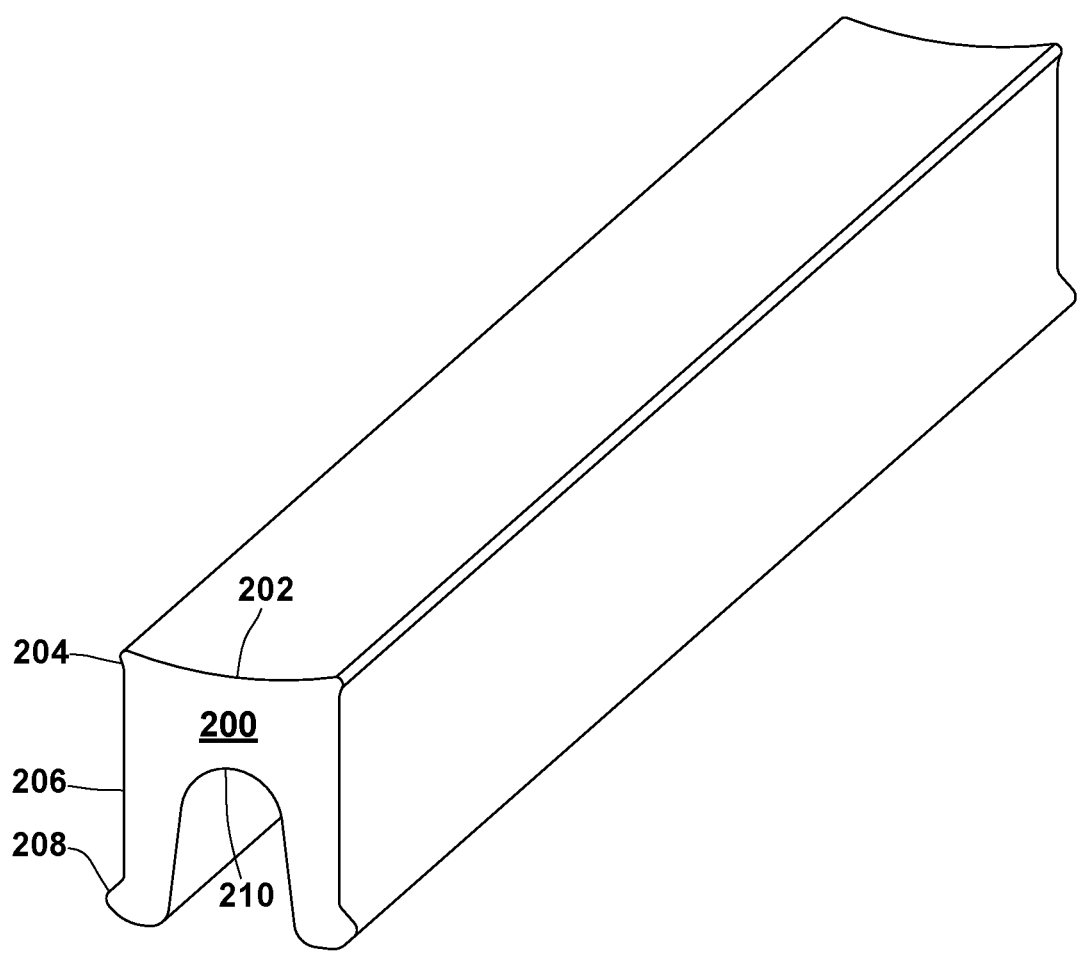
FIG. 50 is a perspective view of an exemplary embodiment of a T-slot chip guard suitable for use with the workholding systems described herein.
Figure 51:
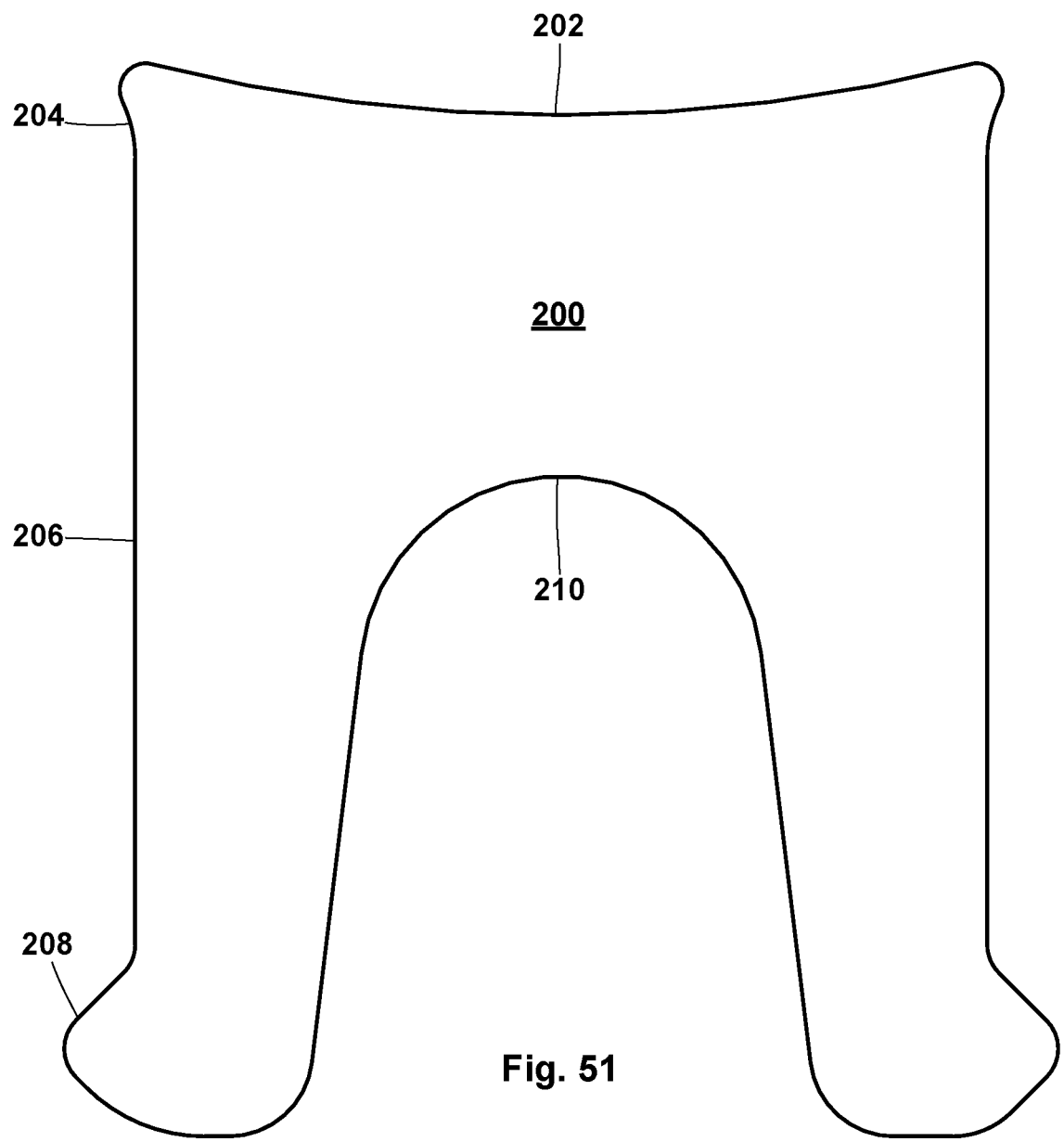
FIG. 51 is a front view of the T-slot chip guard of FIG. 50.

With reference to the exemplary embodiments of FIGS. 50-60, there is depicted a T-slot chip guard 200 and use thereof, as will now be discussed. Referring to FIGS. 50 and 51 and embodiment of the T-slot chip guard is shown in perspective and end-on profile views. In an embodiment, the T-slot chip guard 200 consists of an elongated form having profile as seen in FIG. 51, where there is a body provided with a pair of extended leg portions that are extending in a direction away from the concave top surface 202. As shown, the legs may be separated by a concave under-surface 210 which is of a smaller radial curve than the radial curve of the concave top surface 202. The sidewall 206 of the profile is generally planar and dimensioned to fit alongside a T-slot surface 906 (see FIG. 52). In an embodiment, the chip guard 200 is formed entirely of a compliant material that is conformable, such that it may be compressed to fit within the range of anticipated manufacture tolerances for various sized T-slots.

Figure 57:
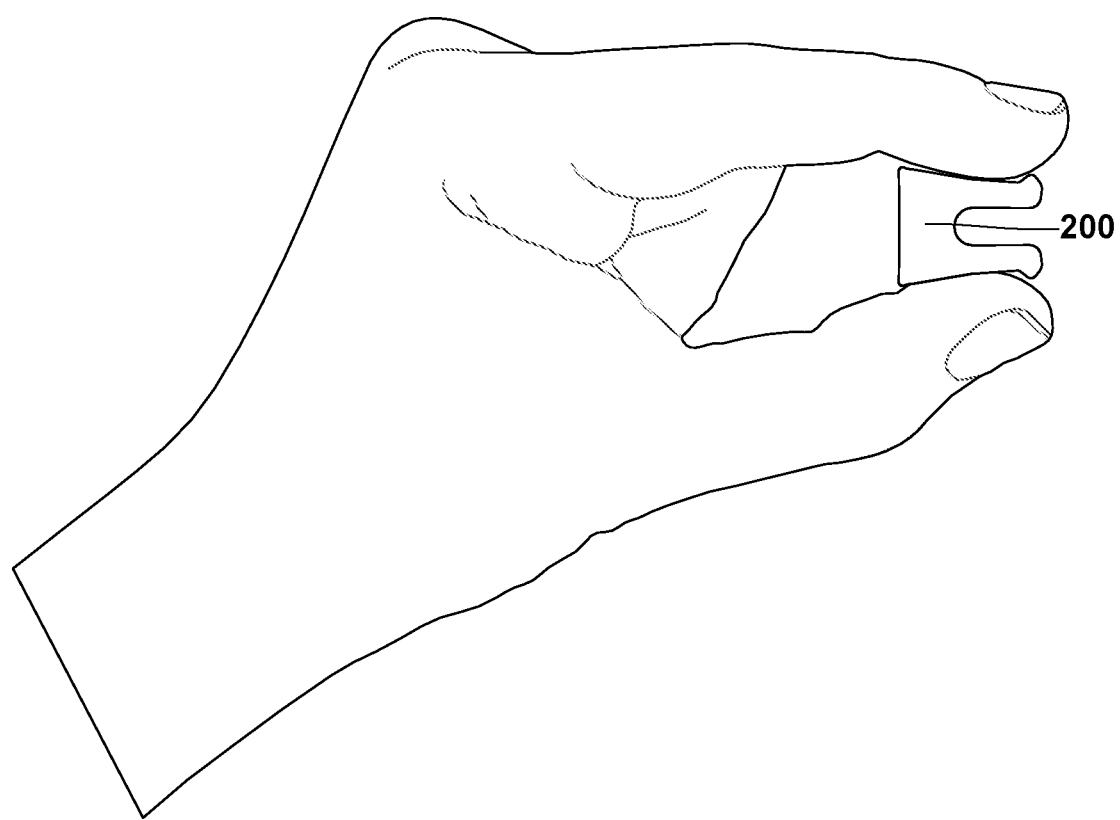
FIG. 57 is a perspective view of the T-slot chip guard of FIG. 50, depicted as being manually compressed by pinching for placement.

In an embodiment, the chip guard 200 is a compliant and/or compressible material that possesses shape memory, such as an elastomer, for example, natural or synthetic rubber or elastic sponge material, which upon being subjected to a deforming force, would seek to return to its initial shape after release of the deforming force. In an embodiment, the chip guard 200 is made by way of non-limiting examples, in part, or in whole, of: silicone rubber, latex, natural or vulcanized rubber, neoprene polypropylene, polyethylene, polycarbonate, nylon, polytetrafluorothylene, polyetheretherketone, Delrin™, or acrylonitrile butadiene styrene (ABS). Though less preferred, it is contemplated that, in an embodiment, the chip guard may be made of metal, such as aluminum, steel, brass, or alloys, though care must be taken to prevent galvanic corrosion, that would occur between mismatched metal materials in contact with one another. In those embodiments, one or more of the contacting surfaces may be treated or coated, such as by anodizing the material, or applying an insulating coating, so as to prevent the damage to the worksurface that would occur with corrosion. In those embodiments, where the chip guard is made of a material that is generally incompressible (e.g., metals or harder and stiffer plastics) may be provided with flexibility by ensuring that the body portion of the chip guard (i.e., the portion of the chip guard between the top surface 202 and the under-surface 210) is of narrow dimensions so as to provide adequate flexibility to the chip guard. Alternatively, in an embodiment where the chip guard is formed from an incompressible material, such that the embodiment of the chip guard is not sufficiently flexible to be manually compressed and placed into the T-slot through the upper slot opening, it is recognized that the chip guard may be slidingly advanced into the T-slot via the end profile opening, as an alternative placement method to being placed in a vertical direction through the long slot opening at the top of the T-slot, as can be done with a more compliant material. If work holding is already in place within the T-slot, access may be unavailable from the end of the t-slot. It is not uncommon to miss a step placing workholding or other components, when setting up for machining a workpiece. In those embodiments where the T-slot chip guard is a proper fit, they may be installed from the top of the slot (i.e., top down insertion), assuming the tolerance of the manufactured T-slot is within acceptable limits. It is contemplated that various embodiments of the T-slot chip guards described herein will accommodate different sizes of openings, including as a non-limiting example, both a 0.625" and 0.6875" opening. In an embodiment, the profile of the chip guard is such that it can be extruded to form an elongate body, to form varying lengths of chip guard material. As can be seen in FIGS. 50 and 51, in an embodiment, the chip guard provides a body presenting a top surface 202 that may be slightly concave. The concave top surface may serve to provide resilient flexibility to the body of the chip guard when sidewalls 206 are compressed inward during insertion of various embodiments of the T-slot chip guard. as can be seen in FIG. 57, which depicts the ability of the chip guard embodiment to be readily compressed by pinching the periphery edges of the chip guard 200 together, which allows the chip guard to be installed by hand.

Referring again to FIGS. 50-51, in an embodiment, a concave under-surface 210 forms an inside radius of the chip guard, separating a pair of extended leg regions on either side of the concave under-surface 210. The concave surface may also serve as a flexure point, which allows sidewalls 206 and lower radius edges 208 to be compressed together, such as by pinching, thereby bringing each of the legs toward each other, and flexing each of the concave under-surface 210 by tightening the inside radius, and causing the concave top surface 202 to be less concave, or even become convex while pinched. In an embodiment, there may be provided at the top corners of the chip guard a pair of edge radius surfaces 204, depicted as an elongated radiused members where the top surface 202 is extended beyond the plane created by the edge surface of the sidewall 206. Each of the edge radius surfaces 204 may beneficially serve to prevent the chip guard 200 from being inserted into the T-slot too far as it is being placed, as the edge radius surfaces 204 are to rest against the upper features of the T-slots in the T-slot table or base plate, as appropriate, at the junction of the T-slot and the upper surface. In some embodiments of the T-slot, whether in a base plate, or a standard T-slot table, the T-slot embodiment may provide a surface chamfer 904, in these embodiments the edge radius surfaces 204 may rest against the surface chamfer when the chip guard 200 is inserted. Notably, the edge radius surfaces 204 should not rest above the plane created by the T-slot table surface, as any material that extends above the table surface may interfere with the placement and securement of the workpieces for milling.

Figure 52:
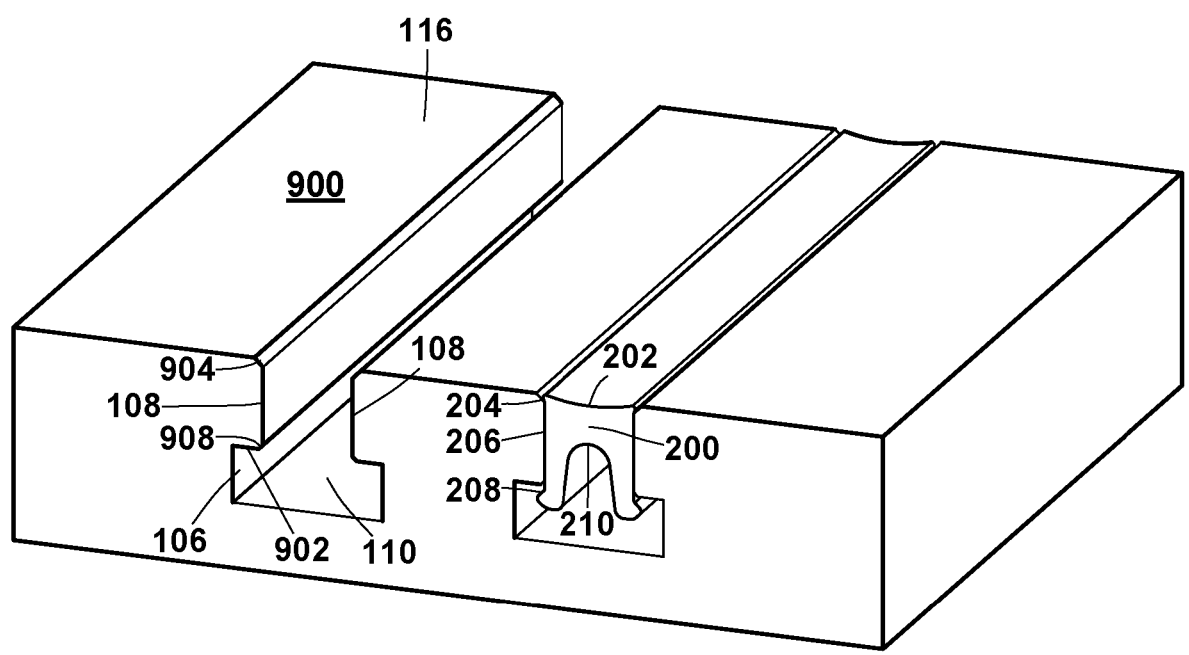
FIG. 52 is a perspective view of the T-slot chip guard of FIG. 50, depicted as residing within a T-slot.
Figure 53:
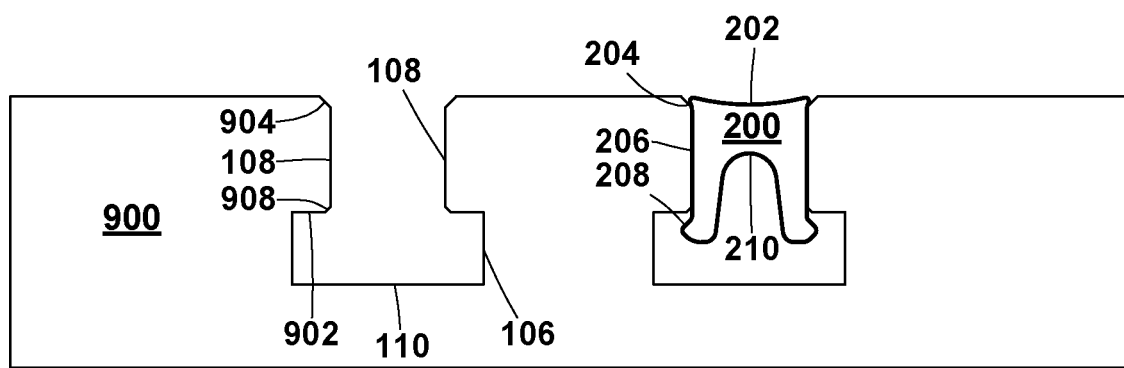
FIG. 53 is a front view of the T-slot chip guard of FIG. 50, depicted as residing within a T-slot.
Figure 54:
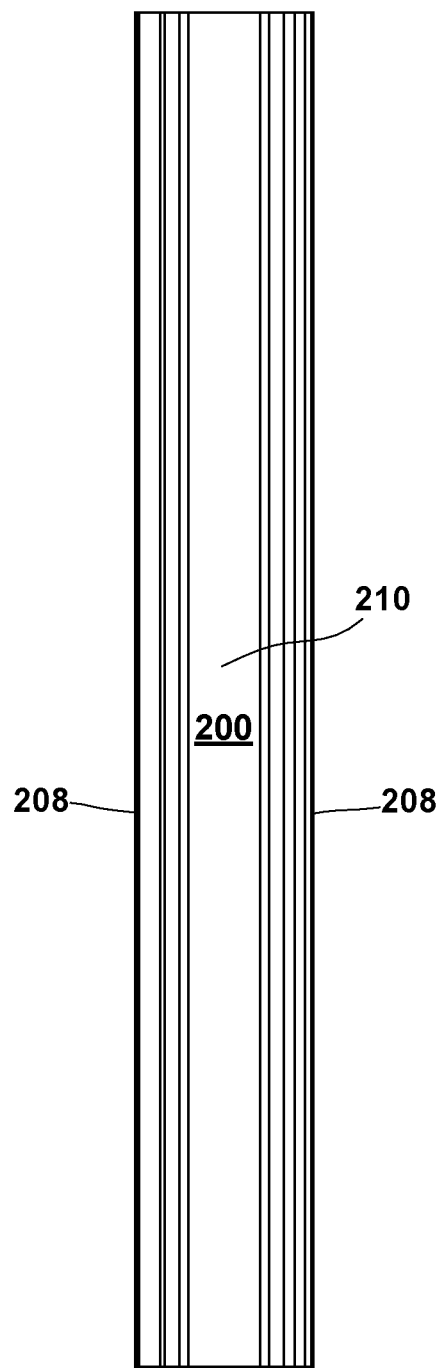
FIG. 54 is a bottom view of the T-slot chip guard of FIG. 50.

In an embodiment, depicted in end-on profile in FIG. 51, the elongated members that appear as legs for the chip guard 200 may feature a lower radius edge 208 that extends out beyond the plane created by the edge surface represented by the sidewall 206. In this embodiment, the lower radius edge 208 of the chip guard 200 may acts as stop as well, as the lower radiused edge may beneficially prevent the chip guard being pulled out of the t-slot when undesired. As can be seen with reference to FIGS. 52-53 the edge radius surface 204 of the guard can be seen to abut the t-slot surface chamfer 904, thereby preventing insertion of the chip guard further into the T-slot in a vertical direction, and maintain the chip guard at a level that would be substantially parallel with the top surface of the t-slot table or base plate, as appropriate, albeit with slight depressions extending along the length of the chip guard, towards the middle extent of the chip guard top surface, owing to the concave nature of the top surface 202. Furthermore, the edge radius surface 204 ensures that any gap created between the T-slot and the chip guard is sealed by the extending lip, in order to prevent swarf or debris from penetrating into the T-slot. As depicted in FIGS. 52 and 53, the chip guard, when in place within the T-slot, positions the lower radius edge 208 below the T-slot sidewall surface 108, and extending laterally outwards in the crossbar of the T, and be pressed against a lower T-slot chamfer 908, if present. In this manner, the chip guard is physically secured within the T-slot, as the lower radius edge 208 extends laterally beyond and below the sidewall surfaces 108 of the T-slot, and would have to be compressed in order to be removed vertically out the T-slot. Thus the embodiment of the chip guard 200 provides a safeguard feature to prevent from the T-slot Chip Guard 200 from being pulled out of the T-slot inadvertently.

In an embodiment, the edge surface of the sidewall 206 is generally planar, and extends in approximately a vertical direction, where the chip guard is placed horizontally. The sidewalls 206 should be sufficiently compressed by the t-slot sidewall surfaces 108 while the chip guard is inserted into the t-slot, so as to hold the chip guard 200 firmly within the T-slot, and maintain the top surface 202 of the chip guard in a position that is substantially parallel to the t-slot top plane, as can be seen with reference to FIGS. 52 and 53. In an embodiment, the chip guard is a conformable material, being readily compressible like a sponge, and resilient, so as to be able to conform to T-slot grooves of metric and imperial equivalents concurrently, as the flexible, compressible, and resilient nature of the material allows it to adapt the chip guard for use with T-slots of either size standard. Though the edge radius surfaces 204 will lie substantially planar with the top of the T-slot, against chamfer 904, the concave top surface 202 of the chip guard 200 should lie slightly below the top plane of the T-slot channel as depicted in FIG. 53. It is undesirable to have any interference or protrusions within the top surface plane of the t-slot channel, as such interference can cause a workpiece to not lie flat, and thus be out of parallel on the top plane of the base plate or table surface, which would affect the quality of the machined piece. In an embodiment, the material from which the chip guard 200 is made, in addition to being deformable or compressible, and resilient, should also be able to withstand temperatures that the chip guard may encounter during the machining processes. For example, the chip guard may be exposed to elevated temperatures as swarf created by turning or milling can be hot, and may even create steam when cutting fluid is utilized; thus the chip guard may beneficially be made from a temperature resistant material that is suitable for the placement in the T-slot as described, such as silicone rubber. Alternatively, the chip guard may be treated to provide enhanced temperature resistance or chemical resistance, as will be discussed.

Figure 55:
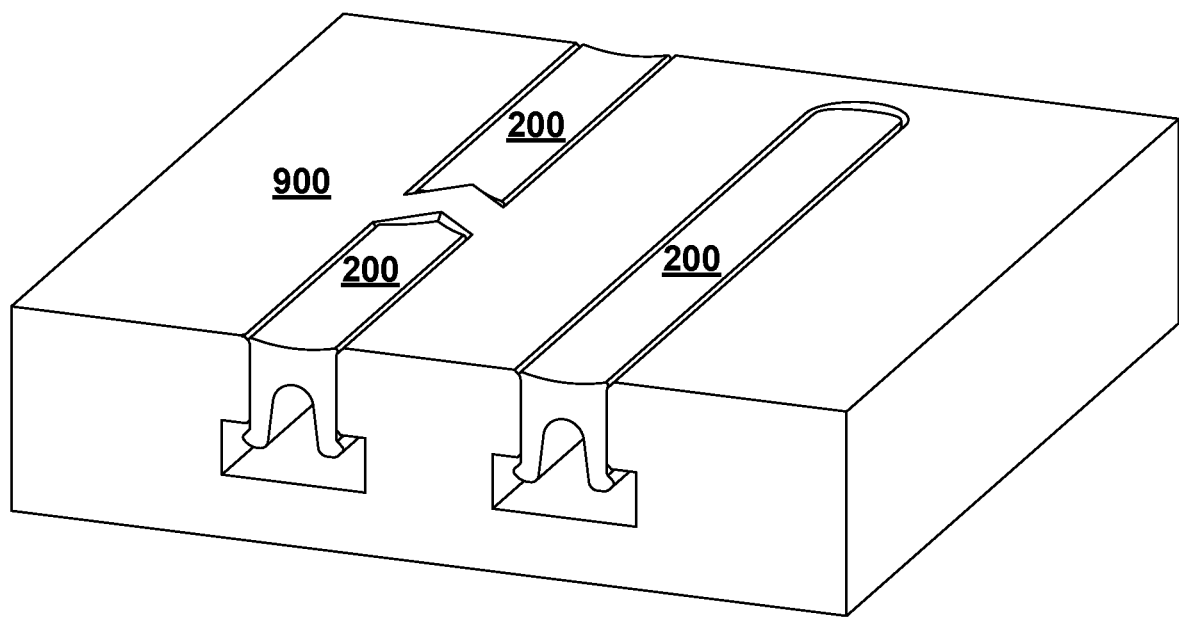
FIG. 55 is a perspective view of the T-slot chip guard of FIG. 50, depicted as residing in a T-slot, and conforming to the T-slot shape.
Figure 56:
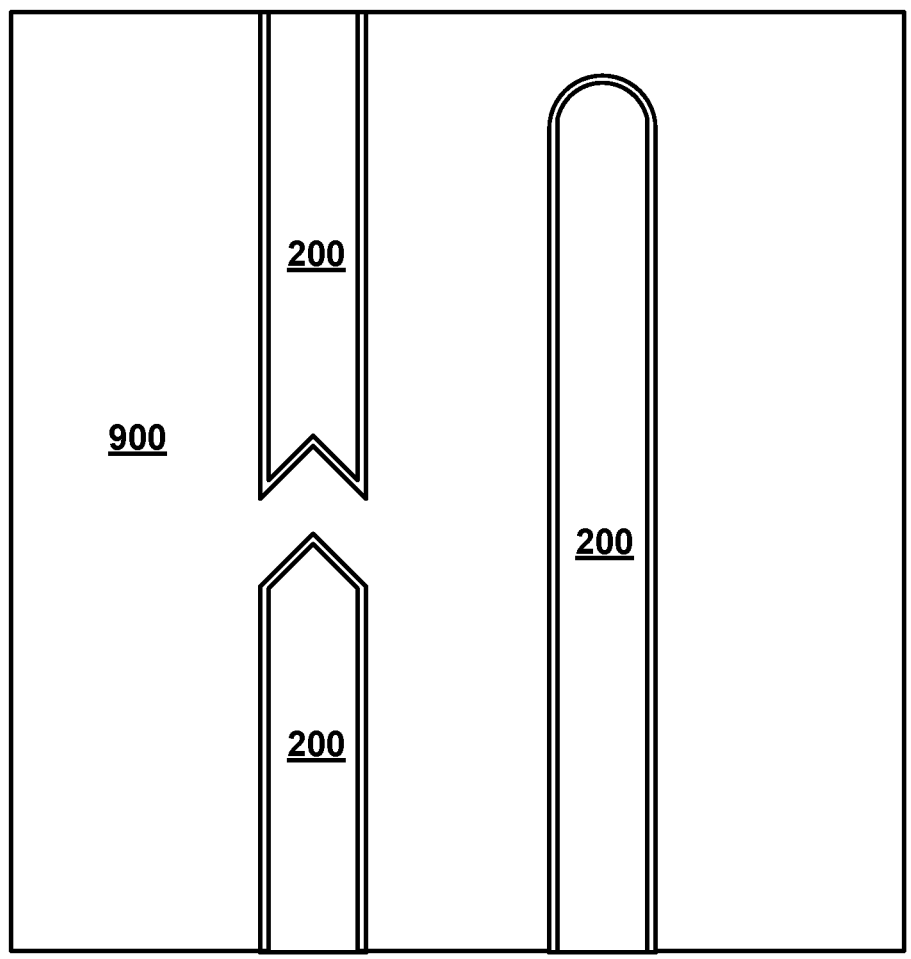
FIG. 56 is a top view of the T-slot chip guards of FIG. 55.

As can be seen with reference to FIGS. 55-56, various embodiments of the chip guard 200 as described herein may readily conform or be easily adjusted to conform to different shapes within the t-slot. For example where the T-slot table or base plate provides a rounded terminal end to the T-slot, or alternatively, the terminal end is formed as either a chevron or an inverted chevron, the chip guard 200 may beneficially be readily adjustable or conformable to the non-planar termination of the T-slot. In this manner, the chip guard may ensure that a sealing surface is provided to abut to the end of the t-slot. Alternatively, the chip guard may be able to be adjusted or conform to an object placed into the T-slot, such as a clamp, or a work stop, including any of the embodiments described herein being utilized within the t-slot. Where the chip guard is to be adjusted by trimming or shaping of the chip guard, the use of simple hand tools, such as cutting blades, or scissors may be employed. It is contemplated that hand shaping may be helpful, to tear off a portion of the chip guard, or alternatively to deform a portion of the chip guard, which may resiliently seek to re-expand to its non-deformed shape while placed into the T-slot, such that the shape memory creates a conforming seal to the dimensions of the T-slot. The use of the chip guard that seals well within the T-slot may beneficially prevent the occurrence of cutting fluid and/or swarf from entering the t-slot leads, which would otherwise result in the interchange of workpieces, or the cleanup of the working surface taking more time and effort, as the groove fills and may blocks access to the insertion of items into the T-slots.

Figure 58:
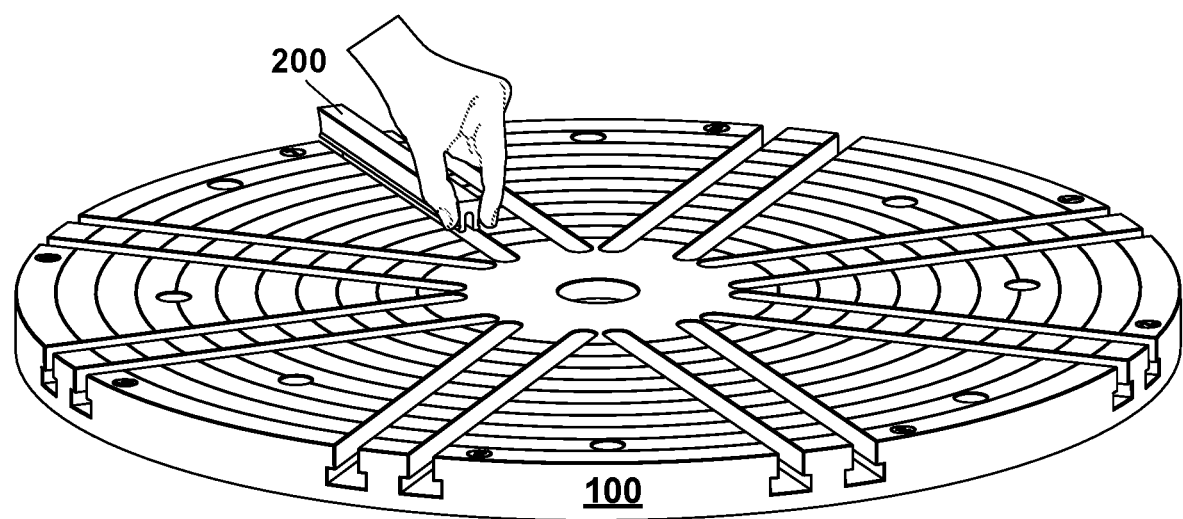
FIG. 58 is a perspective view of the T-slot chip guard of FIG. 50, depicted as demonstrating the ability to be installed within a T-slot, by being compressed for insertion into the T-slot.
Figure 59:
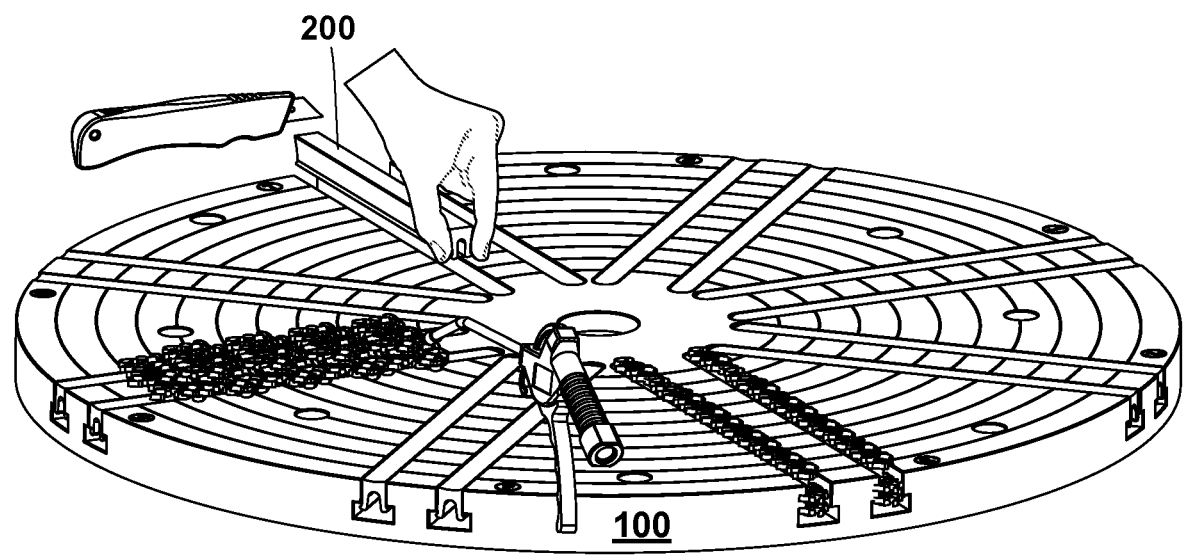
FIG. 59 is a perspective view of the T-slot chip guard of FIG. 50, depicted as demonstrating the ability to custom install to a T-slot with simple tools.

With reference to FIGS. 58-59, the installation of an exemplary embodiment of the T-slot chip guard 200 will now be discussed. Upon determining the placement of the workpiece and the workholding elements to be utilized, the various embodiments of the chip guard described herein can be installed to a base plate 100, though a T-slot table may be similarly employed. A length of chip guard material longer then the groove or slot it is to be installed in may be provided. A utility knife or scissors would then be used to trim the chip guard to length. Using one's fingertips, the chip guard may then be compressed, by pinching and inserting simultaneously into the t-slot groove. As depicted in FIG. 59, the use of chip guards 200 placed into several of the t-slot grooves, and shield those grooves from swarf entering into the T-slots that are guarded by the placement of the chip guard 200. By way of contrast, any groove left unprotected by the placement of a chip guard 200 therein would quickly fill with swarf, and rendering the groove unable to be utilized. The process of removing swarf from t-slot grooves is often time consuming, and is exasperated by workpieces requiring multiple workholding operations. A wash down hose, compressed air wand, or swarf brush can be used to remove the swarf from the top surface of the chip guard readily, and will not damage the chip guard, such that the work surface is able to be quickly used again.

Figure 60:
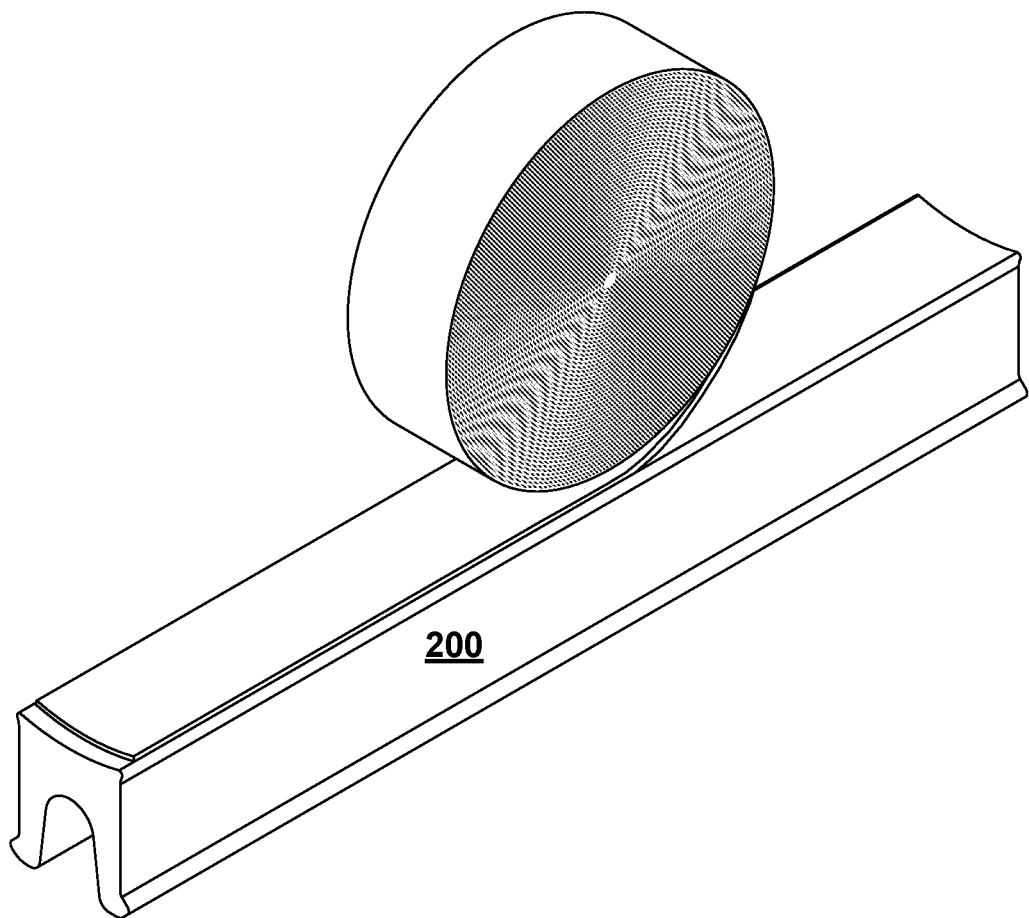
FIG. 60 is a perspective view of the T-slot chip guard of FIG. 50, depicted with an optional bonded extreme temperature shielded layer.

In an embodiment, the chip guard 200 as depicted in FIG. 60 may feature the application of a flexible bonded extreme temperature resistant strip for applications where the swarf created may exceed the temperatures typical to machining with cutting fluid. It is contemplated that the temperature resistant strip may be in the form of an adhesive backed foil strip that can easily be applied to the chip guard surface, but is of a narrow enough dimension so as to not interfere with the placement of the workpieces onto the T-slot table or base plate. It is contemplated that the temperature resistant strip may be applicable in situations where the workpiece is being subjected to dry machining, which is machining without the aid of coolant, which is common in machining steels. It is contemplated that the foil strip may be bonded to the chip guard 200 prior to, or after installation to the t-slot groove. In an alternate embodiment, it is also contemplated that the t-slot chip guard could be manufactured of a material that may be less resistant to heat or chemicals than previously described embodiments, but may attain the same, or nearly the same levels of heat and/or chemical resistant properties by the application of specialized coatings, such as fluoroelastomer coatings, as are known in the art. Such coatings may be applied to provide chemical and heat reflectivity characteristics often only found in silicone or more expensive rubber compounds, and allows the use of less expensive, or more readily available materials.

In any of the embodiments described herein, the work holding system components may be of any suitable material compatible with the use of the component. The base plate and clamp components may be made of a metal, polymer or composite material. In an embodiment, the clamp components are made of aluminum, or steel or combinations thereof, for example, the clamp body components may be aluminum, and the fasteners may be steel, or vice versa. It is contemplated that any of the workholding system components made of metal may be of hardened steel for longevity, where appropriate. In an embodiment, the base plate is made of aluminum, steel, which may optionally be hardened. In an embodiment, clamp components, and the work stop, may be made of metal, for example, steel or aluminum, brass, or metal alloys, either in part, or whole. In another embodiment, the plate or clamp components may be made of polymer, such as polycarbonate, nylon, polytetrafluorothylene, polyetheretherketone, polyoxymethylene (e.g., Delrin™), or ABS, so long as the material is suitable for forming the clamping body and possesses adequate stiffness to perform the function of the clamp.

The foregoing illustrates some of the possibilities for practicing the invention. Many other embodiments and fields of use for a modular workholding system, and the components thereof contributing to the invention are possible and within the scope and spirit of the invention. It is, therefore, intended that the foregoing description be regarded as illustrative rather than limiting, and that the scope of the invention is given by the appended claims, together with their full range of equivalents.

What is claimed is:

1. An elongated T-slot protective device comprising:
an elongated member having:
   a body;
   a pair of sidewalls; and
   a pair of legs;
wherein the protection device is placeable into an elongated opening of a T-slot, and covering the elongated opening to prevent debris from entering the T-slot formed in a work surface, and further comprising a pair of substantially planar sidewalls terminating in an upper radiused surface and a lower radiused surface, and each of the pair of legs being separated by a concave undersurface.

2. The elongated T-slot protective device of claim 1, wherein the body has an upper surface with a concave profile.

3. The elongated T-slot protective device of claim 2, wherein the concave profile of the upper surface presents a first radius of curvature, and the concave undersurface presents a second radius of curvature that is smaller than the first radius of curvature.

4. The elongated T-slot protection device of claim 1, wherein each of the upper and lower radiused surfaces extend laterally beyond a plane defined by the pair of substantially planar sidewalls.

5. The elongated T-slot protection device of claim 4, wherein the lower radiused surface engages an inside surface of the T-slot that is perpendicular to the pair of sidewalls of the protective device.

6. The elongated T-slot protection device of claim 4, wherein the T-slot has a pair of upper surface chamfers located at the junction of the T-slot with the work surface, and said upper radiused surface of the device is configured to abut against at least one of the pair of upper surface chamfers, without extending above the plane of a T-slot work surface.

7. The elongated T-slot protection device of claim 6, wherein said upper radiused surface is configured to prevent over-insertion of the device into the T-slot.

8. The elongated T-slot protective device of claim 4, wherein the pair of sidewalls are compressible, whereupon each of said pair of legs are urged toward each other.

9. The elongated T-slot protective device of claim 1, wherein the device is directed into the T-slot through a linear opening at the top of the T-slot while in a compressed state, whereupon the device resiliently seeks to spring back from the compressed state, securing the device within the T-slot in a friction fit manner.

10. The elongated T-slot protective device of claim 1, wherein the device is formed entirely of a compliant material.

11. The elongated T-slot protection device of claim 10, wherein the compliant material is an elastomer and is capable of being trimmed to length using a hand tool selected from the group consisting of a utility knife or scissors.

12. The elongated T-slot protective device of claim 1, wherein the device is an elongated member of extruded material.

13. The elongated T-slot protective device of claim 12, wherein the material is one of silicone rubber, latex, natural or vulcanized rubber, neoprene, polypropylene, polyethylene, polycarbonate, nylon, polytetrafluorothylene, polyetheretherketone, polyoxymethylene, or acrylonitrile butadiene styrene.

14. The elongated T-slot protective device of claim 12, wherein the device possesses shape memory.

15. The elongated T-slot protective device of claim 12, wherein the prevents galvanic corrosion where the device is in contact with the work surface.

16. The elongated T-slot protection device of claim 1, further comprising a temperature resistant strip that is bonded to a top surface of the device.

17. The elongate T-slot protection device of claim 1, further comprising a coating that is applied to at least a top surface of the device.

18. The elongate T-slot protection device of claim 17, wherein the coating is a fluoroelastomer coating.

19. The elongate T-slot protection device of claim 17, wherein the coating improves the resistance of the device to damage from exposure to one or more of chemicals, heat and combinations thereof.

* * * * *